United States Patent
Chen et al.

(10) Patent No.: US 12,167,027 B2
(45) Date of Patent: Dec. 10, 2024

(54) VIDEO ENCODER, VIDEO DECODER, AND CORRESPONDING METHOD

(71) Applicant: HUAWEI TECHNOLOGIES CO., LTD., Guangdong (CN)

(72) Inventors: Huanbang Chen, Shenzhen (CN); Haitao Yang, Shenzhen (CN); Jianle Chen, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/155,641

(22) Filed: Jan. 17, 2023

(65) Prior Publication Data
US 2023/0239494 A1    Jul. 27, 2023

Related U.S. Application Data

(63) Continuation of application No. 17/146,349, filed on Jan. 11, 2021, now Pat. No. 11,575,928, which is a
(Continued)

(51) Int. Cl.
*H04N 19/50* (2014.01)
*H04N 19/105* (2014.01)
*H04N 19/52* (2014.01)

(52) U.S. Cl.
CPC ........... *H04N 19/52* (2014.11); *H04N 19/105* (2014.11); *H04N 19/50* (2014.11)

(58) Field of Classification Search
CPC ........ H04N 19/50; H04N 19/51; H04N 19/52; H04N 19/105; H04N 19/567
See application file for complete search history.

(56) References Cited

U.S. PATENT DOCUMENTS 10,798,394 B2 * 10/2020 Zhou .................... H04N 19/176
11,140,408 B2 * 10/2021 Huang .................. H04N 19/42
(Continued)

FOREIGN PATENT DOCUMENTS

CN    104243982 A    12/2014
CN    104363451 A    2/2015
(Continued)

OTHER PUBLICATIONS

Study of the affine merge mode; Jul. 2018. (Year: 2018).*
(Continued)

*Primary Examiner* — Luis Perez-Fuentes
(74) *Attorney, Agent, or Firm* — James Harrison

(57) ABSTRACT

A video encoder, a video decoder, and a corresponding method are provided. The method includes: parsing a bitstream to obtain an index, where the index indicates a target candidate motion vector group of a current coding block; determining the target candidate motion vector group in an affine candidate motion vector list based on the index, where the affine candidate motion vector list includes at least a first candidate motion vector group, the first candidate motion vector group is obtained based on a first group of control points of a first neighboring affine coding block, and the first group of control points is determined based on a CTU located relative to the current coding block, wherein the first neighboring affine coding block is located in the CTU; and predicting a predicted sample value of the current coding block based on the target candidate motion vector group.

22 Claims, 18 Drawing Sheets

Related U.S. Application Data continuation of application No. PCT/CN2018/110436, filed on Oct. 16, 2018.

(60) Provisional application No. 62/737,858, filed on Sep. 27, 2018, provisional application No. 62/696,832, filed on Jul. 11, 2018.

(56) References Cited

U.S. PATENT DOCUMENTS

| | | | | |
|---|---|---|---|---|
| 11,223,845 | B2 * | 1/2022 | Lee | H04N 19/593 |
| 11,265,573 | B2 * | 3/2022 | Liu | H04N 19/537 |
| 11,575,928 | B2 * | 2/2023 | Chen | H04N 19/105 |
| 11,653,020 | B2 * | 5/2023 | Liu | H04N 19/159 375/240.16 |
| 2015/0296218 | A1 | 10/2015 | Pasupuleti et al. | |

FOREIGN PATENT DOCUMENTS

| | | |
|---|---|---|
| CN | 104539966 A | 4/2015 |
| CN | 104661031 A | 5/2015 |
| CN | 104935938 A | 9/2015 |
| CN | 105163116 A | 12/2015 |
| EP | 3249927 A1 | 11/2017 |
| EP | 3331242 A1 | 6/2018 |
| WO | 2014054684 A1 | 4/2014 |
| WO | 2017200771 A1 | 11/2017 |

OTHER PUBLICATIONS

Vector coding of the Affine MVD; Jul. 2018. (Year: 2018).*
JVET-K0052-v2, Minhua Zhou et al., Non-CE4: A study on the affine merge mode, Joint Video Experts Team (JVET) of ITU-T SG 16 WP 3 and ISO/IEC JTC 1/SC 29/WG 11, 11th Meeting: Ljubljana, SI, 10 Jul. 18, 2018, 10 pages.
Minhua Zhou, and Brian Heng, Non-CE4: A study on the affine merge mode, Joint Video Experts Team (JVET) of ITU-T SG 16 WP 3 and ISO/IEC JTC1/SC 29/WG 11, JVET-K0052-v2, 11th Meeting: Ljubljana, SI, Jul. 7, 2018, pp. 1-10.
Seethal Paluri, Mehdi Salehifar, and Seung Hwan Kim, Vector Coding of Affine MVD, Joint Video Experts Team (JVET) of ITU-T SG 16 WP 3 and ISO/IEC JTC 1/SC 29/WG 11, JVET-K0101 (version 3), 11th Meeting: Ljubljana, SI, Jul. 10, 2018, pp. 1-3.
Minhua Zhou, CE4-related: Combined tests of JVET-L0046 and JVET-L0047, Joint Video Experts Team (JVET) of ITU-T SG 16 WP 3 and ISO/IEC JTC 1/SC 29/WG 11 JVET-L0048-v1 12th Meeting: Macao, CN Sep. 2018, pp. 1-11.
Huanbang Chen, et al., CE4-related: Combination of affine mode clean up and line buffer reduction Joint Video Experts Team (JVET) of ITU-T SG 16 WP 3 and ISO/IEC JTC 1/SC 29/WG 11, JVET-L0694-v3, 12th Meeting: Macao, CN, Oct. 2018, pp. 1-5.
Yu Han et al., "CE4.1.3: Affine motion compensation prediction", Qualconun Incorporated, Joint Video Exploration Team (JVET) of ITU-T SG 16 WP 3 and ISO/IEC JTC 1/SC 29/WG 11,11th Meeting: Ljubljana, SI, Jul. 10-18, 2018,JVET-K0337, total:6pages.
Z Y Lin et al: CE4.1.6:MUP pair list construction for affine inter mode 11 .JUET MEETING;Jul. 11, 2018-Jul. 18, 2018; Ljubljana;(The Joint Uideo Exploration Team of ISO/IEC JTC1/SC29/WG11 and ITU TSG .16) No. JVET-K0244,Jul. 10, 2018 (Jul. 10, 2018) total:6pages.

* cited by examiner

VIDEO ENCODER, VIDEO DECODER, AND CORRESPONDING METHOD

CROSS-REFERENCE TO RELATED APPLICATIONS

This application is a continuation of U.S. patent application Ser. No. 17/146,349, filed on Jan. 11, 2021, which is a continuation of International Application No. PCT/CN2018/110436, filed on Oct. 16, 2018, which claims priority to U.S. provisional Patent Application No. 62/696,832, filed on Jul. 11, 2018 and U.S. Provisional Patent Application No. 62/737,858, filed on Sep. 27, 2018. All of the afore-mentioned patent applications are hereby incorporated by reference in their entireties.

TECHNICAL FIELD

This application relates to the field of video encoding and decoding technologies, and in particular, to an encoding method, a decoding method, a corresponding encoding device, and a corresponding decoding device.

BACKGROUND

Digital video capabilities can be incorporated into a wide variety of apparatuses, including digital televisions, digital live broadcast systems, wireless broadcast systems, personal digital assistants (PDA), laptop or desktop computers, tablet computers, e-book readers, digital cameras, digital recording apparatuses, digital media players, video game apparatuses, video game consoles, cellular or satellite radio phones (so-called "smartphones"), video conferencing apparatuses, video streaming apparatuses, and the like. Digital video apparatuses implement video compression technologies, for example, video compression technologies described in standards defined by MPEG-2, MPEG-4, ITU-T H.263, and ITU-T H.264/MPEG-4 Part 10: advanced video coding (AVC), the video coding standard H.265/high efficiency video coding (HEVC) standard, and extensions of such standards. The video apparatuses can transmit, receive, encode, decode, and/or store digital video information more efficiently by implementing such video compression technologies.

The video compression technologies are used to perform spatial (intra-picture) prediction and/or temporal (inter-picture) prediction to reduce or remove inherent redundancy in video sequences. In block-based video coding, a video slice (that is, a video frame or a part of a video frame) may be partitioned into picture blocks, and the picture block may also be referred to as a tree block, a coding unit (CU), and/or a coding node. A picture block in a to-be-intra-coded (I) slice of a picture is coded through spatial prediction based on a reference sample in a neighboring block in the same picture. For a picture block in a to-be-inter-coded (P or B) slice of a picture, spatial prediction based on a reference sample in a neighboring block in the same picture or temporal prediction based on a reference sample in another reference picture may be used. The picture may be referred to as a frame, and the reference picture may be referred to as a reference frame.

Various video coding standards including the high efficiency video coding (HEVC) standard propose a predictive coding mode used for a picture block. To be specific, a current to-be-coded block is predicted based on a coded video data block. In an intra prediction mode, a current block is predicted based on one or more previously decoded neighboring blocks in a same picture as the current block. In an inter prediction mode, a current block is predicted based on a decoded block in a different picture.

Motion vector prediction is a key technology that affects encoding/decoding performance. In an existing motion vector prediction process, there is a motion vector prediction method based on a translational motion model for a translational object in a picture, and there is a motion vector prediction method based on a motion model and a motion vector prediction method based on a control point combination for a non-translational object. In the motion vector prediction method based on the motion model, a large amount of information needs to be read from memory, resulting in a relatively low encoding/decoding speed. There is a need for reducing a quantity of times of reading from the memory in a motion vector prediction process.

SUMMARY

Embodiments of this application provide an encoding method, a decoding method, a corresponding encoding device, and a corresponding decoding device, to reduce a quantity of times of reading from memory to some extent, so as to improve encoding and decoding performance.

According to a first aspect, an embodiment of this application discloses an encoding method. The method includes: determining a target candidate motion vector group in an affine candidate motion vector list (which is also referred to as a candidate motion vector list) according to a rate-distortion cost criterion, where the target candidate motion vector group represents motion vector predictors of a group of control points of a current coding block (for example, a current affine coding block), the affine candidate motion vector list includes at least a first candidate motion vector group, the first candidate motion vector group is obtained based on a first group of control points of a first neighboring affine coding block, and the first group of control points of the first neighboring affine coding block are control points determined based on a coding tree unit CTU located relative to the current coding block, wherein the first neighboring affine coding block is located in the CTU, or the first group of control points of the first neighboring affine coding block includes a bottom-left control point and a bottom-right control point of the first neighboring affine coding block; and encoding an index corresponding to the target candidate motion vector group into a to-be-transmitted bitstream.

For example, if the target candidate motion vector group is a target candidate motion vector 2-tuple, the target candidate motion vector group represents motion vector predictors of two control points of the current coding block. If the target candidate motion vector group is a target candidate motion vector triplet, the target candidate motion vector group represents motion vector predictors of three control points of the current coding block.

Optionally, a manner of constructing the affine candidate motion vector list may be: determining one or more neighboring affine coding blocks of the current coding block in an order of a neighboring block A, a neighboring block B, a neighboring block C, a neighboring block D, and a neighboring block E (as shown in FIG. 7A), where the one or more neighboring affine coding blocks include the first neighboring affine coding block; and constructing a first affine model based on motion vectors of the first group of control points of the first neighboring affine coding block and location coordinates of the first group of control points, and then obtaining motion vector predictors of a first group of control points of the current coding block by using the first affine model, where the motion vector predictors of the first group of control points of the current coding block are used as the first candidate motion vector group in the affine candidate motion vector list.

Optionally, when a length of the affine candidate motion vector list is 1, the target motion vector group may not need to be indicated by using an index.

In the foregoing method, the affine candidate motion vector list may include only one candidate motion vector group, or may include a plurality of candidate motion vector groups. Each candidate motion vector group may be a motion vector 2-tuple or a motion vector triplet. When there are a plurality of candidate motion vector groups, the first candidate motion vector group is one of the plurality of candidate motion vector groups. A derivation (derivation) process of another candidate motion vector group in the plurality of candidate motion vector groups may be the same as a derivation (derivation) process of the first candidate motion vector group, or may be different from a derivation (derivation) process of the first candidate motion vector group. Further, the target candidate motion vector group is an optimal candidate motion vector group selected from the affine candidate motion vector list according to the rate-distortion cost criterion. If the first candidate motion vector group is optimal (for example, has lowest rate-distortion costs), the selected target candidate motion vector group is the first candidate motion vector group. If the first candidate motion vector group is not optimal, the selected target candidate motion vector group is not the first candidate motion vector group. The first neighboring affine coding block is a specific affine coding block in neighboring blocks of the current coding block, and is not specifically limited herein. FIG. 7A is used as an example for description. The first neighboring affine coding block may be a coding block in which a neighboring location A is located, a coding block in which a neighboring location B is located, or another neighboring coding block. It should be noted that A, B, C, D, and E in FIG. 7A are merely intended to indicate neighboring locations, but are not actual coding blocks. In addition, "first", "second", "third", and the like that appear in other places in the embodiments of this application each indicate a specific object. A specific object indicated by "first", a specific object indicated by "second", and a specific object indicated by "third" represent different objects. For example, if a first group of control points and a second group of control points exist, the first group of control points and the second group of control points represent different control points. In addition, "first", "second", and the like in the embodiments of this application do not mean an order.

It may be understood that, when the coding tree unit CTU in which the first neighboring affine coding block is located is above the current coding block, information (for example, location coordinates and motion vectors) about lowermost control points (for example, a bottom-left control point and a bottom-right control point) of the first neighboring affine coding block has been read from memory. When the coding tree unit CTU in which the first neighboring affine coding block is located is on the left of the current coding block, information about rightmost control points (for example, a top-right control point and a bottom-right control point) of the first neighboring affine coding block has been read from memory. Therefore, in the foregoing solution, in a process of constructing a candidate motion vector based on the first group of control points of the first neighboring affine coding block, the first group of control points are control points determined based on the location relationship between the current coding block and the coding tree unit CTU in which the first neighboring affine coding block is located, or the first group of control points includes the bottom-left control point and the bottom-right control point of the first neighboring affine coding block, instead of fixedly using a top-left control point, a top-right control point, and a bottom-left control point (6-parameter affine model) of a first neighboring coding block as a first group of control points or fixedly using a top-left control point and a top-right control point (4-parameter affine model) of a first neighboring coding block as a first group of control points in the prior art. Therefore, according to the method of determining the first group of control points in this application, there is a very high probability that the information that has been read from the memory can be directly reused as information (for example, location coordinates and motion vectors) about the first group of control points, thereby reducing a quantity of times of reading from the memory and improving encoding performance.

In a possible implementation, that the first candidate motion vector group is obtained based on a first group of control points of a first neighboring affine coding block may be specifically: the first candidate motion vector group is obtained based on a first affine model (for example, based on the first affine model and location coordinates of a group of control points of the current coding block), and the first affine model is determined based on motion vectors and location coordinates of the first group of control points of the first neighboring affine coding block.

In an optional solution, the affine candidate motion vector list further includes a second candidate motion vector group, and the second candidate motion vector group is obtained based on a second group of control points of a second neighboring affine coding block. Locations of one or more control points in the second group of control points of the second neighboring affine coding block relative to the second neighboring affine coding block are different from locations of one or more control points in the first group of control points of the first neighboring affine coding block relative to the first neighboring affine coding block (for example, the control points included in the first group of control points of the first neighboring affine coding block are a bottom-left control point, a bottom-right control point, and a top-left control point of the first neighboring affine coding block, but the control points included in the second group of control points of the second neighboring affine coding block are a top-right control point, a bottom-right control point, and a bottom-left control point of the second neighboring affine coding block), or the second group of control points of the second neighboring affine coding block includes a bottom-left control point and a bottom-right control point of the second neighboring affine coding block. For example, the first neighboring affine coding block and the second neighboring affine coding block are different affine coding blocks in surrounding spatially neighboring blocks of the current coding block.

In another possible implementation, in an advanced motion vector prediction AMVP mode, the method further includes: searching, within a preset search range according to the rate-distortion cost criterion by using the target candidate motion vector group as a start search point, for motion vectors that are of a group of control points and that have lowest costs; and then determining motion vector differences MVDs between the target candidate motion vector group and the motion vectors of the group of control points. For example, if a first group of control points includes a first control point and a second control point, a motion vector difference MVD between a motion vector of the first control point and a motion vector predictor, represented by the target candidate motion vector group, of the first control point in a group of control points needs to be determined, and a motion vector difference MVD between a motion vector of the second control point and a motion vector predictor, represented by the target candidate motion vector group, of a second control point in the group of control points needs to be determined. In this case, the encoding an index corresponding to the target candidate motion vector group into a to-be-transmitted bitstream may specifically include: encoding the MVDs and the index corresponding to the target candidate motion vector group into the to-be-transmitted bitstream.

In another optional solution, in a merge mode, the encoding an index corresponding to the target candidate motion vector group into a to-be-transmitted bitstream may specifically include: encoding the index corresponding to the target candidate motion vector group, a reference frame index, and an index corresponding to a prediction direction into the to-be-transmitted bitstream. It should be understood that in the merge mode, the target candidate motion vector group represents motion vectors of a group of control points of the current coding block. In other words, in the merge mode, a motion vector predictor is equal to a motion vector.

In a possible implementation, that the first group of control points of the first neighboring affine coding block are control points determined based on a coding tree unit CTU located relative to the current coding block, wherein the first neighboring affine coding block is located in the CTU may include: if the first neighboring affine coding block is located in a coding tree unit CTU above the current coding block, the first group of control points of the first neighboring affine coding block includes a bottom-left control point and a bottom-right control point of the first neighboring affine coding block. When the coding tree unit CTU in which the first neighboring affine coding block is located is above the current coding block, information about lowermost control points of the first neighboring affine coding block has been read from memory. Therefore, in the foregoing solution, in a process of constructing a candidate motion vector based on the first group of control points of the first neighboring affine coding block, the first group of control points includes the bottom-left control point and the bottom-right control point (both belong to the lowermost control points) of the first neighboring affine coding block, and it is clear that information about the two control points does not need to be additionally read from the memory, thereby reducing a quantity of times of reading from the memory and improving encoding performance.

Optionally, if the first neighboring affine coding block is located in the CTU above the current block, the first group of control points of the first neighboring affine coding block further includes a top-left control point or a top-right control point of the first neighboring affine coding block. It may be understood that when the first group of control points includes three control points, precision of the first candidate motion vector group calculated based on the first group of control points is higher.

Optionally, both location coordinates $(x_6, y_6)$ of the bottom-left control point and location coordinates $(x_7, y_7)$ of the bottom-right control point of the first neighboring affine coding block are calculated and derived based on location coordinates $(x_4, y_4)$ of the top-left control point of the first neighboring affine coding block. The location coordinates $(x_6, y_6)$ of the bottom-left control point of the first neighboring affine coding block are $(x_4, y_4+\text{cuH})$, and the location coordinates $(x_7, y_7)$ of the bottom-right control point of the first neighboring affine coding block are $(x_4+\text{cuW}, y_4+\text{cuH})$, where cuW is the width of the first neighboring affine coding block, and cuH is the height of the first neighboring affine coding block. In addition, a motion vector of the bottom-left control point of the first neighboring affine coding block is a motion vector of a bottom-left sub-block of the first neighboring affine coding block, and a motion vector of the bottom-right control point of the first neighboring affine coding block is a motion vector of a bottom-right sub-block of the first neighboring affine coding block. It can be learned that in this case, a horizontal distance between the bottom-left control point and the bottom-right control point of the first neighboring affine coding block is cuW, and a horizontal distance between the top-left control point and the top-right control point of the first neighboring affine coding block is cuW. Because cuW is usually a power of 2, in a process of deriving a motion vector of a control point of the current coding block, a right-shifting manner may be used instead of a division operation, to reduce implementation complexity. It can be learned that both the location coordinates of the bottom-left control point and the location coordinates of the bottom-right control point of the first neighboring affine coding block are obtained through derivation, rather than being read from the memory. Therefore, according to this method, a quantity of times of reading from the memory can be further reduced and encoding performance can be improved. In another optional solution, the location coordinates of the bottom-left control point and the location coordinates of the bottom-right control point may be alternatively pre-stored in the memory, and read from the memory for use when necessary.

In another optional solution, that the first group of control points of the first neighboring affine coding block are control points determined based on a coding tree unit CTU located relative to the current coding block, wherein the first neighboring affine coding block is located in the CTU may specifically include: if the first neighboring affine coding block is located in a CTU on the left of the current coding block, the first group of control points of the first neighboring affine coding block includes a top-right control point and a bottom-right control point of the first neighboring affine coding block. When the coding tree unit CTU in which the first neighboring affine coding block is located is on the left of the current coding block, information about rightmost control points of the first neighboring affine coding block has been read from memory. Therefore, in the foregoing solution, in a process of constructing a candidate motion vector based on the first group of control points of the first neighboring affine coding block, the first group of control points includes the top-right control point and the bottom-right control point (both belong to the rightmost control points) of the first neighboring affine coding block, and it is clear that information about the two control points does not need to be additionally read from the memory, thereby reducing a quantity of times of reading from the memory and improving encoding performance.

Optionally, if the first neighboring affine coding block is located in the CTU on the left of the current coding block, the first group of control points of the first neighboring affine coding block further includes a top-left control point or a bottom-left control point of the first neighboring affine coding block. It may be understood that when the first group of control points includes three control points, precision of the first candidate motion vector group calculated based on the first group of control points is higher.

Optionally, both location coordinates $(x_5, y_5)$ of the top-right control point and location coordinates $(x_7, y_7)$ of the bottom-right control point of the first neighboring affine coding block are calculated and derived based on location coordinates ($x_4$, $y_4$) of the top-left control point of the first neighboring affine coding block. The location coordinates ($x_5$, $y_5$) of the top-right control point of the first neighboring affine coding block are ($x_4$+cuW, $y_4$), and the location coordinates ($x_7$, $y_7$) of the bottom-right control point of the first neighboring affine coding block are ($x_4$+cuW, $y_4$+cuH), where cuW is the width of the first neighboring affine coding block, and cuH is the height of the first neighboring affine coding block. In addition, a motion vector of the top-right control point of the first neighboring affine coding block is a motion vector of a top-right sub-block of the first neighboring affine coding block, and a motion vector of the bottom-right control point of the first neighboring affine coding block is a motion vector of a bottom-right sub-block of the first neighboring affine coding block. It can be learned that in this case, a horizontal distance between the bottom-left control point and the bottom-right control point of the first neighboring affine coding block is cuW, and a horizontal distance between the top-left control point and the top-right control point of the first neighboring affine coding block is cuW. Because cuW is usually a power of 2, in a process of deriving a motion vector of a control point of the current coding block, a right-shifting manner may be used instead of a division operation, to reduce implementation complexity. It can be learned that both the location coordinates of the top-right control point and the location coordinates of the bottom-right control point of the first neighboring affine coding block are obtained through derivation, rather than being read from the memory. Therefore, according to this method, a quantity of times of reading from the memory can be further reduced and encoding performance can be improved. In another optional solution, the location coordinates of the top-right control point and the location coordinates of the bottom-right control point may be alternatively pre-stored in the memory, and read from the memory for use when necessary.

In another optional solution, when the first group of control points of the first neighboring affine coding block includes the bottom-left control point and the bottom-right control point of the first neighboring affine coding block, the first group of control points of the first neighboring affine coding block further includes a top-left control point or a top-right control point of the first neighboring affine coding block. It may be understood that when the first group of control points includes three control points, precision of the first candidate motion vector group calculated based on the first group of control points is higher.

In another optional solution, after the determining a target candidate motion vector group in an affine candidate motion vector list according to a rate-distortion cost criterion, the method further includes: obtaining motion vectors of one or more sub-blocks of the current coding block based on the target candidate motion vector group; and predicting a predicted sample value of the current coding block based on the motion vectors of the one or more sub-blocks of the current coding block (for example, predicted sample values of the one or more sub-blocks are predicted based on the motion vectors of the one or more sub-blocks of the current coding block, and then the predicted sample value of the current coding block is obtained). Optionally, when the motion vectors of the one or more sub-blocks of the current coding block are obtained based on the target candidate motion vector group, if a bottom boundary of the current coding block overlaps a bottom boundary of a CTU in which the current coding block is located, a motion vector of a sub-block at the bottom-left corner of the current coding block is obtained through calculation based on an affine model of the current coding block and location coordinates (0, H) of the bottom-left corner of the current coding block, and a motion vector of a sub-block at the bottom-right corner of the current coding block is obtained through calculation based on the affine model of the current coding block and location coordinates (W, H) of the bottom-right corner of the current coding block. For example, the affine model is constructed based on the target candidate motion vector group. A model parameter of the affine model of the current coding block is obtained based on the target candidate motion vector group and location coordinates that are of a group of control points of the current coding block and that are represented by the target candidate motion vector group. Then, the motion vector of the sub-block at the bottom-left corner of the current coding block can be obtained by substituting the location coordinates (0, H) of the bottom-left corner of the current coding block into the affine model (rather than substituting coordinates of a central point of the sub-block at the bottom-left corner into the affine model for calculation), and the motion vector of the sub-block at the bottom-right corner of the current coding block can be obtained by substituting the location coordinates (W, H) of the bottom-right corner of the current coding block into the affine model (rather than substituting coordinates of a central point of the sub-block at the bottom-right corner into the affine model for calculation). In this way, when a motion vector of a bottom-left control point and a motion vector of a bottom-right control point of the current coding block are used (for example, an affine candidate motion vector list of another block is subsequently constructed based on the motion vectors of the bottom-left control point and the bottom-right control point of the current block), accurate values rather than estimated values are used. W is the width of the current coding block, and H is the height of the current coding block.

Optionally, for any coding block (such as the current coding block or a neighboring coding block), if location coordinates of a top-left control point of the coding block are (x, y), coordinates of a top-right control point of the coding block are (x+w, y), coordinates of a bottom-left control point of the coding block are (x, y+h), and coordinates of a bottom-right control point of the coding block are (x+w, y+h). w is the width of the coding block, and h is the height of the coding block.

According to a second aspect, an embodiment of this application provides a video encoder, including several function units configured to implement any method in the first aspect. For example, the video encoder may include:

an inter prediction unit, configured to determine a target candidate motion vector group in an affine candidate motion vector list according to a rate-distortion cost criterion, where the target candidate motion vector group represents motion vector predictors of a group of control points of a current coding block, the affine candidate motion vector list includes at least a first candidate motion vector group, the first candidate motion vector group is obtained based on a first group of control points of a first neighboring affine coding block, the first group of control points of the first neighboring affine coding block are control points determined based on a coding tree unit CTU located relative to the current coding block, wherein the first neighboring affine coding block is located in the CTU, or the first group of control points of the first neighboring affine coding block includes a bottom-left control point and a bottom-right control point of the first neighboring affine coding block, and the inter prediction unit may also be referred to as an inter prediction module, and in particular, a motion estimation module; and an entropy encoding unit, configured to encode an index corresponding to the target candidate motion vector group into a to-be-transmitted bitstream.

According to a third aspect, an embodiment of this application provides a video data encoding device, including a video encoder configured to implement any method in the first aspect. For example, the device may include:

a memory, configured to store video data in a form of a bitstream; and the video encoder, configured to: determine a target candidate motion vector group in an affine candidate motion vector list according to a rate-distortion cost criterion, where the target candidate motion vector group represents motion vector predictors of a group of control points of a current coding block, the affine candidate motion vector list includes at least a first candidate motion vector group, the first candidate motion vector group is obtained based on a first group of control points of a first neighboring affine coding block, and the first group of control points of the first neighboring affine coding block are control points determined based on a coding tree unit CTU located relative to the current coding block, wherein the first neighboring affine coding block is located in the CTU, or the first group of control points of the first neighboring affine coding block includes a bottom-left control point and a bottom-right control point of the first neighboring affine coding block; and encode an index corresponding to the target candidate motion vector group into a to-be-transmitted bitstream.

According to a fourth aspect, an embodiment of this application provides a video data encoding device. The device includes a nonvolatile memory and a processor that are coupled to each other. The memory is configured to store a program instruction. The processor is configured to invoke the program code to perform some or all steps of the first aspect and any method in the first aspect. For example, the processor is configured to invoke the program code to perform the following steps:

determining a target candidate motion vector group in an affine candidate motion vector list according to a rate-distortion cost criterion; and encoding an index corresponding to the target candidate motion vector group into a to-be-transmitted bitstream, where the target candidate motion vector group represents motion vector predictors of a group of control points of a current coding block, the affine candidate motion vector list includes at least a first candidate motion vector group, the first candidate motion vector group is obtained based on a first group of control points of a first neighboring affine coding block, and the first group of control points of the first neighboring affine coding block are control points determined based on a coding tree unit CTU located relative to the current coding block, wherein the first neighboring affine coding block is located in the CTU, or the first group of control points of the first neighboring affine coding block includes a bottom-left control point and a bottom-right control point of the first neighboring affine coding block.

According to a fifth aspect, an embodiment of this application provides a computer-readable storage medium. The computer-readable storage medium stores program code, and the program code includes an instruction used to perform some or all steps of any method in the first aspect.

According to a sixth aspect, an embodiment of this application provides a computer program product. When the computer program product is run on a computer, the computer is enabled to perform some or all steps of any method in the first aspect.

It should be understood that technical solutions in the second to the sixth aspects of this application are consistent with technical solutions in the first aspect of this application, and beneficial effects achieved by the aspects and corresponding feasible implementations are similar. Details are not described again.

According to a seventh aspect, an embodiment of this application discloses a decoding method. The method includes: parsing a bitstream to obtain an index, where the index is used to indicate a target candidate motion vector group of a current coding block (for example, a current affine coding block); determining the target candidate motion vector group in an affine candidate motion vector list (which is also referred to as a candidate motion vector list) based on the index (optionally, when a length of the affine candidate motion vector list is 1, the bitstream does not need to be parsed to obtain the index, but the target motion vector group can be directly determined), where the target candidate motion vector group represents motion vector predictors of a group of control points of the current coding block, the affine candidate motion vector list includes at least a first candidate motion vector group, the first candidate motion vector group is obtained based on a first group of control points of a first neighboring affine coding block, and the first group of control points of the first neighboring affine coding block are control points determined based on a coding tree unit CTU located relative to the current coding block, wherein the first neighboring affine coding block is located in the CTU, or the first group of control points of the first neighboring affine coding block includes a bottom-left control point and a bottom-right control point of the first neighboring affine coding block; obtaining motion vectors of one or more sub-blocks of the current coding block based on the target candidate motion vector group; and predicting a predicted sample value of the current coding block based on the motion vectors of the one or more sub-blocks of the current coding block.

Optionally, for example, a manner of constructing the affine candidate motion vector list may be: determining one or more neighboring affine coding blocks of the current coding block in an order of a neighboring block A, a neighboring block B, a neighboring block C, a neighboring block D, and a neighboring block E (as shown in FIG. 7A), where the one or more neighboring affine coding blocks include the first neighboring affine coding block; and obtaining motion vector predictors of a first group of control points of the current coding block by using a first affine model, where the motion vector predictors of the first group of control points of the current coding block are used as the first candidate motion vector group in the affine candidate motion vector list, and a model parameter of the first affine model is determined based on motion vectors of the first group of control points of the first neighboring affine coding block and location coordinates of the first group of control points of the first neighboring affine coding block.

In the foregoing method, the affine candidate motion vector list may include only one candidate motion vector group, or may include a plurality of candidate motion vector groups. Each candidate motion vector group may be a motion vector 2-tuple or a motion vector triplet. When there are a plurality of candidate motion vector groups, the first candidate motion vector group is one of the plurality of candidate motion vector groups. A derivation process of another candidate motion vector group in the plurality of candidate motion vector groups may be the same as a derivation process of the first candidate motion vector group, or may be different from a derivation process of the first candidate motion vector group. Further, the target candidate motion vector group is a candidate motion vector group selected from the affine candidate motion vector list based on the index obtained from the bitstream through parsing. If the index points to the first candidate motion vector group, the target candidate motion vector group is the first candidate motion vector group. If the index points to another candidate motion vector group, the target candidate motion vector group is not the first candidate motion vector group. The first neighboring affine coding block is a specific affine coding block in neighboring blocks of the current coding block, and is not specifically limited herein. FIG. 7A is used as an example for description. The first neighboring affine coding block may be a coding block at a neighboring location A, a coding block at a neighboring location B, or another neighboring coding block. In addition, "first", "second", "third", and the like that appear in other places in the embodiments of this application each indicate a specific object. A specific object indicated by "first", a specific object indicated by "second", and a specific object indicated by "third" represent different objects. For example, if a first group of control points and a second group of control points exist, the first group of control points and the second group of control points represent different control points. In addition, "first", "second", and the like in the embodiments of this application do not mean an order.

It may be understood that, when the coding tree unit CTU in which the first neighboring affine coding block is located is above the current coding block, information about lowermost control points of the first neighboring affine coding block has been read from memory. When the coding tree unit CTU in which the first neighboring affine coding block is located is on the left of the current coding block, information about rightmost control points of the first neighboring affine coding block has been read from memory. Therefore, in the foregoing solution, in a process of constructing a candidate motion vector based on the first group of control points of the first neighboring affine coding block, the first group of control points are control points determined based on the location relationship between the current coding block and the coding tree unit CTU in which the first neighboring affine coding block is located, or the first group of control points includes the bottom-left control point and the bottom-right control point of the first neighboring affine coding block, instead of fixedly using a top-left control point, a top-right control point, and a bottom-left control point of a first neighboring coding block as a first group of control points (or fixedly using a top-left control point and a top-right control point of a first neighboring coding block as a first group of control points) in the prior art. Therefore, according to the method of determining the first group of control points in this application, there is a very high probability that the information that has been read from the memory can be directly reused as information (for example, location coordinates and motion vectors) about the first group of control points, thereby reducing a quantity of times of reading from the memory and improving decoding performance.

In a possible implementation, that the first candidate motion vector group is obtained based on a first group of control points of a first neighboring affine coding block is specifically: the first candidate motion vector group is obtained based on a first affine model (for example, obtained based on the first affine model and location coordinates of a group of control points of the current coding block), and the first affine model is determined based on motion vectors and location coordinates of the first group of control points of the first neighboring affine coding block. In this case, the obtaining motion vectors of one or more sub-blocks of the current coding block based on the target candidate motion vector group is specifically: obtaining the motion vectors of the one or more sub-blocks of the current coding block based on a second affine model (for example, obtaining the motion vectors of the one or more sub-blocks of the current coding block based on the second affine model and location coordinates of the one or more sub-blocks of the current coding block), where the second affine model is determined based on the target candidate motion vector group and location coordinates of a group of control points of the current coding block.

In another optional solution, the affine candidate motion vector list further includes a second candidate motion vector group, and the second candidate motion vector group is obtained based on a second group of control points of a second neighboring affine coding block. Locations of one or more control points in the second group of control points of the second neighboring affine coding block relative to the second neighboring affine coding block are different from locations of one or more control points in the first group of control points of the first neighboring affine coding block relative to the first neighboring affine coding block (for example, the control points included in the first group of control points of the first neighboring affine coding block are a bottom-left control point, a bottom-right control point, and a top-left control point of the first neighboring affine coding block, but the control points included in the second group of control points of the second neighboring affine coding block are a top-right control point, a bottom-right control point, and a bottom-left control point of the second neighboring affine coding block), or the second group of control points of the second neighboring affine coding block includes a bottom-left control point and a bottom-right control point of the second neighboring affine coding block.

In an optional solution, in an advanced motion vector prediction AMVP mode, the obtaining motion vectors of one or more sub-blocks of the current coding block based on the target candidate motion vector group may specifically include: obtaining a new candidate motion vector group based on a motion vector difference MVD obtained from the bitstream through parsing and the target candidate motion vector group indicated by the index; and then obtaining the motion vectors of the one or more sub-blocks of the current coding block based on the new candidate motion vector group. For example, the second affine model is first determined based on the new candidate motion vector group and location coordinates of a group of control points of the current coding block, and the motion vectors of the one or more sub-blocks of the current coding block are obtained based on the second affine model. For example, the motion vectors of the one or more sub-blocks of the current coding block are obtained based on the second affine model and the location coordinates of the one or more sub-blocks of the current coding block.

In another possible implementation, in a merge mode, the predicting a predicted sample value of the current coding block based on the motion vectors of the one or more sub-blocks of the current coding block may specifically include: predicting the predicted sample value of the current coding block based on the motion vectors of the one or more sub-blocks of the current coding block and a reference frame index and a prediction direction that is indicated by the index.

In another possible implementation, that the first group of control points of the first neighboring affine coding block are control points determined based on a coding tree unit CTU located relative to the current coding block, wherein the first neighboring affine coding block is located in the CTU may include: if the first neighboring affine coding block is located in a coding tree unit CTU above the current coding block, the first group of control points of the first neighboring affine coding block includes a bottom-left control point and a bottom-right control point of the first neighboring affine coding block. When the coding tree unit CTU in which the first neighboring affine coding block is located is above the current coding block, information about lowermost control points of the first neighboring affine coding block has been read from memory. Therefore, in the foregoing solution, in a process of constructing a candidate motion vector based on the first group of control points of the first neighboring affine coding block, the first group of control points includes the bottom-left control point and the bottom-right control point (both belong to the lowermost control points) of the first neighboring affine coding block, and it is clear that information about the two control points does not need to be additionally read from the memory, thereby reducing a quantity of times of reading from the memory and improving decoding performance.

In another optional solution, if the first neighboring affine coding block is located in the CTU above the current block, the first group of control points of the first neighboring affine coding block further includes a top-left control point or a top-right control point of the first neighboring affine coding block. It may be understood that when the first group of control points includes three control points, precision of the first candidate motion vector group calculated based on the first group of control points is higher.

Optionally, both location coordinates ($x_6$, $y_6$) of the bottom-left control point and location coordinates ($x_7$, $y_7$) of the bottom-right control point of the first neighboring affine coding block are calculated and derived based on location coordinates ($x_4$, $y_4$) of the top-left control point of the first neighboring affine coding block. The location coordinates ($x_6$, $y_6$) of the bottom-left control point of the first neighboring affine coding block are ($x_4$, $y_4$+cuH), and the location coordinates ($x_7$, $y_7$) of the bottom-right control point of the first neighboring affine coding block are ($x_4$+cuW, $y_4$+cuH), where cuW is the width of the first neighboring affine coding block, and cuH is the height of the first neighboring affine coding block. In addition, a motion vector of the bottom-left control point of the first neighboring affine coding block is a motion vector of a bottom-left sub-block of the first neighboring affine coding block, and a motion vector of the bottom-right control point of the first neighboring affine coding block is a motion vector of a bottom-right sub-block of the first neighboring affine coding block. It can be learned that in this case, a horizontal distance between the bottom-left control point and the bottom-right control point of the first neighboring affine coding block is cuW, and a horizontal distance between the top-left control point and the top-right control point of the first neighboring affine coding block is cuW. Because cuW is usually a power of 2, in a process of deriving a motion vector of a control point of the current coding block, a right-shifting manner may be used instead of a division operation, to reduce implementation complexity.

It can be learned that both the location coordinates of the bottom-left control point and the location coordinates of the bottom-right control point of the first neighboring affine coding block are obtained through derivation, rather than being read from the memory. Therefore, according to this method, a quantity of times of reading from the memory can be further reduced and decoding performance can be improved. In another optional solution, the location coordinates of the bottom-left control point and the location coordinates of the bottom-right control point may be alternatively pre-stored in the memory, and read from the memory for use when necessary.

In another possible implementation, that the first group of control points of the first neighboring affine coding block are control points determined based on a coding tree unit CTU located relative to the current coding block, wherein the first neighboring affine coding block is located in the CTU may include: if the first neighboring affine coding block is located in a CTU on the left of the current coding block, the first group of control points of the first neighboring affine coding block includes a top-right control point and a bottom-right control point of the first neighboring affine coding block. When the coding tree unit CTU in which the first neighboring affine coding block is located is on the left of the current coding block, information about rightmost control points of the first neighboring affine coding block has been read from memory. Therefore, in the foregoing solution, in a process of constructing a candidate motion vector based on the first group of control points of the first neighboring affine coding block, the first group of control points includes the top-right control point and the bottom-right control point (both belong to the rightmost control points) of the first neighboring affine coding block, and it is clear that information about the two control points does not need to be additionally read from the memory, thereby reducing a quantity of times of reading from the memory and improving decoding performance.

In another possible implementation, if the first neighboring affine coding block is located in the CTU on the left of the current coding block, the first group of control points of the first neighboring affine coding block further includes a top-left control point or a bottom-left control point of the first neighboring affine coding block. It may be understood that when the first group of control points includes three control points, precision of the first candidate motion vector group calculated based on the first group of control points is higher.

Optionally, both location coordinates ($x_5$, $y_5$) of the top-right control point and location coordinates ($x_7$, $y_7$) of the bottom-right control point of the first neighboring affine coding block are calculated based on location coordinates ($x_4$, $y_4$) of the top-left control point of the first neighboring affine coding block. The location coordinates ($x_5$, $y_5$) of the top-right control point of the first neighboring affine coding block are ($x_4$+cuW, $y_4$), and the location coordinates ($x_7$, $y_7$) of the bottom-right control point of the first neighboring affine coding block are ($x_4$+cuW, $y_4$+cuH), where cuW is the width of the first neighboring affine coding block, and cuH is the height of the first neighboring affine coding block. In addition, a motion vector of the top-right control point of the first neighboring affine coding block is a motion vector of a top-right sub-block of the first neighboring affine coding block, and a motion vector of the bottom-right control point of the first neighboring affine coding block is a motion vector of a bottom-right sub-block of the first neighboring affine coding block. It can be learned that in this case, a horizontal distance between the bottom-left control point and the bottom-right control point of the first neighboring affine coding block is cuW, and a horizontal distance between the top-left control point and the top-right control point of the first neighboring affine coding block is cuW. Because cuW is usually a power of 2, in a process of deriving a motion vector of a control point of the current coding block, a right-shifting manner may be used instead of a division operation, to reduce implementation complexity. It can be learned that both the location coordinates of the top-right control point and the location coordinates of the bottom-right control point of the first neighboring affine coding block are obtained through derivation, rather than being read from the memory. Therefore, according to this method, a quantity of times of reading from the memory can be further reduced and decoding performance can be improved. In another optional solution, the location coordinates of the top-right control point and the location coordinates of the bottom-right control point may be alternatively pre-stored in the memory, and read from the memory for use when necessary.

In another possible implementation, when the first group of control points of the first neighboring affine coding block includes the bottom-left control point and the bottom-right control point of the first neighboring affine coding block, the first group of control points of the first neighboring affine coding block further includes a top-left control point of the first neighboring affine coding block. It may be understood that when the first group of control points includes three control points, precision of the first candidate motion vector group calculated based on the first group of control points is higher.

In another optional solution, when the motion vectors of the one or more sub-blocks of the current coding block are obtained based on the target candidate motion vector group, if a bottom boundary of the current coding block overlaps a bottom boundary of a CTU in which the current coding block is located, a motion vector of a sub-block at the bottom-left corner of the current coding block is obtained through calculation based on an affine model of the current coding block and location coordinates (0, H) of the bottom-left corner of the current coding block, and a motion vector of a sub-block at the bottom-right corner of the current coding block is obtained through calculation based on the affine model of the current coding block and location coordinates (W, H) of the bottom-right corner of the current coding block. For example, the affine model is constructed based on the target candidate motion vector group and location coordinates of a group of control points of the current coding block. A model parameter of the affine model is obtained based on the target candidate motion vector and the location coordinates of the group of control points of the current coding block. The motion vector of the sub-block at the bottom-left corner of the current coding block can be obtained by substituting the location coordinates (0, H) of the bottom-left corner of the current coding block into the affine model (rather than substituting coordinates of a central point of the sub-block at the bottom-left corner into the affine model for calculation), and the motion vector of the sub-block at the bottom-right corner of the current coding block can be obtained by substituting the location coordinates (W, H) of the bottom-right corner of the current coding block into the affine model (rather than substituting coordinates of a central point of the sub-block at the bottom-right corner into the affine model for calculation). In this way, when a motion vector of a bottom-left control point and a motion vector of a bottom-right control point of the current coding block are used (for example, an affine candidate motion vector list of another block is subsequently constructed based on the motion vectors of the bottom-left control point and the bottom-right control point of the current block), accurate values rather than estimated values are used. W is the width of the current coding block, and H is the height of the current coding block.

Optionally, for any coding block (such as the current coding block or a neighboring coding block), if location coordinates of a top-left control point of the coding block are (x, y), coordinates of a top-right control point of the coding block are (x+w, y), coordinates of a bottom-left control point of the coding block are (x, y+h), and coordinates of a bottom-right control point of the coding block are (x+w, y+h). w is the width of the coding block, and h is the height of the coding block.

According to an eighth aspect, an embodiment of this application provides a video decoder, including several function units configured to implement any method in the seventh aspect. For example, the video decoder may include:

an entropy decoding unit, configured to parse a bitstream to obtain an index, where the index is used to indicate a target candidate motion vector group of a current coding block; and an inter prediction unit, configured to: determine the target candidate motion vector group in an affine candidate motion vector list based on the index, where the target candidate motion vector group represents motion vector predictors of a group of control points of the current coding block, the affine candidate motion vector list includes at least a first candidate motion vector group, the first candidate motion vector group is obtained based on a first group of control points of a first neighboring affine coding block, and the first group of control points of the first neighboring affine coding block are control points determined based on a coding tree unit CTU located relative to the current coding block, wherein the first neighboring affine coding block is located in the CTU, or the first group of control points of the first neighboring affine coding block includes a bottom-left control point and a bottom-right control point of the first neighboring affine coding block; obtain motion vectors of one or more sub-blocks of the current coding block based on the target candidate motion vector group; and predict a predicted sample value of the current coding block based on the motion vectors of the one or more sub-blocks of the current coding block.

According to a ninth aspect, an embodiment of this application provides a video data decoding device, including a video decoder configured to implement any method in the seventh aspect. For example, the device may include:

a memory, configured to store video data in a form of a bitstream; and the video decoder, configured to: parse a bitstream to obtain an index, where the index is used to indicate a target candidate motion vector group of a current coding block; determine the target candidate motion vector group in an affine candidate motion vector list based on the index, where the target candidate motion vector group represents motion vector predictors of a group of control points of the current coding block, the affine candidate motion vector list includes at least a first candidate motion vector group, the first candidate motion vector group is obtained based on a first group of control points of a first neighboring affine coding block, and the first group of control points of the first neighboring affine coding block are control points determined based on a coding tree unit CTU located relative to the current coding block, wherein the first neighboring affine coding block is located in the CTU, or the first group of control points of the first neighboring affine coding block includes a bottom-left control point and a bottom-right control point of the first neighboring affine coding block; obtain motion vectors of one or more sub-blocks of the current coding block based on the target candidate motion vector group; and predict a predicted sample value of the current coding block based on the motion vectors of the one or more sub-blocks of the current coding block.

According to a tenth aspect, an embodiment of this application provides a video data decoding device. The device includes a nonvolatile memory and a processor that are coupled to each other. The memory is configured to store a program instruction. The processor is configured to invoke the program code to perform some or all steps of the seventh aspect and any method in the seventh aspect. For example, the processor is configured to invoke the program code to perform the following steps:

parsing a bitstream to obtain an index, where the index is used to indicate a target candidate motion vector group of a current coding block; determining the target candidate motion vector group in an affine candidate motion vector list based on the index, where the target candidate motion vector group represents motion vector predictors of a group of control points of the current coding block, the affine candidate motion vector list includes at least a first candidate motion vector group, the first candidate motion vector group is obtained based on a first group of control points of a first neighboring affine coding block, and the first group of control points of the first neighboring affine coding block are control points determined based on a coding tree unit CTU located relative to the current coding block, wherein the first neighboring affine coding block is located in the CTU, or the first group of control points of the first neighboring affine coding block includes a bottom-left control point and a bottom-right control point of the first neighboring affine coding block; obtaining motion vectors of one or more sub-blocks of the current coding block based on the target candidate motion vector group; and predicting a predicted sample value of the current coding block based on the motion vectors of the one or more sub-blocks of the current coding block.

According to an eleventh aspect, an embodiment of this application provides a computer-readable storage medium. The computer-readable storage medium stores program code, and the program code includes an instruction used to perform some or all steps of any method in the seventh aspect.

According to a twelfth aspect, an embodiment of this application provides a computer program product. When the computer program product is run on a computer, the computer is enabled to perform some or all steps of any method in the seventh aspect.

It should be understood that technical solutions in the eighth to the twelfth aspects of this application are consistent with technical solutions in the seventh aspect of this application, and beneficial effects achieved by the aspects and corresponding feasible implementations are similar. Details are not described again.

BRIEF DESCRIPTION OF DRAWINGS

To describe the technical solutions in the embodiments of this application more clearly, the following describes the accompanying drawings for describing the embodiments of this application.

DESCRIPTION OF EMBODIMENTS

The following describes the embodiments of this application with reference to the accompanying drawings in the embodiments of this application.

For encoding of a video stream or a part of a video stream, such as a video frame or a picture block, temporal and spatial similarities in the video stream may be used to improve encoding performance. For example, for a current picture block in the video stream, motion information used for the current picture block may be predicted based on a previously encoded block in the video stream, and a difference (also referred to as a residual) between a prediction block and the current picture block (that is, an original block) is identified, to encode the current picture block based on the previously encoded block. According to this method, only the residual used to generate the current picture block and some parameters, rather than the entire current picture block, are included in a digital video output bitstream. This technology may be referred to as inter prediction.

A motion vector is an important parameter in an inter prediction process, and represents a spatial displacement of the previously encoded block relative to the current coding block. A motion estimation method, such as motion search, may be used to obtain the motion vector. In an early inter prediction technology, a bit representing a motion vector is included in an encoded bitstream, to allow a decoder to reproduce a prediction block, thereby obtaining a reconstructed block. To further improve encoding efficiency, it is further proposed to differentially encode a motion vector by using a reference motion vector, that is, to encode only a difference between the motion vector and the reference motion vector instead of encoding the entire motion vector. In some cases, a reference motion vector may be selected from motion vectors previously used in a video stream. Selecting a previously used motion vector to encode a current motion vector can further reduce a quantity of bits included in an encoded video bitstream.

Figure 1A:
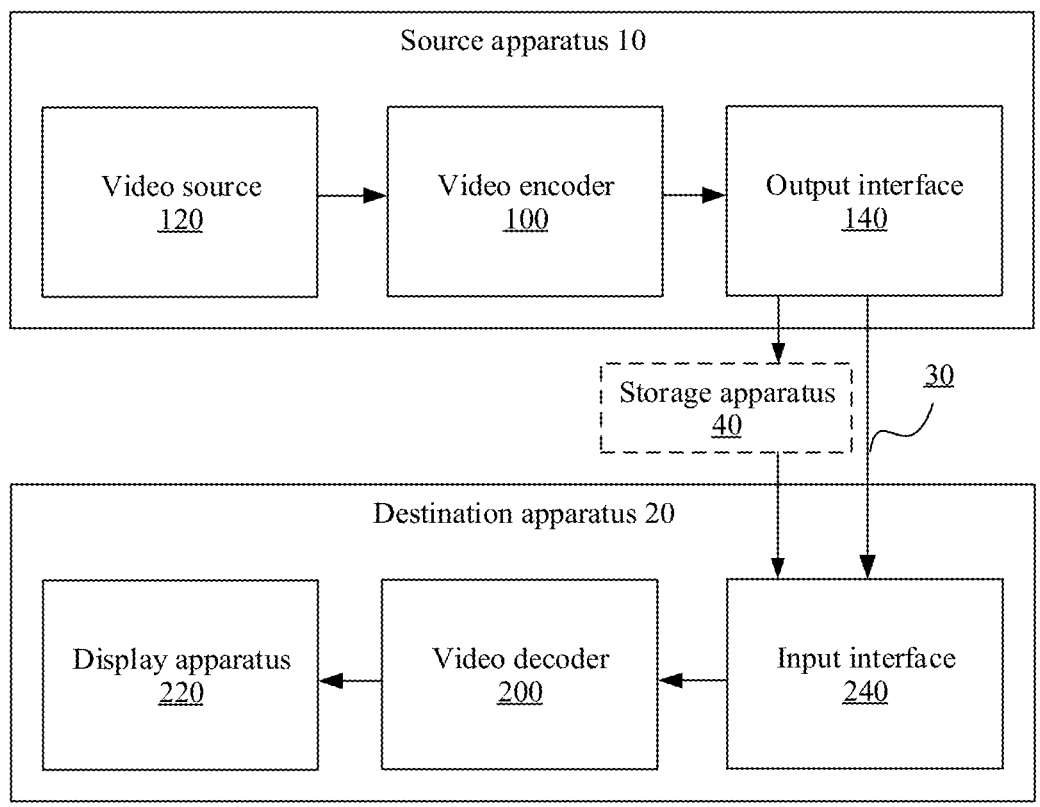
FIG. 1A is a schematic block diagram of a video encoding and decoding system according to an embodiment of this application.

FIG. 1A is a block diagram of an example video coding system 1 according to an embodiment of this application. As used in this specification, the term "video codec" usually refers to a video encoder and a video decoder. In this application, the term "video coding" or "coding" may usually refer to video encoding or video decoding. A video encoder 100 and a video decoder 200 in the video coding system 1 are configured to predict motion information, for example, a motion vector, of a current coded picture block or a sub-block of the current coded picture block according to various method examples described in any one of a plurality of new inter prediction modes provided in this application, so that the predicted motion vector is maximally close to a motion vector obtained by using a motion estimation method. In this way, a motion vector difference does not need to be transmitted during encoding, thereby further improving encoding and decoding performance.

As shown in FIG. 1A, the video coding system 1 includes a source apparatus 10 and a destination apparatus 20. The source apparatus 10 generates encoded video data. Therefore, the source apparatus 10 may be referred to as a video encoding apparatus. The destination apparatus 20 may decode the encoded video data generated by the source apparatus 10. Therefore, the destination apparatus 20 may be referred to as a video decoding apparatus. Various implementation solutions of the source apparatus 10, the destination apparatus 20, or both the source apparatus 10 and the destination apparatus 20 may include one or more processors and a memory coupled to the one or more processors. The memory may include but is not limited to a RAM, a ROM, an EEPROM, a flash memory, or any other medium that can be used to store required program code in a form of an instruction or a data structure that can be accessed by a computer, as described in this specification. For ease of understanding, FIG. 1B further shows a scenario in which video data is collected, encoded, and sent by the source apparatus 10 and is received, decoded, and rendered by the destination apparatus 20.

The source apparatus 10 and the destination apparatus 20 may include various apparatuses, including a desktop computer, a mobile computing apparatus, a notebook (for example, laptop) computer, a tablet computer, a set top box, a handheld telephone set such as a "smart" phone, a television set, a camera, a display apparatus, a digital media player, a video game console, an in-vehicle computer, and similar apparatuses.

The destination apparatus 20 may receive the encoded video data from the source apparatus 10 through a link 30. The link 30 may include one or more media or apparatuses that can transfer the encoded video data from the source apparatus 10 to the destination apparatus 20. In an example, the link 30 may include one or more communications media that enable the source apparatus 10 to directly transmit the encoded video data to the destination apparatus 20 in real time. In this example, the source apparatus 10 may modulate the encoded video data according to a communications standard (for example, a wireless communications protocol), and may transmit the modulated video data to the destination apparatus 20. The one or more communications media may include a wireless communications medium and/or a wired communications medium, for example, a radio frequency (RF) spectrum or one or more physical transmission lines. The one or more communications media may be a part of a packet-based network, and the packet-based network is, for example, a local area network, a wide area network, or a global network (for example, the internet). The one or more communications media may include a router, a switch, a base station, or another device facilitating communication from the source apparatus 10 to the destination apparatus 20.

In another example, the encoded data may be output to a storage apparatus 40 through an output interface 140. Similarly, the encoded data may be accessed from the storage apparatus 40 through an input interface 240. The storage apparatus 40 may include any one of a plurality of distributed or locally accessed data storage media, for example, a hard disk drive, a Blu-ray disc, a DVD, a CD-ROM, a flash memory, a volatile or nonvolatile memory, or any other suitable digital storage medium configured to store encoded video data.

In another example, the storage apparatus 40 may correspond to a file server or another intermediate storage apparatus that can maintain an encoded video generated by the source apparatus 10. The destination apparatus 20 may access the stored video data from the storage apparatus 40 through streaming transmission or downloading. The file server may be any type of server capable of storing the encoded video data and transmitting the encoded video data to the destination apparatus 20. For example, the file server may be a network server (for example, used for a website), an FTP server, a network-attached storage (NAS) apparatus, or a local disk drive. The destination apparatus 20 may access the encoded video data through any standard data connection (including an internet connection). The standard data connection may include a wireless channel (for example, a Wi-Fi connection), a wired connection (for example, a DSL or a cable modem), or a combination thereof that is suitable for accessing the encoded video data stored in the file server. Transmission of the encoded video data from the storage apparatus 40 may be streaming transmission, downloading transmission, or a combination thereof.

A motion vector prediction technology in this application may be used for video coding and decoding, to support a plurality of multimedia applications, for example, over-the-air television broadcast, cable television transmission, satellite television transmission, streaming video transmission (for example, over the internet), encoding of video data stored in a data storage medium, decoding of video data stored in a data storage medium, or other applications. In some examples, the video coding system 1 may be configured to support unidirectional or bidirectional video transmission, to support applications such as video streaming transmission, video playback, video broadcasting, and/or videotelephony.

The video coding system 1 described in FIG. 1A is merely an example, and the technology in this application is applicable to a video coding setting (for example, video coding or video decoding) that does not necessarily include any data communication between an encoding apparatus and a decoding apparatus. In another example, data is retrieved from a local memory, is transmitted on a network in a streaming manner, and the like. The video encoding apparatus may encode the data and store the data in the memory, and/or the video decoding apparatus may retrieve the data from the memory and decode the data. In many examples, apparatuses that only encode data and store the data in the memory and/or retrieve the data from the memory and decode the data and that do not communicate with each other perform encoding and decoding.

In the example in FIG. 1A, the source apparatus 10 includes a video source 120, the video encoder 100, and the output interface 140. In some examples, the output interface 140 may include a modulator/demodulator (modem) and/or a transmitter. The video source 120 may include a video capturing apparatus (for example, a camera), a video archive including previously captured video data, a video feed-in interface for receiving video data from a video content provider, and/or a computer graphics system for generating video data, or a combination of the foregoing video data sources.

The video encoder 100 may encode video data that is from the video source 120. In some examples, the source apparatus 10 directly transmits the encoded video data to the destination apparatus 20 through the output interface 140. In another example, the encoded video data may be alternatively stored in the storage apparatus 40, so that the destination apparatus 20 subsequently accesses the encoded video data for decoding and/or playing.

In the example in FIG. 1A, the destination apparatus 20 includes the input interface 240, the video decoder 200, and a display apparatus 220. In some examples, the input interface 240 includes a receiver and/or a modem. The input interface 240 may receive the encoded video data through the link 30 and/or from the storage apparatus 40. The display apparatus 220 may be integrated with the destination apparatus 20 or may be located outside the destination apparatus 20. Usually, the display apparatus 220 displays decoded video data. The display apparatus 220 may include a plurality of types of display apparatuses, for example, a liquid crystal display (LCD), a plasma display, an organic light-emitting diode (OLED) display, or another type of display apparatus.

Although not shown in FIG. 1A, in some aspects, the video encoder 100 and the video decoder 200 may be respectively integrated with an audio encoder and an audio decoder, and may include an appropriate multiplexer-demultiplexer unit or other hardware and software, to encode audio and a video in a combined data stream or a separate data stream. In some examples, if applicable, the MUX-DEMUX unit may comply with the ITU H.223 multiplexer protocol, or another protocol such as the user datagram protocol (UDP).

The video encoder 100 and the video decoder 200 each may be implemented as, for example, any one of the following plurality of circuits: one or more microprocessors, a digital signal processor (DSP), an application-specific integrated circuit (ASIC), a field programmable gate array (FPGA), discrete logic, hardware, or any combination thereof. If this application is implemented partially through software, the apparatus may store, in an appropriate non-volatile computer-readable storage medium, an instruction used for the software, and may use one or more processors to execute the instruction in hardware, to implement the technology in this application. Any one of the foregoing content (including hardware, software, a combination of hardware and software, and the like) may be considered as one or more processors. The video encoder 100 and the video decoder 200 each may be included in one or more encoders or decoders, and the encoder or the decoder may be integrated as a part of a combined encoder/decoder (codec) in a corresponding apparatus.

In this application, the video encoder 100 may be roughly referred to as another apparatus "signaling" or "transmitting" some information to, for example, the video decoder 200. The term "signaling" or "transmitting" may roughly refer to transfer of a syntax element and/or other data used to decode compressed video data. The transfer may occur in real time or almost in real time. Alternatively, the communication may occur after a period of time. For example, the communication may occur when a syntax element in an encoded bitstream is stored in a computer-readable storage medium during encoding, and the decoding apparatus may then retrieve the syntax element at any time after the syntax element is stored in the medium.

The video encoder 100 and the video decoder 200 may operate according to a video compression standard, such as high efficiency video coding (HEVC), or an extension thereof, and may comply with an HEVC test model (HM). Alternatively, the video encoder 100 and the video decoder 200 may operate according to another industry standard, for example, the ITU-T H.264 standard, the H.265 standard, or an extension of such standard. However, the technologies in this application are not limited to any specific encoding and decoding standards.

Figure 3:
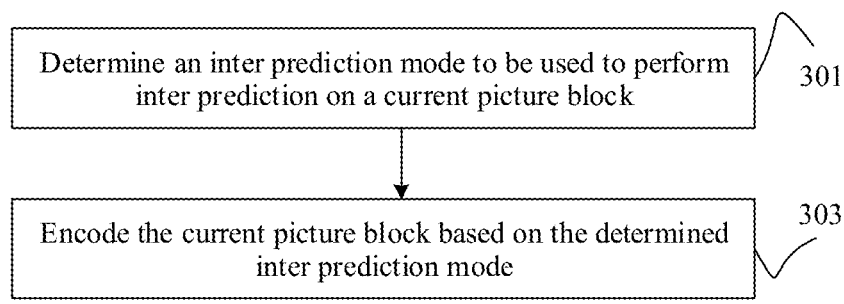
FIG. 3 is a flowchart of an inter prediction method for video picture encoding according to an embodiment of this application.

In an example, referring to FIG. 3 together, the video encoder 100 is configured to encode a syntax element related to a current to-be-encoded picture block into a digital video output bitstream (which is briefly referred to as a bitstream). Herein, the syntax element used to perform inter prediction on the current picture block is briefly referred to as inter prediction data. To determine an inter prediction mode to be used to encode the current picture block, the video encoder 100 is further configured to: determine or select (S301) an inter prediction mode to be used to perform inter prediction on the current picture block in a candidate inter prediction mode set (for example, select an inter prediction mode with compromised or lowest rate-distortion costs of encoding the current picture block in a plurality of new inter prediction modes); and encode the current picture block based on the determined inter prediction mode (S303). The encoding process herein may include: predicting motion information of one or more sub-blocks in the current picture block based on the determined inter prediction mode (where the motion information may be specifically motion information of each sub-block or motion information of all sub-blocks), and predicting predicted sample values of the one or more sub-blocks by using the motion information of the one or more sub-blocks in the current picture block, to obtain a prediction block of the current picture block.

It should be understood that, if a difference (that is, a residual) between the prediction block generated by using the motion information predicted based on the inter prediction mode and the current to-be-encoded picture block (that is, an original block) is 0, the video encoder 100 needs to encode only the syntax element related to the current to-be-encoded picture block into the bitstream (also referred to as a bitstream). Otherwise, in addition to the syntax element, a corresponding residual further needs to be encoded into the bitstream.

Figure 4:
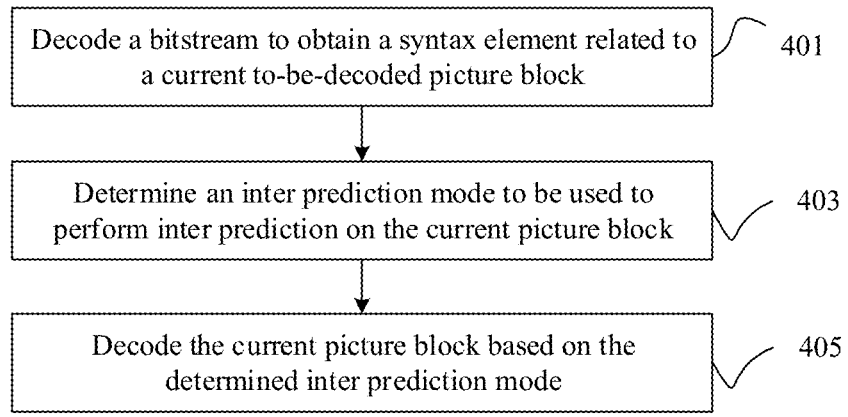
FIG. 4 is a flowchart of an inter prediction method for video picture decoding according to an embodiment of this application.

In another example, referring to FIG. 4 together, the video decoder 200 is configured to: decode a bitstream to obtain a syntax element related to a current to-be-decoded picture block (S401), and when the inter prediction data indicates to use a specific inter prediction mode (for example, an advanced motion vector prediction (Advanced Motion Vector Prediction, AMVP) mode, a merge (merge) mode, an affine merge affine_merge mode, or an affine motion vector prediction affine_inter mode) to predict the current picture block (S403), decode the current picture block based on the determined inter prediction mode (S405). The decoding process herein may include: predicting motion information of one or more sub-blocks in the current picture block, and performing inter prediction on the current picture block by using the motion information of the one or more sub-blocks in the current picture block.

Optionally, if the inter prediction data further includes an index used to indicate a target candidate motion vector group of the current picture block, the video decoder 200 is configured to determine the target candidate motion vector group in an affine candidate motion vector list. The target candidate motion vector group represents motion vector predictors of a group of control points of the current picture block. It should be understood that, if the video decoder 200 uses the merge mode, the motion vector predictors that are of the group of control points of the current picture block and that are represented by the target candidate motion vector group are used as motion vectors of the group of control points of the current picture block.

Figure 2A:
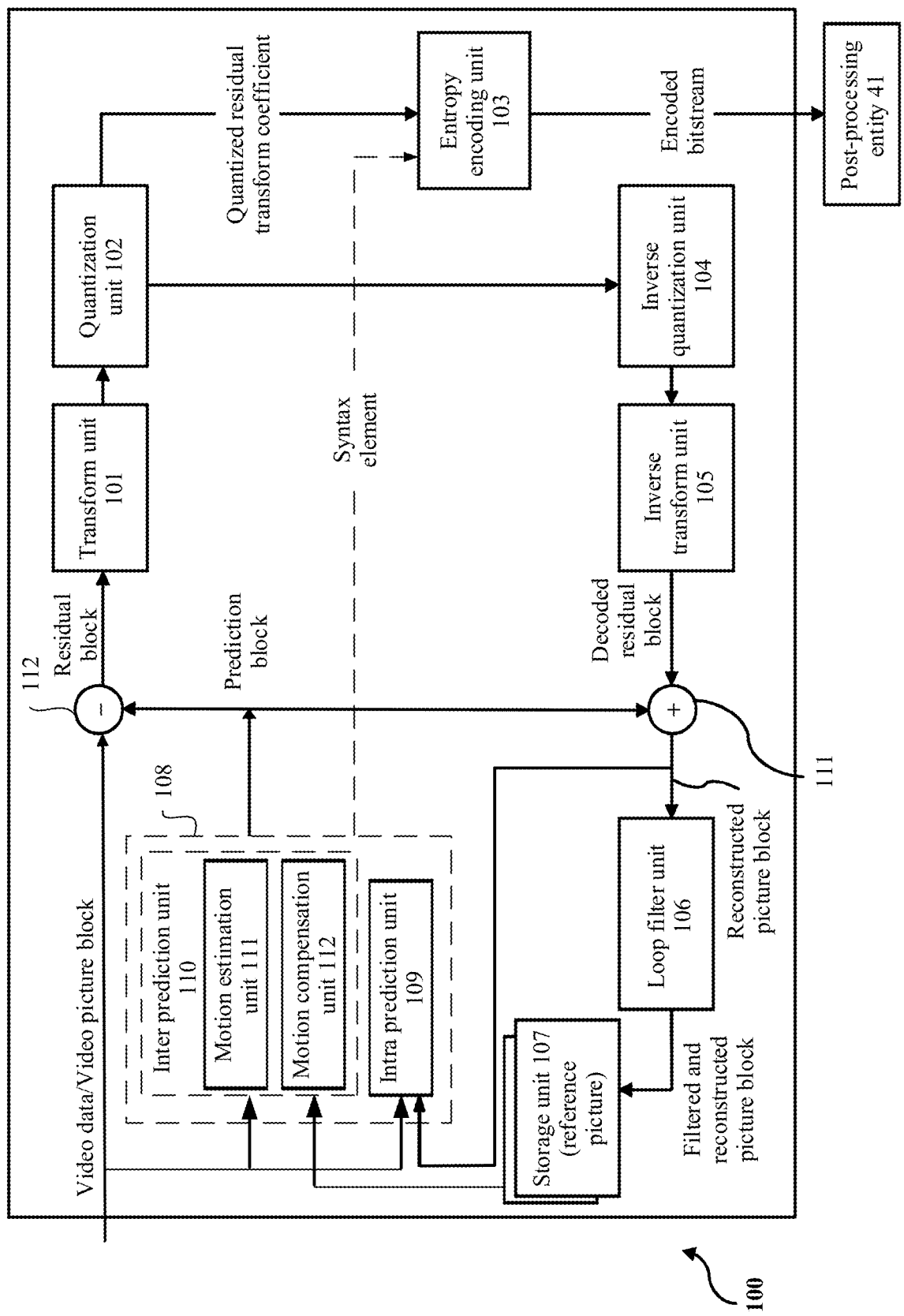
FIG. 2A is a schematic block diagram of a video encoder according to an embodiment of this application.

FIG. 2A is a block diagram of an example video encoder 100 according to an embodiment of this application. The video encoder 100 is configured to output a video to a post-processing entity 41. The post-processing entity 41 represents an example of a video entity capable of processing encoded video data that is from the video encoder 100. For example, the video entity is a media aware network element (MANE) or a stitching apparatus/an editing apparatus. In some cases, the post-processing entity 41 may be an example of a network entity. In some video coding systems, the post-processing entity 41 and the video encoder 100 may be components of separate apparatuses, while in other cases, functions described with respect to the post-processing entity 41 may be implemented by a same apparatus including the video encoder 100. In an example, the post-processing entity 41 is an example of the storage apparatus 40 in FIG. 1A.

The video encoder 100 may encode a video picture block, for example, perform inter prediction on the video picture block, based on any new inter prediction mode in a candidate inter prediction mode set that includes modes 0, 1, 2, . . . , and 10 and that is proposed in this application.

In an example in FIG. 2A, the video encoder 100 includes a prediction processing unit 108, a filter unit 106, a decoded picture buffer (DPB) 107, a summation unit 114, a transform unit 101, a quantization unit 102, and an entropy encoding unit 103. The prediction processing unit 108 includes an inter prediction unit 110 and an intra prediction unit 109. For picture block reconstruction, the video encoder 100 further includes an inverse quantization unit 104, an inverse transform unit 105, and a summation unit 113. The filter unit 106 is intended to represent one or more loop filter units, for example, a deblocking filter unit, an adaptive loop filter (ALF) unit, and a sample adaptive offset (SAO) filter unit. Although the filter unit 106 is shown as an in-loop filter in FIG. 2A, in another implementation, the filter unit 106 may be implemented as a post filter. In an example, the video encoder 100 may further include a video data storage unit and a partitioning unit (not shown in the figure).

The video data storage unit may store video data encoded by a component of the video encoder 100. The video data stored in the video data storage unit may be obtained from a video source 120. The DPB 107 may be a reference picture storage unit that stores reference video data used by the video encoder 100 to encode the video data in an intra or inter coding mode. The video data storage unit and the DPB 107 each may include any one of a plurality of storage unit apparatuses, for example, a dynamic random access memory (DRAM) including a synchronous DRAM (SDRAM), a magnetoresistive RAM (MRAM), a resistive RAM (RRAM), or another type of storage unit apparatus. The video data storage unit and the DPB 107 may be provided by a same storage unit apparatus or separate storage unit apparatuses. In various examples, the video data storage unit may be integrated onto a chip together with other components of the video encoder 100, or may be disposed outside the chip relative to those components.

As shown in FIG. 2A, the video encoder 100 receives video data and stores the video data in the video data storage unit. The partitioning unit partitions the video data into several picture blocks, and these picture blocks may be further partitioned into smaller blocks. For example, picture block partitioning based on a quadtree structure or a binary-tree structure is performed. The partitioning may further include partitioning into slices (slice), tiles (tile), or other larger units. The video encoder 100 is usually a component for encoding a picture block in a to-be-encoded video slice. The slice may be partitioned into a plurality of picture blocks (and may be partitioned into picture block sets that are referred to as tiles). The prediction processing unit 108 may select one of a plurality of possible coding modes used for the current picture block, for example, one of a plurality of intra coding modes or one of a plurality of inter coding modes. The plurality of inter coding modes include but are not limited to one or more of the modes 0, 1, 2, 3, . . . , and 10 proposed in this application. The prediction processing unit 108 may provide obtained intra-coded and inter-coded blocks to the summation unit 114 to generate a residual block, and provide the blocks to the summation unit 113 to reconstruct an encoded block used as a reference picture.

The intra prediction unit 109 in the prediction processing unit 108 may perform intra predictive encoding on the current picture block relative to one or more neighboring blocks that are in a same frame or slice as the current to-be-encoded block, to remove spatial redundancy. The inter prediction unit 110 in the prediction processing unit 108 may perform inter predictive encoding on the current picture block relative to one or more prediction blocks in one or more reference pictures, to remove temporal redundancy.

Specifically, the inter prediction unit 110 may be configured to determine an inter prediction mode to be used to encode the current picture block. For example, the inter prediction unit 110 may calculate rate-distortion values of various inter prediction modes in a candidate inter prediction mode set through rate-distortion analysis, and select an inter prediction mode with an optimal rate-distortion characteristic from the inter prediction modes. Rate-distortion analysis is usually used to determine an amount of distortion (or error) between an encoded block and an original block that has not been encoded and that is to be encoded to generate the encoded block, and a bit rate (that is, a quantity of bits) used to generate the encoded block. For example, the inter prediction unit 110 may determine, as the inter prediction mode to be used to perform inter prediction on the current picture block, an inter prediction mode that has lowest rate-distortion costs and that is to be used to encode the current picture block. The following describes in detail an inter predictive encoding process, and in particular, a process of predicting motion information of one or more sub-blocks (which may be specifically each sub-block or all sub-blocks) in a current picture block in an affine mode (for example, an affine transformation-based advanced motion vector prediction mode or an affine transformation-based merge prediction mode) in this application. In other words, the following describes in detail a motion vector prediction process based on a motion model, for example, a 4-parameter affine model or a 6-parameter affine model.

The inter prediction unit 110 is configured to predict the motion information (for example, a motion vector) of the one or more sub-blocks in the current picture block based on the determined inter prediction mode, and obtain or generate a prediction block of the current picture block by using the motion information (for example, the motion vector) of the one or more sub-blocks in the current picture block. The inter prediction unit 110 may locate, in one reference picture in a reference picture list, the prediction block to which the motion vector points. The inter prediction unit 110 may further generate a syntax element associated with a picture block and a video slice, so that a video decoder 200 uses the syntax element to decode the picture block of the video slice. Alternatively, in an example, the inter prediction unit 110 performs a motion compensation process by using motion information of each sub-block, to generate a prediction block of each sub-block, so as to obtain a prediction block of the current picture block. It should be understood that the inter prediction unit 110 herein specifically includes a motion estimation unit 111 and a motion compensation unit 112. The motion estimation unit 111 is configured to perform a motion estimation (Motion estimation, ME) process, and the motion compensation unit 112 is configured to perform a motion compensation (Motion compensation, MC) process.

Specifically, after selecting the inter prediction mode for the current picture block, the inter prediction unit 110 may provide, for the entropy encoding unit 103, information indicating the selected inter prediction mode of the current picture block, so that the entropy encoding unit 103 encodes the information indicating the selected inter prediction mode. The intra prediction unit 109 may perform intra prediction on the current picture block. Specifically, the intra prediction unit 109 may determine an intra prediction mode to be used to encode the current block. For example, the intra prediction unit 109 may calculate rate-distortion values of various to-be-tested intra prediction modes through rate-distortion analysis, and select an intra prediction mode with an optimal rate-distortion characteristic from the to-be-tested modes. In any case, after selecting the intra prediction mode for the picture block, the intra prediction unit 109 may provide, for the entropy encoding unit 103, information indicating the selected intra prediction mode of the current picture block, so that the entropy encoding unit 103 encodes the information indicating the selected intra prediction mode.

After the prediction processing unit 108 generates the prediction block of the current picture block through inter prediction and intra prediction, the video encoder 100 subtracts the prediction block from the current to-be-encoded picture block to form a residual picture block. The summation unit 114 represents one or more components that perform the subtraction operation. Residual video data in the residual block may be included in one or more TUs, and used by the transform unit 101. The transform unit 101 transforms the residual video data into a residual transform coefficient through transform such as discrete cosine transform (DCT) or conceptually similar transform. The transform unit 101 may transform the residual video data from a sample value domain to a transform domain, for example, a frequency domain.

The transform unit 101 may send the obtained transform coefficients to the quantization unit 102. The quantization unit 102 quantizes the transform coefficient to further reduce a bit rate. In some examples, the quantization unit 102 may further scan a matrix including a quantized transform coefficient. Alternatively, the entropy encoding unit 103 may perform the scan.

After quantization, the entropy encoding unit 103 performs entropy encoding on the quantized transform coefficient. For example, the entropy encoding unit 103 may perform context-adaptive variable-length coding (CAVLC), context-adaptive binary arithmetic coding (CABAC), syntax-based context-adaptive binary arithmetic coding (SBAC), probability interval partitioning entropy (PIPE) coding, or another entropy coding method or technology. After the entropy encoding unit 103 performs entropy encoding, the encoded bitstream may be transmitted to the video decoder 200, or archived for subsequent transmission or to be retrieved by the video decoder 200. The entropy encoding unit 103 may further perform entropy encoding on a syntax element of the current to-be-encoded picture block.

The inverse quantization unit 104 and the inverse transform unit 105 respectively apply inverse quantization and inverse transform, to reconstruct the residual block in a sample domain, for example, for subsequent use as a reference block of a reference picture. The summation unit 113 adds the reconstructed residual block to the prediction block generated by the inter prediction unit 110 or the intra prediction unit 109, to generate a reconstructed picture block. The filter unit 106 is applicable to the reconstructed picture block to reduce distortion such as blocking artifacts (block artifacts). Then, the reconstructed picture block is stored as the reference block in the decoded picture buffer 107, and may be used as the reference block by the inter prediction unit 110 to perform inter prediction on a block in a subsequent video frame or picture.

It should be understood that other structural variants of the video encoder 100 may be used to encode a video stream. For example, for some picture blocks or picture frames, the video encoder 100 may directly quantize a residual signal. In this case, processing by the transform unit 101 and the inverse transform unit 105 is not required. Alternatively, for some picture blocks or picture frames, the video encoder 100 does not generate residual data. In this case, processing by the transform unit 101, the quantization unit 102, the inverse quantization unit 104, and the inverse transform unit 105 is not required. Alternatively, the video encoder 100 may directly store the reconstructed picture block as the reference block, and processing by the filter unit 106 is not required. Alternatively, the quantization unit 102 and the inverse quantization unit 104 in the video encoder 100 may be combined. The loop filter unit is optional. In addition, for lossless compression coding, the transform unit 101, the quantization unit 102, the inverse quantization unit 104, and the inverse transform unit 105 are optional. It should be understood that, in different application scenarios, the inter prediction unit and the intra prediction unit may be selectively enabled. In this solution, the inter prediction unit is enabled.

Figure 2B:
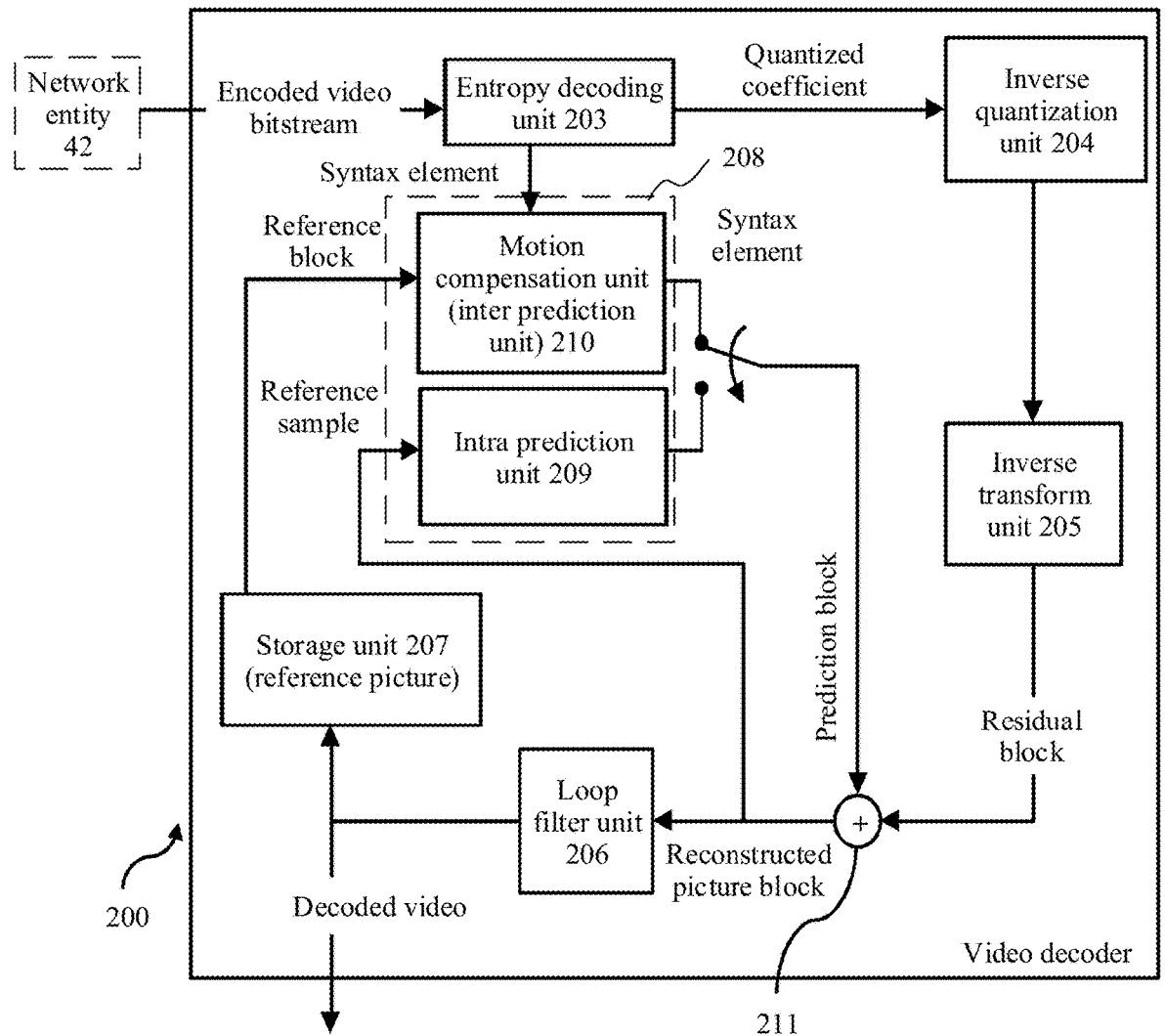
FIG. 2B is a schematic block diagram of a video decoder according to an embodiment of this application.

FIG. 2B is a block diagram of an example video decoder 200 according to an embodiment of this application. In an example in FIG. 2B, the video decoder 200 includes an entropy decoding unit 203, a prediction processing unit 208, an inverse quantization unit 204, an inverse transform unit 205, a summation unit 211, a filter unit 206, and a decoded picture buffer 207. The prediction processing unit 208 may include a motion compensation unit (also referred to as an inter prediction unit) 210 and an intra prediction unit 209. In some examples, the video decoder 200 may perform a decoding process that is substantially inverse to the encoding process described with respect to the video encoder 100 in FIG. 2A.

During decoding, the video decoder 200 receives, from the video encoder 100, an encoded video bitstream that represents a picture block of an encoded video slice and an associated syntax element. The video decoder 200 may receive video data from a network entity 42, and optionally, may further store the video data in a video data storage unit (which is not shown in the figure). The video data storage unit may store video data, such as the encoded video bitstream, that is to be decoded by a component of the video decoder 200. The video data stored in the video data storage unit may be obtained from, for example, a local video source such as a storage apparatus 40 or a camera through wired or wireless network communication of the video data, or by accessing a physical data storage medium. The video data storage unit may be used as a decoded picture buffer (DPB) configured to store the encoded video data that is from the encoded video bitstream. Therefore, although the video data storage unit is not shown in FIG. 2B, the video data storage unit and the DPB 207 may be a same storage unit, or may be separately disposed storage units. The video data storage unit and the DPB 207 each may include any one of a plurality of storage unit apparatuses, for example, a dynamic random access memory (DRAM) including a synchronous DRAM (SDRAM), a magnetoresistive RAM (MRAM), a resistive RAM (RRAM), or another type of storage unit apparatus. In various examples, the video data storage unit may be integrated onto a chip together with other components of the video decoder 200, or may be disposed outside the chip relative to those components.

The network entity 42 may be, for example, a server, a MANE, a video editor/splicer, or another apparatus configured to implement one or more of the technologies described above. The network entity 42 may or may not include a video encoder, for example, the video encoder 100. Before the network entity 42 sends the encoded video bitstream to the video decoder 200, the network entity 42 may implement a part of the technology described in this application. In some video decoding systems, the network entity 42 and the video decoder 200 may be components of separate apparatuses. In other cases, functions described with respect to the network entity 42 may be implemented by a same apparatus including the video decoder 200. In some cases, the network entity 42 may be an example of the storage apparatus 40 in FIG. 1A.

The entropy decoding unit 203 of the video decoder 200 performs entropy decoding on the bitstream to generate a quantized coefficient and some syntax elements. The entropy decoding unit 203 forwards the syntax elements to the prediction processing unit 208. The video decoder 200 may receive syntax elements/a syntax element at a video slice level and/or a picture block level.

When the video slice is decoded into an intra-decoded (I) slice, the intra prediction unit 209 of the prediction processing unit 208 may generate a prediction block of the picture block of the current video slice based on a signaled intra prediction mode and data of a previously decoded block of a current frame or picture. When the video slice is decoded into an inter-decoded (that is, B or P) slice, the inter prediction unit 210 of the prediction processing unit 208 may determine, based on the syntax element received from the entropy decoding unit 203, an inter prediction mode to be used to decode a current picture block of the current video slice, and decode (for example, perform inter prediction on) the current picture block based on the determined inter prediction mode. Specifically, motion information of the current picture block or a sub-block of the current picture block of the current video slice is predicted based on the inter prediction mode (for example, an inter prediction mode specified by a syntax element or a default inter prediction mode). In this way, a prediction block of the sub-block of the current picture block or a prediction block of the current picture block is obtained or generated by using the predicted motion information of the current picture block or the sub-block of the current picture block in a motion compensation process. The motion information herein may include reference picture information and a motion vector. The reference picture information may include but is not limited to unidirectional/bidirectional prediction information, a reference picture list number, and a reference picture index corresponding to a reference picture list. For inter prediction, the prediction block may be generated from one of reference pictures in one of reference picture lists. The video decoder 200 may construct reference picture lists, that is, a list 0 and a list 1, based on reference pictures stored in the DPB 207. A reference frame index of the current picture may be included in one of or both the reference frame list 0 and the reference frame list 1. It should be understood that the inter prediction unit 210 herein performs the motion compensation process. The following describes in detail an inter prediction process of predicting motion information of a current picture block or a sub-block of the current picture block by using motion information of a reference block in various new inter prediction modes. The following describes in detail a process of predicting motion information of one or more sub-blocks (which may be specifically each sub-block or all sub-blocks) in a current picture block in an affine mode (for example, an affine transformation-based advanced motion vector prediction mode or an affine transformation-based merge prediction mode) in this application. In other words, the following describes in detail a motion vector prediction process based on a motion model, for example, a 4-parameter affine model or a 6-parameter affine model.

The inverse quantization unit 204 performs inverse quantization on, that is, dequantizes, a quantized transform coefficient provided in the bitstream and decoded by the entropy decoding unit 203. An inverse quantization process may include: determining a to-be-applied quantization degree by using a quantization parameter calculated by the video encoder 100 for each picture block in the video slice, and similarly determining a to-be-applied inverse quantization degree. The inverse transform unit 205 applies inverse transform, for example, inverse DCT, inverse integer transform, or a conceptually similar inverse transform process, to the transform coefficient, to generate a residual block in a sample domain.

After the inter prediction unit 210 generates the prediction block used for the current picture block or the sub-block of the current picture block, the video decoder 200 sums the residual block from the inverse transform unit 205 and the corresponding prediction block generated by the inter prediction unit 210, to obtain a reconstructed block, that is, a decoded picture block. The summation unit 211 represents a component that performs the summation operation. When necessary, a loop filter unit (in or after a decoding loop) may be further used to smoothen samples, or video quality may be improved in another manner. The filter unit 206 may represent one or more loop filter units, for example, a deblocking filter unit, an adaptive loop filter (ALF) unit, and a sample adaptive offset (SAO) filter unit. Although the filter unit 206 is shown as an in-loop filter unit in FIG. 2B, in another implementation, the filter unit 206 may be implemented as a post-loop filter unit. In an example, the filter unit 206 is applicable to block reconstruction to reduce block distortion, and this result is output as a decoded video stream. In addition, a decoded picture block in a given frame or picture may be further stored in the decoded picture buffer 207, and the decoded picture buffer 207 stores a reference picture used for subsequent motion compensation. The decoded picture buffer 207 may be a part of a storage unit, and may further store a decoded video for subsequent presentation on a display apparatus (for example, the display apparatus 220 in FIG. 1A), or may be separated from such storage unit.

It should be understood that other structural variants of the video decoder 200 may be used to decode the encoded video bitstream. For example, the video decoder 200 may generate an output video stream without processing by the filter unit 206. Alternatively, for some picture blocks or picture frames, the entropy decoding unit 203 of the video decoder 200 does not obtain a quantized coefficient through decoding. In this case, processing by the inverse quantization unit 204 and the inverse transform unit 205 is not required. The loop filter unit is optional. In addition, for lossless compression, the inverse quantization unit 204 and the inverse transform unit 205 are optional. It should be understood that, in different application scenarios, the inter prediction unit and the intra prediction unit may be selectively enabled. In this solution, the inter prediction unit is enabled.

Figure 5A:
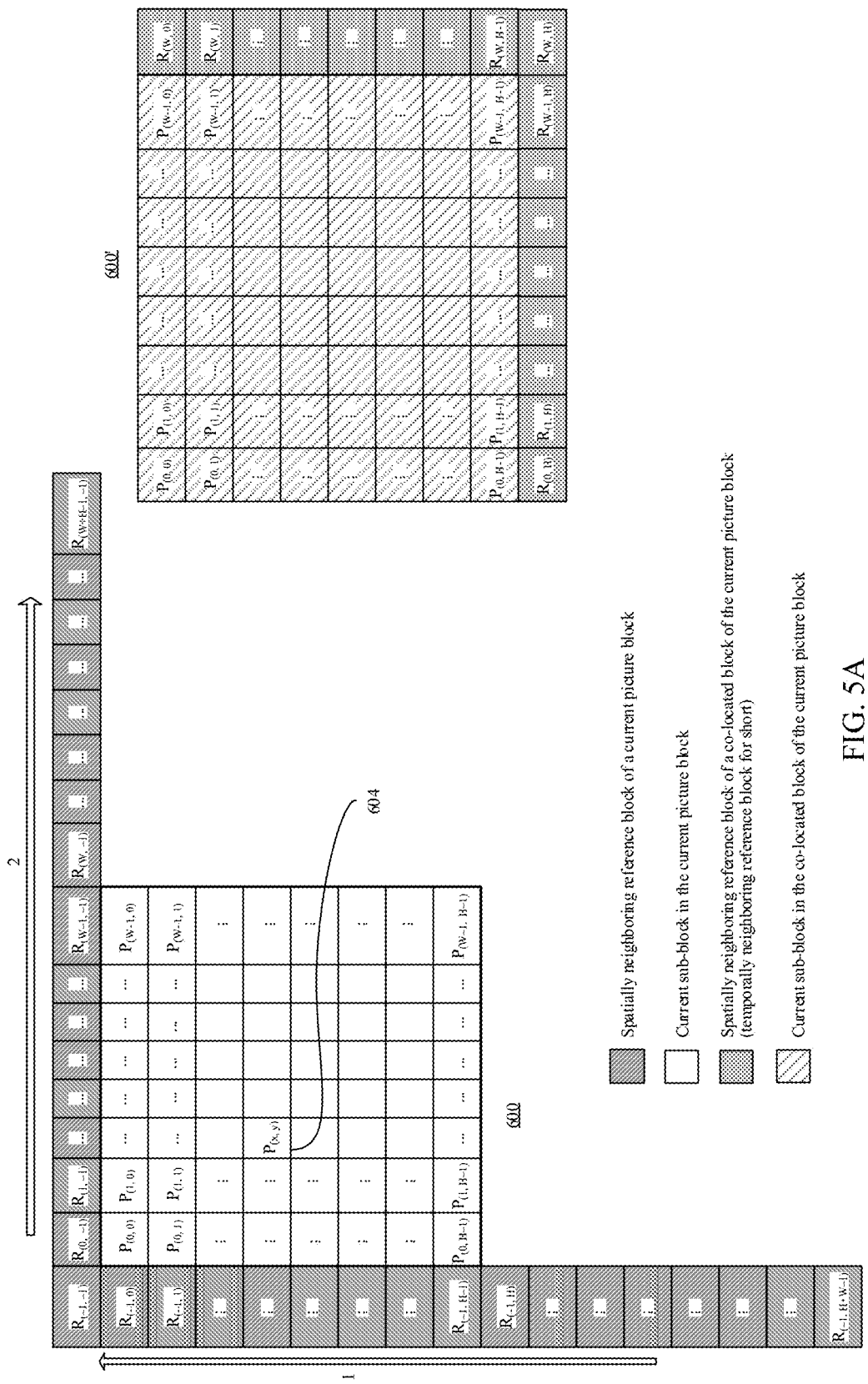
FIG. 5A is a schematic diagram of motion information of a current picture block and a reference block according to an embodiment of this application.

FIG. 5A is an example schematic diagram of motion information of a current picture block 600 and a reference block according to an embodiment of this application. As shown in FIG. 5A, W and H are the width and the height of the current picture block 600 and the width and the height of a co-located block 600' of the current picture block 600. Reference blocks of the current picture block 600 include a spatially neighboring block above the current picture block 600 and a spatially neighboring block on the left of the current picture block 600, and a spatially neighboring block below the co-located block 600' and a spatially neighboring block on the right of the co-located block 600'. The co-located block 600' is a picture block that is in a reference picture and that has a same size, a same shape, and same coordinates as the current picture block 600. It should be noted that there is no motion information of a spatially neighboring block below the current picture block and a spatially neighboring block on the right of the current picture block, which are not encoded. It should be understood that the current picture block 600 and the co-located block 600' may have any block size. For example, the current picture block 600 and the co-located block 600' may include but are not limited to 16×16 samples, 32×32 samples, 32×16 samples, 16×32 samples, or the like. As described above, each picture frame may be partitioned into picture blocks for encoding. These picture blocks may be further partitioned into smaller blocks. For example, the current picture block 600 and the co-located block 600' may be partitioned into a plurality of M×N sub-blocks. In other words, a size of each sub-block is M×N samples. In addition, a size of each reference block is also M×N samples, that is, is the same as the size of the sub-block of the current picture block. Coordinates in FIG. 5A are measured in one M×N block. "M×N" and "M multiplied by N" may be used interchangeably to refer to a sample size of a picture block in a horizontal dimension and a vertical dimension. In other words, there are M samples in a horizontal direction and N samples in a vertical direction, where M and N represent nonnegative integer values. In addition, in a block, a quantity of samples in the horizontal direction and a quantity of samples in the vertical direction may not be necessarily the same. For example, M=N=4 herein. Certainly, the size of the sub-block of the current picture block and the size of the reference block may alternatively be 8×8 samples, 8×4 samples, 4×8 samples, or a smallest prediction block size. In addition, the picture block described in this application may be understood as but is not limited to a prediction unit (prediction unit, PU), a coding unit (coding unit, CU), a transform unit (transform unit, TU), or the like. According to stipulations in different video compression coding standards, the CU may include one or more prediction units PUs, or a size of the PU is the same as a size of the CU. The picture block may have a fixed or variable size, and the size may vary with different video compression coding standards. In addition, the current picture block is a current to-be-encoded or to-be-decoded picture block, for example, a to-be-encoded or to-be-decoded prediction unit.

In an example, whether each spatially neighboring block on the left of the current picture block 600 is available may be determined sequentially along a direction 1, and whether each spatially neighboring block above the current picture block 600 is available may be determined sequentially along a direction 2. For example, whether a neighboring block (also referred to as a reference block, where "neighboring block" and "reference block" may be interchangeably used) is inter-coded is determined, and the neighboring block is available if the neighboring block exists and is inter-coded, or the neighboring block is unavailable if the neighboring block does not exist or is intra-coded. If a neighboring block is intra-coded, motion information of another neighboring reference block is copied as motion information of the neighboring block. Whether the spatially neighboring block below the co-located block 600' and the spatially neighboring block on the right of the co-located block 600' are available is detected by using a similar method, and details are not described herein.

Further, if a size of an available reference block and the size of the sub-block of the current picture block are 4×4, motion information of the available reference block may be directly fetched. If a size of an available reference block is, for example, 8×4 or 8×8, motion information of a center 4×4 block of the available reference block may be fetched and used as motion information of the available reference block.

Coordinates of the top-left vertex of the center 4×4 block relative to the top-left vertex of the reference block are ((W/4)/2×4, (H/4)/2×4). A division operation herein is an exact division operation. If M=8, and N=4, the coordinates of the top-left vertex of the center 4×4 block relative to the top-left vertex of the reference block are (4, 0). Optionally, motion information of a top-left 4×4 block of the reference block may be alternatively fetched and used as motion information of the available reference block. However, this application is not limited thereto.

For ease of description, the following uses a sub-block to represent an M×N sub-block and uses a neighboring block to represent a neighboring M×N block for description.

Figure 5B:
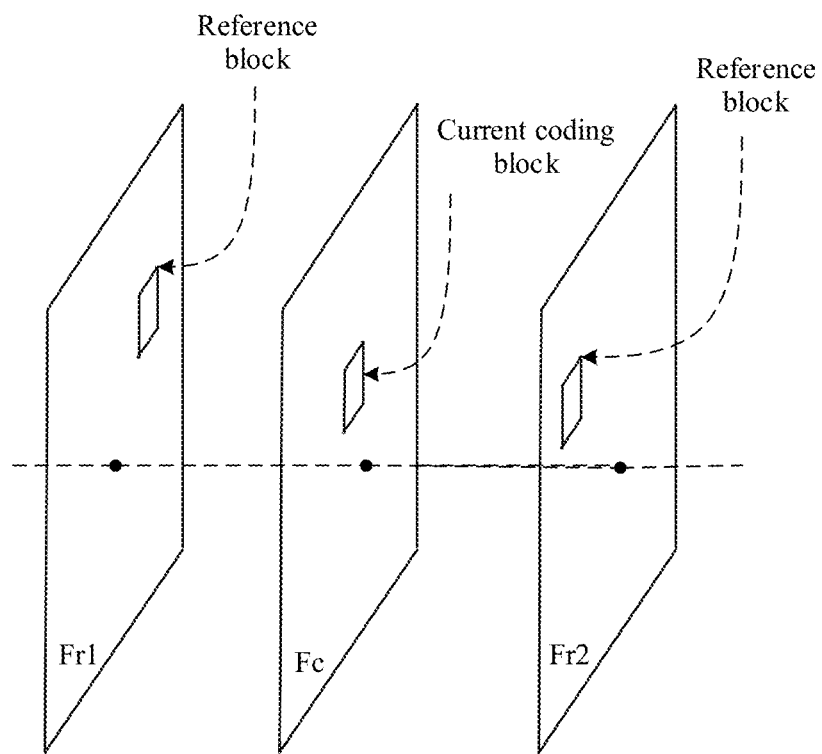
FIG. 5B is a schematic diagram of an inter prediction scenario according to an embodiment of this application.

Inter prediction is an important step in the embodiments of this application. From a perspective of a decoder side, inter prediction is searching a reconstructed picture for a matched reference block for a current coding block in a current picture. As shown in FIG. 5B, a sample value of a sample in a reference block (for example, a reference block Fr1 or a reference block Fr2) is used as predicted information or a predicted value ("information" and "value" are not distinguished below) of a sample value of a sample in a current coding block Fc. This process is referred to as motion estimation ME. In addition, motion information of the current coding block is transmitted. From the perspective of the decoder side, motion information needs to be obtained through parsing during inter prediction, a reference block is determined in the reconstructed picture based on the obtained motion information, and sample values of samples in the block are used as the predicted information. This process is referred to as motion compensation MC. Reconstructed information can be obtained by combining the predicted information and residual information and performing a filtering operation on combined information. An idea in this application may be used in HEVC, or may be used in another video coding/decoding standard. The following describes a possible case of an inter prediction mode on an encoder side by using an example in which the idea is used in HEVC. A possible case of an inter prediction mode on the decoder side is similar, and therefore no additional description is provided.

In HEVC, there are an advanced motion vector prediction (Advanced Motion Vector Prediction, AMVP) mode and a merge (Merge) mode. The following separately describes the two modes.

In the AMVP mode, an affine candidate motion vector list is first constructed by using motion information of an encoded block that is spatially or temporally neighboring to a current coding block, and then an optimal motion vector is determined from the affine candidate motion vector list as a motion vector predictor (Motion vector predictor, MVP) of the current coding block. Rate-distortion costs are calculated by using a formula (0-1), where J is the rate-distortion costs RD costs, SAD is a sum of absolute differences (Sum of Absolute Differences, SAD) between predicted sample values and original sample values that is obtained through motion estimation performed by using a candidate motion vector predictor, R is a bit rate, and λ is a Lagrange multiplier. An encoder side transfers, to a decoder side, an index value of the selected motion vector predictor in the affine candidate motion vector list and a reference frame index value. Further, motion search is performed in an MVP-centered neighboring domain, to obtain an actual motion vector of the current coding block. The encoder side transfers a difference (Motion vector difference) between the MVP and the actual motion vector to the decoder side.

$$J = SAD + \lambda R \tag{0-1}$$

Figure 5C:
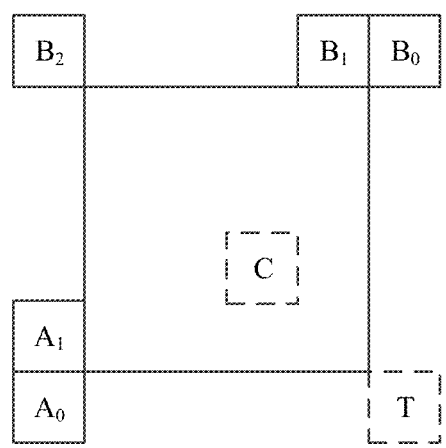
FIG. 5C is a schematic diagram of a scenario of inter-frame neighboring blocks according to an embodiment of this application.

In the merge mode, a candidate motion information list is first constructed by using motion information of an encoded block that is spatially or temporally neighboring to a current coding block, optimal motion information is then determined from the candidate motion information list based on rate-distortion costs and is used as motion information of the current coding block, and an index value (denoted as a merge index, the same below) of a location of the optimal motion information in the candidate motion information list is transferred to a decoder side. Spatial and temporal candidate motion information of the current coding block is shown in FIG. 5C. The spatial candidate motion information is from five spatially neighboring blocks (A0, A1, B0, B1, and B2). If a neighboring block is unavailable or is in an intra coding mode, the neighboring block is not added to the candidate motion information list. The temporal candidate motion information of the current coding block is obtained after an MV of a block at a corresponding location in a reference frame is scaled based on picture order counts (Picture order count, POC) of the reference frame and a current frame. Whether a block at a location T in the reference frame is available is first determined. If the block is not available, a block at a location C is selected.

In inter prediction in HEVC, all samples in a current coding block use same motion information, and then motion compensation is performed based on the motion information, to obtain predictors of the samples of the coding block. However, in the current coding block, not all samples have a same motion characteristic. Using the same motion information may result in inaccurate motion compensation prediction and more residual information.

In existing video coding standards, block matching motion estimation based on a translational motion model is used, and it is assumed that motion of all samples in a block is consistent. However, in the real world, there are a variety of movements. Many objects, for example, a rotating object, a roller coaster rotating in different directions, fireworks, and some stunts in movies, are not in translational motion. For these moving objects, especially those in a UGC scenario, if a block motion compensation technology based on the translational motion model in the existing coding standards is used for coding, coding efficiency is greatly affected. Therefore, studies on a non-translational motion model have been carried out in the industry and by Huawei. In particular, deep studies have been carried out on an affine transformation-based motion model, to further improve coding efficiency.

In non-translational motion model-based prediction, a same motion model is used on an encoder side and a decoder side to deduce motion information of each sub-motion compensation unit in a current coding block, and motion compensation is performed based on the motion information of the sub-motion compensation unit to obtain a prediction block, thereby improving prediction efficiency. Commonly used motion models include a 6-parameter affine model and a 4-parameter affine transformation model.

The 4-parameter affine transformation model is shown as a formula (0-2):

$$\begin{cases} vx = a_1 + a_3 x + a_4 y \\ vy = a_2 - a_4 x + a_3 y \end{cases} \tag{0-2}$$

The 4-parameter affine transformation model may be represented by motion vectors of two samples and coordinates of the samples relative to a top-left sample of a current coding block. A sample used to represent a motion model parameter is denoted as a control point. If a sample at a top-left vertex (0, 0) and a sample at a top-right vertex (W, 0) are used as control points, location coordinates ($x_0$, $y_0$) and a motion vector ($vx_0$, $vy_0$) that are of a top-left control point of the current coding block and location coordinates ($x_1$, $y_1$) and a motion vector ($vx_1$, $vy_1$) that are of a top-right control point of the current coding block are first determined, and then motion information of each sub-motion compensation unit in the current coding block is derived according to a formula (0-3), where (x, y) is coordinates of the sub-motion compensation unit relative to the top-left sample of the current coding block, and W is the width of the current coding block.

$$\begin{cases} vx = \dfrac{vx_1 - vx_0}{W}x - \dfrac{vy_1 - vy_0}{W}y + vx_0 \\ vy = \dfrac{vy_1 - vy_0}{W}x + \dfrac{vx_1 - vx_0}{W}y + vy_0 \end{cases} \quad (0\text{-}3)$$

The 6-parameter affine transformation model is shown as a formula (0-4):

$$\begin{cases} vx = a_1 + a_3 x + a_4 y \\ vy = a_2 + a_5 x + a_6 y \end{cases} \quad (0\text{-}4)$$

The 6-parameter affine transformation model may be represented by motion vectors of three samples and coordinates of the samples relative to a top-left sample of a current coding block. If a sample at a top-left vertex (0, 0), a sample at a top-right vertex (W, 0), and a sample at a bottom-left vertex (0, H) are used as control points, location coordinates ($x_0$, $y_0$) and a motion vector ($vx_0$, $vy_0$) that are of a top-left control point of the current coding block, location coordinates ($x_1$, $y_1$) and a motion vector ($vx_1$, $vy_1$) that are of a top-right control point of the current coding block, and location coordinates ($x_2$, $y_2$) and a motion vector ($vx_2$, $vy_2$) that are of a bottom-left control point of the current coding block are first determined, and then motion information of each sub-motion compensation unit in the current coding block is derived according to a formula (0-5), where (x, y) is coordinates of the sub-motion compensation unit relative to the top-left sample of the current coding block, and W and H are respectively the width and the height of the current coding block.

$$\begin{cases} vx = \dfrac{vx_1 - vx_0}{W}x - \dfrac{vx_2 - vy_0}{H}y + vx_0 \\ vy = \dfrac{vy_1 - vy_0}{W}x + \dfrac{vy_2 - vx_0}{H}y + vy_0 \end{cases} \quad (0\text{-}5)$$

An 8-parameter bilinear model is shown as a formula (0-6):

$$\begin{cases} vx = a_1 + a_3 x + a_4 y + a_7 xy \\ vy = a_2 + a_5 x + a_6 y + a_8 xy \end{cases} \quad (0\text{-}6)$$

The 8-parameter bilinear model may be represented by motion vectors of four samples and coordinates of the samples relative to a top-left sample of a current coding block. If a sample at a top-left vertex (0, 0), a sample at a top-right vertex (W, 0), a sample at a bottom-left vertex (0, H), and a sample at a bottom-right vertex (W, H) are used as control points, location coordinates ($x_0$, $y_0$) and a motion vector ($vx_0$, $vy_0$) that are of a top-left control point of the current coding block, location coordinates ($x_1$, $y_1$) and a motion vector ($vx_1$, $vy_1$) that are of a top-right control point of the current coding block, location coordinates ($x_2$, $y_2$) and a motion vector ($vx_2$, $vy_2$) that are of a bottom-left control point of the current coding block, and location coordinates ($x_3$, $y_3$) and a motion vector ($vx_3$, $vy_3$) that are of a bottom-right control point of the current coding block are first determined, and then motion information of each sub-motion compensation unit in the current coding block is derived according to a formula (0-7), where (x, y) is coordinates of the sub-motion compensation unit relative to the top-left sample of the current coding block, and W and H are respectively the width and the height of the current coding block.

$$\begin{cases} v_x = \dfrac{vx_1 - vx_0}{W}x + \dfrac{vx_2 - vx_0}{H}y + \dfrac{vx_3 + vx_0 - vx_1 - v_{x2}}{WH}y + vx_0 \\ v_y = \dfrac{vy_1 - vy_0}{W}x + \dfrac{vy_2 - vy_0}{H}y + \dfrac{vy_3 + vy_0 - vy_1 - vy_2}{WH}y + vy_0 \end{cases} \quad (0\text{-}7)$$

A coding block that is predicted by using a non-translational motion model is referred to as a non-translational coding block.

Usually, motion information of a control point of a non-translational coding block may be obtained by using an affine transformation-based advanced motion vector prediction (Advanced Motion Vector Prediction, AMVP) mode or an affine transformation-based merge (Merge) mode.

The following uses motion information of two control points in the 4-parameter affine transformation model as an example to separately describe, from a perspective of an encoder side and a perspective of a decoder side, how to obtain a motion vector of a control point of a current coding block or a current coding block.

(1) Construct a Candidate Motion Vector 2-Tuple.

Motion vectors of a top-left control point and a top-right control point of the current coding block are determined based on motion information of neighboring encoded blocks of the current coding block. As shown in FIG. 7B, motion vectors of top-left neighboring encoded blocks A, B, and C are used as candidate motion vectors for the motion vector of the top-left control point of the current coding block, and motion vectors of top-right neighboring encoded blocks D and E are used as candidate motion vectors for the motion vector of the top-right control point of the current coding block. The candidate motion vectors of the top-left control point and the candidate motion vectors of the top-right control point are combined to constitute a candidate motion vector 2-tuple queue of the two control points.

$\{(v_{0A}, v_{1D}), (v_{0A}, v_{1E}), (v_{0B}, v_{1D}), (v_{0B}, v_{1E}), (v_{0C}, v_{1D}), (v_{0C}, v_{1E})\}$.

Herein, $v_0$ represents a candidate motion vector of the top-left control point, and $v_1$ represents a candidate motion vector of the top-right control point. Locations of the 2-tuples in the queue are indexed, and index values are sequentially 0, 1, 2, 3, 4, and 5.

Optionally, the candidate motion vector 2-tuple queue is pruned and sorted according to a particular rule, and may be truncated or padded to a particular quantity.

(2) Determine an Optimal Candidate Motion Vector 2-Tuple.

On the encoder side, a motion vector of each sub-motion compensation unit (a sample or an $N_1 \times N_2$ sample block obtained through partitioning according to a particular method) in the current coding block is obtained based on each candidate motion vector 2-tuple according to a formula (3), so as to obtain a sample value at a location, in a reference frame, to which the motion vector of each sub-motion compensation unit points. This sample value is used as a predictor to perform affine transformation-based motion compensation. Averages of differences between original values and predictors that are of all samples in the current coding block are calculated, and motion vectors in a candidate motion vector 2-tuple corresponding to a minimum difference average are selected as motion vector predictors of the two control points in the current coding block. An index representing a location of the 2-tuple in the candidate motion vector 2-tuple queue is encoded into a bitstream and sent to a decoder.

On the decoder side, the index is parsed to obtain the motion vector predictors of the two control points.

(3) Determine Motion Vectors of the Control Points.

On the encoder side, the motion vector predictors of the two control points are used as a start search point to perform motion search within a specific search range, to obtain the motion vectors of the two control points. Differences between the motion vectors and the motion vector predictors of the two control points are transmitted to the decoder side.

On the decoder side, the motion vector differences of the two control points are parsed and added to the motion vector predictors, to obtain the motion vectors of the control points.

Figure 5D:
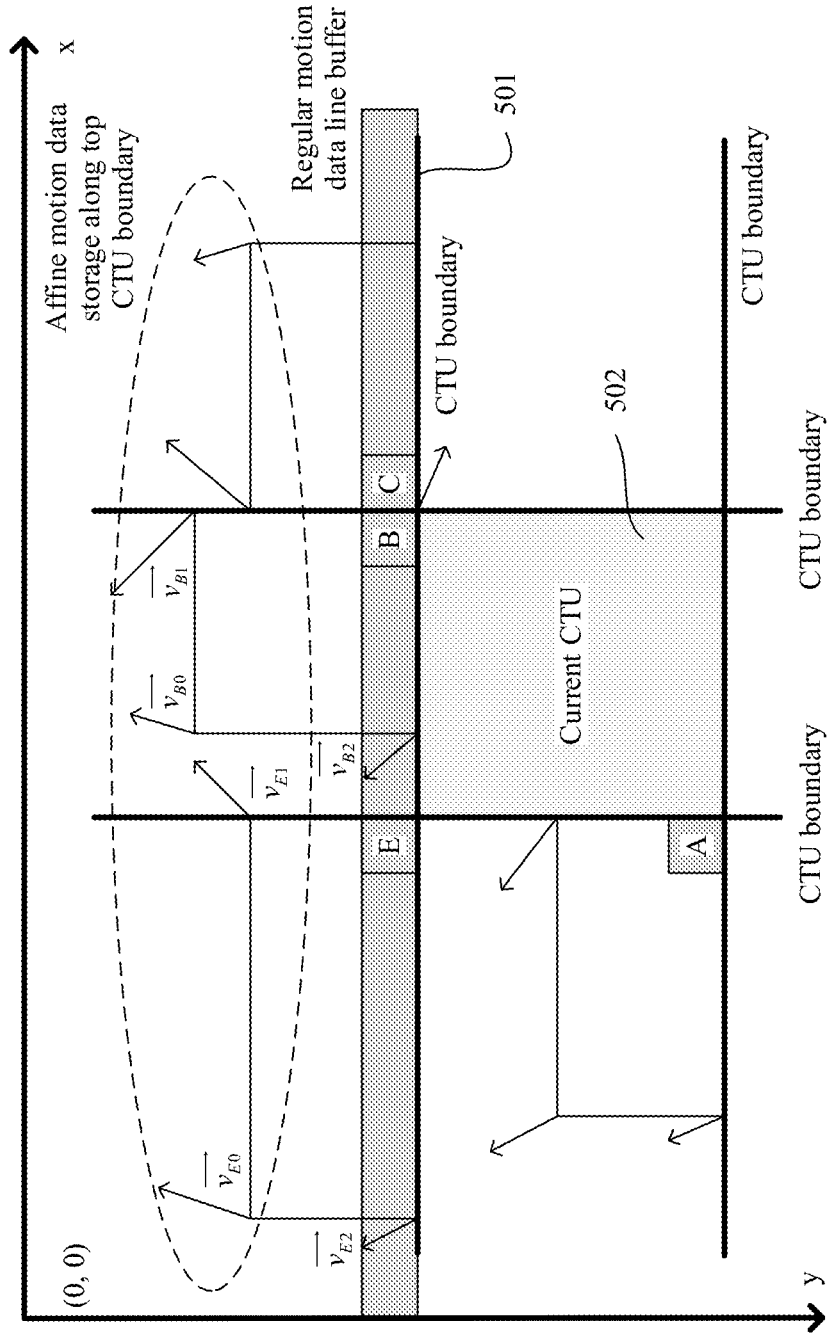
FIG. 5D is a schematic diagram of a motion vector of a neighboring affine coding block according to an embodiment of this application.
Figure 7A:
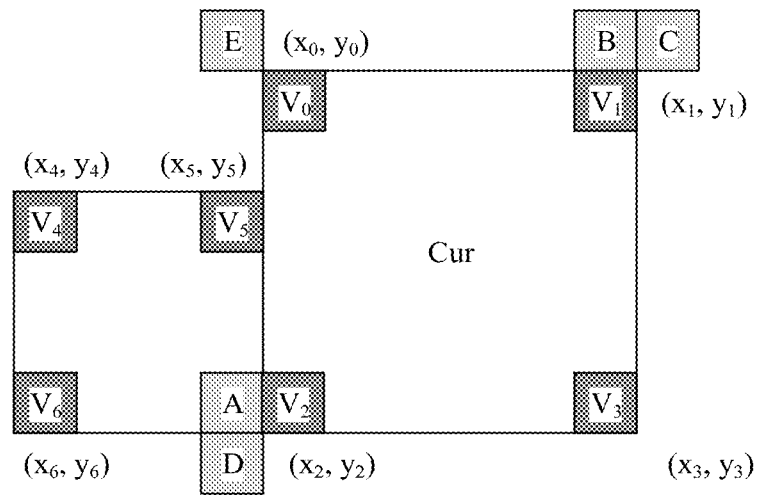
FIG. 7A is a schematic diagram of a scenario of neighboring blocks according to an embodiment of this application.
Figure 7B:
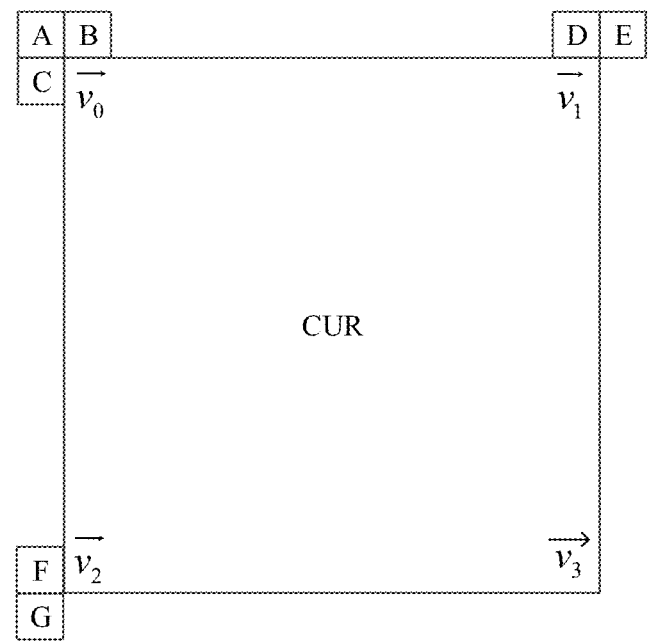
FIG. 7B is a schematic diagram of a scenario of neighboring blocks according to an embodiment of this application.

It should be noted that, a current mainstream motion model-based motion vector prediction method includes: traversing neighboring blocks of a current coding block in an order of A, B, C, D, and E in FIG. 7A (as shown in FIG. 5D, the neighboring blocks A, B, C, D, and E are distributed around a CTU 502 in which the current coding block is located) to find an affine coding block and obtain a motion vector of a control point of the affine coding block, constructing a motion model based on location coordinates and the motion vector of the control point of the affine coding block, and then substituting location coordinates of a control point of the current coding block into the motion model, to deduce a motion vector predictor of the control point of the current block. Specifically, a top-left control point and a top-right control point of the affine coding block are used to construct the motion model herein (sometimes information about a bottom-left control point is further used). FIG. 5D is used as an example. If the neighboring block E is a neighboring affine coding block, the affine model is constructed by using location coordinates and a motion vector $\vec{v}_{E0}$ of a top-left control point of the neighboring block E, location coordinates and a motion vector $\vec{v}_{E1}$ of a top-right control point of the neighboring block E, and location coordinates and a motion vector $\vec{v}_{E2}$ of a bottom-left control point of the neighboring block E. If the neighboring block B is a neighboring affine coding block, the affine model is constructed by using location coordinates and a motion vector $\vec{v}_{B0}$ of a top-left control point of the neighboring block B, location coordinates and a motion vector $\vec{v}_{B1}$ of a top-right control point of the neighboring block B, and location coordinates and a motion vector $\vec{v}_{B2}$ of a bottom-left control point of the neighboring block B. However, the location coordinates and the motion vectors of the top-left control point, the top-right control point, and the bottom-left control point of the neighboring affine coding block that are used in a motion vector prediction process all need to be read from memory in real time, and this increases memory reading pressure. In the embodiments of this application, with reference to a feature that information (location coordinates and a motion vector) about a control point on a top boundary 501 of the CTU 502 in which the current coding block is located has been read from the memory, how to select information about a control point of a neighboring affine coding block to construct the affine model is described, to reduce memory reading pressure. The following separately provides descriptions from a perspective of an encoder side and a perspective of a decoder side.

Figure 6:
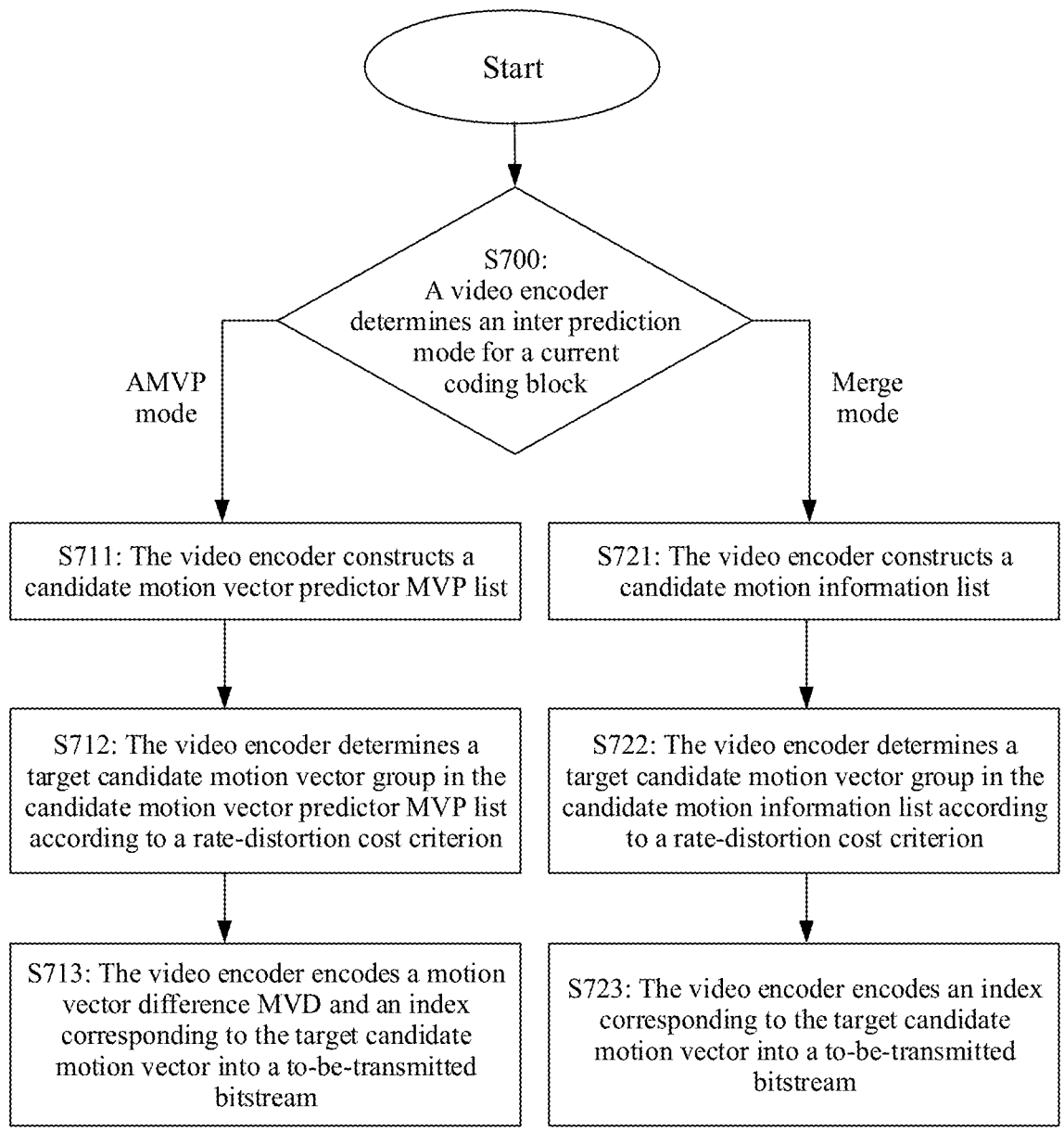
FIG. 6 is a schematic flowchart of an encoding method according to an embodiment of this application.

FIG. 6 is a flowchart of a process 700 of an encoding method according to an embodiment of this application. The process 700 may be performed by the video encoder 100, and specifically, may be performed by the inter prediction unit (also referred to as an inter predictor) 110 and the entropy encoding unit (also referred to as an entropy encoder) 103 of the video encoder 100. The process 700 is described as a series of steps or operations. It should be understood that steps or operations of the process 700 may be performed in various sequences and/or simultaneously, and are not limited to an execution sequence shown in FIG. 6. It is assumed that a video data stream including a plurality of video frames is using the video encoder. If a first neighboring affine coding block is located in a coding tree unit (Coding Tree Unit, CTU) above a current coding block, a group of candidate motion vector predictors is determined based on a bottom-left control point and a bottom-right control point of the first neighboring affine coding block. Corresponding to the process shown in FIG. 6, related descriptions are as follows:

Step S700: The video encoder determines an inter prediction mode for the current coding block.

Specifically, the inter prediction mode may be an advanced motion vector prediction (Advanced Motion Vector Prediction, AMVP) mode, or may be a merge (merge) mode.

If the determined inter prediction mode for the current coding block is the AMVP mode, steps S711 to S713 are performed.

If the determined inter prediction mode for the current coding block is the merge mode, steps S721 to S723 are performed.

AMVP Mode:

Step S711: The video encoder constructs a candidate motion vector predictor MVP list.

Specifically, the video encoder constructs the candidate motion vector predictor MVP list (also referred to as an affine candidate motion vector list) by using the inter prediction unit (also referred to as an inter prediction module). The construction may be performed in either of the following two manners or a combination of the two manners. The constructed candidate motion vector predictor MVP list may be a triplet candidate motion vector predictor MVP list or a 2-tuple candidate motion vector predictor MVP list. The two manners are specifically as follows:

Manner 1: The candidate motion vector predictor MVP list is constructed by using a motion model-based motion vector prediction method.

First, all or some neighboring blocks of the current coding block are traversed in a pre-specified order, to determine a neighboring affine coding block in the neighboring blocks. There may be one or more determined neighboring affine coding blocks. For example, neighboring blocks A, B, C, D, and E shown in FIG. 7A may be traversed sequentially, to determine a neighboring affine coding block in the neighboring blocks A, B, C, D, and E. The inter prediction unit determines a group of candidate motion vector predictors (each group of candidate motion vector predictors is a 2-tuple or a triplet) based on at least one neighboring affine coding block. The following uses one neighboring affine coding block as an example for description. For ease of description, the neighboring affine coding block is referred to as a first neighboring affine coding block. Details are as follows:

A first affine model is determined based on a motion vector of a control point of the first neighboring affine coding block. Further, a motion vector of a control point of the current coding block is predicted based on the first affine model. A manner of predicting the motion vector of the control point of the current coding block based on the motion vector of the control point of the first neighboring affine coding block varies with a parameter model of the current coding block. Therefore, the following provides descriptions for different cases.

A: The parameter model of the current coding block is a 4-parameter affine transformation model. A derivation manner may be as follows:

If the first neighboring affine coding block is located in a coding tree unit (Coding Tree Unit, CTU) above the current coding block, motion vectors of two lowermost control points of the first neighboring affine coding block are obtained. For example, location coordinates ($x_6$, $y_6$) and a motion vector ($vx_6$, $vy_6$) of a bottom-left control point of the first neighboring affine coding block and location coordinates ($x_7$, $y_7$) and a motion vector ($vx_7$, $vy_7$) of a bottom-right control point of the first neighboring affine coding block may be obtained.

A first affine model (the first affine model obtained in this case is a 4-parameter affine model) is formed based on the motion vectors and location coordinates of the two lowermost control points of the first neighboring affine coding block.

The motion vector of the control point of the current coding block is predicted based on the first affine model. For example, location coordinates of a top-left control point of the current coding block and location coordinates of a top-right control point of the current coding block may be substituted into the first affine model, to predict a motion vector of the top-left control point of the current coding block and a motion vector of the top-right control point of the current coding block. Details are shown in formulas (1) and (2).

$$\begin{cases} vx_0 = vx_6 + \frac{(vx_7 - vx_6)}{x_7 - x_6} \times (x_0 - x_6) - \frac{(vy_7 - vy_6)}{x_7 - x_6} \times (y_0 - y_6) \\ vy_0 = vy_6 + \frac{(vy_7 - vy_6)}{x_7 - x_6} \times (x_0 - x_6) + \frac{(vx_7 - vx_6)}{x_7 - x_6} \times (y_0 - y_6) \end{cases} \quad (1)$$

$$\begin{cases} vx_1 = vx_6 + \frac{(vx_7 - vx_6)}{x_7 - x_6} \times (x_1 - x_6) - \frac{(vy_7 - vy_6)}{x_7 - x_6} \times (y_1 - y_6) \\ vy_1 = vy_6 + \frac{(vy_7 - vy_6)}{x_7 - x_6} \times (x_1 - x_6) + \frac{(vx_7 - vx_6)}{x_7 - x_6} \times (y_1 - y_6) \end{cases} \quad (2)$$

In the formulas (1) and (2), ($x_0$, $y_0$) are the coordinates of the top-left control point of the current coding block, and ($x_1$, $y_1$) are the coordinates of the top-right control point of the current coding block. In addition, ($vx_0$, $vy_0$) is the predicted motion vector of the top-left control point of the current coding block, and ($vx_1$, $vy_1$) is the predicted motion vector of the top-right control point of the current coding block.

Optionally, both the location coordinates ($x_6$, $y_6$) of the bottom-left control point and the location coordinates ($x_7$, $y_7$) of the bottom-right control point of the first neighboring affine coding block are calculated based on location coordinates ($x_4$, $y_4$) of a top-left control point of the first neighboring affine coding block. The location coordinates ($x_6$, $y_6$) of the bottom-left control point of the first neighboring affine coding block are ($x_4$, $y_4$+cuH), and the location coordinates ($x_7$, $y_7$) of the bottom-right control point of the first neighboring affine coding block are ($x_4$+cuW, $y_4$+cuH), where cuW is the width of the first neighboring affine coding block, and cuH is the height of the first neighboring affine coding block. In addition, the motion vector of the bottom-left control point of the first neighboring affine coding block is a motion vector of a bottom-left sub-block of the first neighboring affine coding block, and the motion vector of the bottom-right control point of the first neighboring affine coding block is a motion vector of a bottom-right sub-block of the first neighboring affine coding block. It can be learned that in this case, a horizontal distance between the bottom-left control point and the bottom-right control point of the first neighboring affine coding block is cuW, and a horizontal distance between the top-left control point and the top-right control point of the first neighboring affine coding block is cuW. Because cuW is usually a power of 2, in a process of deriving the motion vector of the control point of the current coding block, a right-shifting manner may be used instead of a division operation, to reduce implementation complexity. It can be learned that both the location coordinates of the bottom-left control point and the location coordinates of the bottom-right control point of the first neighboring affine coding block are obtained through derivation, rather than being read from the memory. Therefore, according to this method, a quantity of times of reading from the memory can be further reduced and encoding performance can be improved. In another optional solution, the location coordinates of the bottom-left control point and the location coordinates of the bottom-right control point may be alternatively pre-stored in the memory, and read from the memory for use when necessary.

In this case, in the formulas (1) and (2), ($x_7-x_6$) is equal to cuW, ($vx_7$, $vy_7$) may be obtained by reading a motion vector of a location ($x_4$+cuW−1, $y_4$+cuH−1) in a picture, and ($vx_6$, $vy_6$) may be obtained by reading a motion vector of a location ($x_4$, $y_4$+cuH−1) in the picture.

If the first neighboring affine coding block is not located in the CTU above the current coding block, a manner of predicting the motion vector of the control point of the current coding block is not limited herein. Specifically, in this case, the manner of predicting the motion vector of the control point of the current coding block may be the same as or different from the prediction manner used when the first neighboring affine coding block is located in the CTU above the current coding block.

B: The parameter model of the current coding block is a 6-parameter affine transformation model. A derivation manner may be as follows:

If the first neighboring affine coding block is located in a CTU above the current coding block, location coordinates and motion vectors of two lowermost control points of the first neighboring affine coding block are obtained. For example, location coordinates ($x_6$, $y_6$) and a motion vector ($vx_6$, $vy_6$) of a bottom-left control point of the first neighboring affine coding block and location coordinates ($x_7$, $y_7$) and a motion vector ($vx_7$, $vy_7$) of a bottom-right control point of the first neighboring affine coding block may be obtained.

A first affine model (the first affine model obtained in this case is a 4-parameter affine model) is formed based on the motion vectors of the two lowermost control points of the first neighboring affine coding block.

The motion vector of the control point of the current coding block is predicted based on the first affine model. For example, location coordinates of a top-left control point of the current coding block, location coordinates of a top-right control point of the current coding block, and location coordinates of a bottom-left control point of the current coding block may be substituted into the first affine model, to predict a motion vector of the top-left control point of the current coding block, a motion vector of the top-right control point of the current coding block, and a motion vector of the bottom-left control point of the current coding block. Details are shown in formulas (1), (2), and (3).

$$\begin{cases} vx_2 = vx_6 + \frac{(vx_7 - vx_6)}{x_7 - x_6} \times (x_2 - x_6) - \frac{(vy_7 - vy_6)}{x_7 - x_6} \times (y_2 - y_6) \\ vy_2 = vy_6 + \frac{(vy_7 - vy_6)}{x_7 - x_6} \times (x_2 - x_6) + \frac{(vx_7 - vx_6)}{x_7 - x_6} \times (y_2 - y_6) \end{cases} \quad (3)$$

The formulas (1) and (2) have been described above. In the formulas (1), (2), and (3), $(x_0, y_0)$ are the coordinates of the top-left control point of the current coding block, $(x_1, y_1)$ are the coordinates of the top-right control point of the current coding block, and $(x_2, y_2)$ are the coordinates of the bottom-left control point of the current coding block. In addition, $(vx_0, vy_0)$ is the predicted motion vector of the top-left control point of the current coding block, $(vx_1, vy_1)$ is the predicted motion vector of the top-right control point of the current coding block, and $(vx_2, vy_2)$ is the predicted motion vector of the bottom-left control point of the current coding block.

If the first neighboring affine coding block is not located in the CTU above the current coding block, a manner of predicting the motion vector of the control point of the current coding block is not limited herein. Specifically, in this case, the manner of predicting the motion vector of the control point of the current coding block may be the same as or different from the prediction manner used when the first neighboring affine coding block is located in the CTU above the current coding block.

Manner 2: The candidate motion vector predictor MVP list is constructed by using a control point combination-based motion vector prediction method.

A manner of constructing the candidate motion vector predictor MVP list varies with a parameter model of the current coding block. Details are described below.

A: The parameter model of the current coding block is a 4-parameter affine transformation model. A derivation manner may be as follows:

Motion vectors of a top-left vertex and a top-right vertex of the current coding block are estimated based on motion information of neighboring encoded blocks of the current coding block. As shown in FIG. 7B, first, motion vectors of neighboring encoded blocks A and/or B and/or C of the top-left vertex are used as candidate motion vectors for the motion vector of the top-left vertex of the current coding block, and motion vectors of neighboring encoded blocks D and/or E of the top-right vertex are used as candidate motion vectors for the motion vector of the top-right vertex of the current coding block. A candidate motion vector of the top-left vertex and a candidate motion vector of the top-right vertex may be combined to obtain a group of candidate motion vector predictors. A plurality of records obtained through combination in this manner may constitute the candidate motion vector predictor MVP list.

B: The parameter model of the current coding block is a 6-parameter affine transformation model. A derivation manner may be as follows:

Motion vectors of a top-left vertex, a top-right vertex, and a bottom-left vertex of the current coding block are estimated based on motion information of neighboring encoded blocks of the current coding block. As shown in FIG. 7B, first, motion vectors of neighboring encoded blocks A and/or B and/or C of the top-left vertex are used as candidate motion vectors for the motion vector of the top-left vertex of the current coding block, motion vectors of neighboring encoded blocks D and/or E of the top-right vertex are used as candidate motion vectors for the motion vector of the top-right vertex of the current coding block, and motion vectors of neighboring encoded blocks F and/or G of the bottom-left vertex are used as candidate motion vectors for the motion vector of the bottom-left vertex of the current coding block. A candidate motion vector of the top-left vertex, a candidate motion vector of the top-right vertex, and a candidate motion vector of the bottom-left vertex may be combined to obtain a group of candidate motion vector predictors. A plurality of groups of candidate motion vector predictors obtained through combination in this manner may constitute the candidate motion vector predictor MVP list.

It should be noted that the candidate motion vector predictor MVP list may be constructed by using only the candidate motion vector predictors predicted in the manner 1, or the candidate motion vector predictor MVP list may be constructed by using only the candidate motion vector predictors predicted in the manner 2, or the candidate motion vector predictor MVP list may be constructed by using both the candidate motion vector predictors predicted in the manner 1 and the candidate motion vector predictors predicted in the manner 2. In addition, the candidate motion vector predictor MVP list may be further pruned and sorted according to a preconfigured rule, and then truncated or padded to a particular quantity. When each group of candidate motion vector predictors in the candidate motion vector predictor MVP list includes motion vector predictors of three control points, this candidate motion vector predictor MVP list may be referred to as a triplet list; or when each group of candidate motion vector predictors in the candidate motion vector predictor MVP list includes motion vector predictors of two control points, this candidate motion vector predictor MVP list may be referred to as a 2-tuple list.

Step S712: The video encoder determines a target candidate motion vector group in the candidate motion vector predictor MVP list according to a rate-distortion cost criterion. Specifically, for each candidate motion vector group in the candidate motion vector predictor MVP list, a motion vector of each sub-block of the current block is obtained through calculation, and motion compensation is performed to obtain a predictor of each sub-block, so as to obtain a predictor of the current block. A candidate motion vector group with a minimum error between a predictor and an original value is selected as a group of optimal motion vector predictors, that is, the target candidate motion vector group. In addition, the determined target candidate motion vector group is used as optimal candidate motion vector predictors of a group of control points, and the target candidate motion vector group corresponds to a unique index number in the candidate motion vector predictor MVP list.

Step S713: The video encoder encodes a motion vector difference MVD and an index corresponding to the target candidate motion vector group into a to-be-transmitted bitstream.

Specifically, the video encoder may further search, within a preset search range according to the rate-distortion cost criterion by using the target candidate motion vector group as a start search point, for motion vectors that are of a group of control points and that have lowest costs, and then determine motion vector differences MVDs between the target candidate motion vector group and the motion vectors of the group of control points. For example, if a first group of control points includes a first control point and a second control point, a motion vector difference MVD between a motion vector of the first control point and a motion vector predictor, represented by the target candidate motion vector group, of the first control point in a group of control points needs to be determined, and a motion vector difference MVD between a motion vector of the second control point and a motion vector predictor, represented by the target candidate motion vector group, of a second control point in the group of control points needs to be determined.

Optionally, in addition to the foregoing steps S711 to S713, steps S714 and S715 may be further performed in the AMVP mode.

Step S714: The video encoder obtains a motion vector of each sub-block of the current coding block based on the determined motion vector of the control point of the current coding block by using an affine transformation model.

Figure 8A:
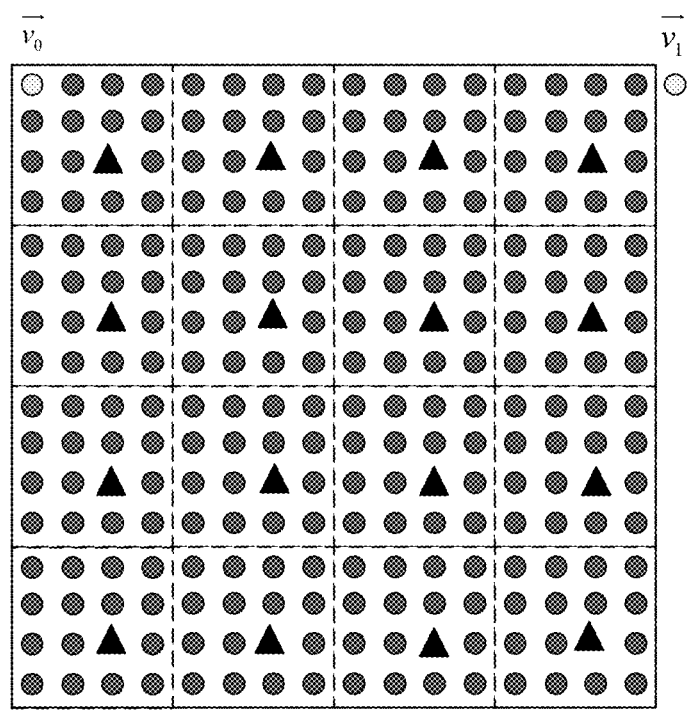
FIG. 8A is a schematic structural diagram of a motion compensation unit according to an embodiment of this application.
Figure 8B:
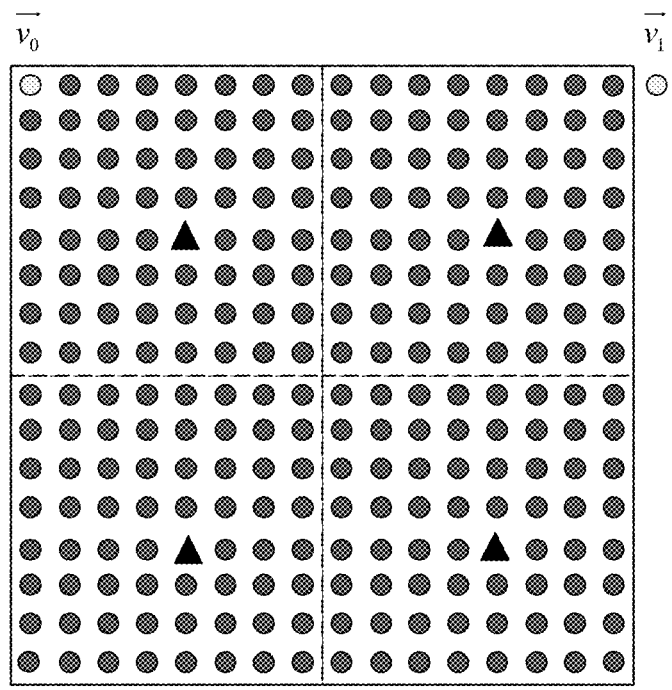
FIG. 8B is a schematic structural diagram of another motion compensation unit according to an embodiment of this application.

Specifically, a new candidate motion vector group obtained based on the target candidate motion vector group and the MVD includes motion vectors of two control points (the top-left control point and the top-right control point) or three control points (for example, the top-left control point, the top-right control point, and the bottom-left control point). For each sub-block of the current coding block (one sub-block may be equivalent to one motion compensation unit), motion information of a sample at a preset location in a motion compensation unit may be used to represent motion information of all samples in the motion compensation unit. If a size of the motion compensation unit is M×N (M is less than or equal to the width W of the current coding block, N is less than or equal to the height H of the current coding block, and M, N, W, and H each are a positive integer and are usually a power of 2, for example, 4, 8, 16, 32, 64, or 128), the sample at the preset location may be a center point (M/2, N/2) of the motion compensation unit, a top-left sample (0, 0), a top-right sample (M−1, 0), or a sample at another location. FIG. 8A shows a 4×4 motion compensation unit, and FIG. 8B shows an 8×8 motion compensation unit. A center point of a corresponding motion compensation unit is represented by a triangle.

Coordinates of a center point of a motion compensation unit relative to a sample at a top-left vertex of the current coding block are calculated according to a formula (5), where i is an $i^{th}$ motion compensation unit (from left to right) in a horizontal direction, j is a $j^{th}$ motion compensation unit (from top to bottom) in a vertical direction, and $(x_{(i,j)}, y_{(i,j)})$ represent coordinates of a center point of an $(i, j)^{th}$ motion compensation unit relative to the sample at the top-left control point of the current coding block. Then, based on an affine model type (6-parameter or 4-parameter) of the current coding block, $(x_{(i,j)}, y_{(i,j)})$ are substituted into a 6-parameter affine model formula (6-1) or $(x_{(i,j)}, y_{(i,j)})$ are substituted into a 4-parameter affine model formula (6-2) to obtain motion information of a center point of each motion compensation unit, and the motion information is used as motion vectors $(vx_{(i,j)}, vy_{(i,j)})$ of all samples in the motion compensation unit.

$$\begin{cases} x_{(i,j)} = M \times i + \dfrac{M}{2}, i = 0, 1 .. \\ y_{(i,j)} = N \times j + \dfrac{N}{2}, j = 0, 1 .. \end{cases} \quad (5)$$

$$\begin{cases} vx = \dfrac{vx_1 - vx_0}{W}x + \dfrac{vx_2 - vx_0}{H}y + vx_0 \\ vy = \dfrac{vy_1 - vy_0}{W}x + \dfrac{vy_2 - vy_0}{H}y + vy_0 \end{cases} \quad (6\text{-}1)$$

$$\begin{cases} vx = \dfrac{vx_1 - vx_0}{W}x - \dfrac{vy_1 - vy_0}{W}y + vx_0 \\ vy = \dfrac{vy_1 - vy_0}{W}x + \dfrac{vx_1 - vx_0}{W}y + vy_0 \end{cases} \quad (6\text{-}2)$$

Optionally, when the current coding block is a 6-parameter coding block, and motion vectors of one or more sub-blocks of the current coding block are obtained based on the target candidate motion vector group, if a bottom boundary of the current coding block overlaps a bottom boundary of a CTU in which the current coding block is located, a motion vector of a sub-block at the bottom-left corner of the current coding block is obtained through calculation based on location coordinates (0, H) of the bottom-left corner of the current coding block and a 6-parameter affine model constructed by using the three control points, and a motion vector of a sub-block at the bottom-right corner of the current coding block is obtained through calculation based on location coordinates (W, H) of the bottom-right corner of the current coding block and the 6-parameter affine model constructed by using the three control points. For example, the motion vector of the sub-block at the bottom-left corner of the current coding block can be obtained by substituting the location coordinates (0, H) of the bottom-left corner of the current coding block into the 6-parameter affine model (rather than substituting coordinates of a central point of the sub-block at the bottom-left corner into the affine model for calculation), and the motion vector of the sub-block at the bottom-right corner of the current coding block can be obtained by substituting the location coordinates (W, H) of the bottom-right corner of the current coding block into the 6-parameter affine model (rather than substituting coordinates of a central point of the sub-block at the bottom-right corner into the affine model for calculation). In this way, when a motion vector of a bottom-left control point and a motion vector of a bottom-right control point of the current coding block are used (for example, a candidate motion vector predictor MVP list of another block is subsequently constructed based on the motion vectors of the bottom-left control point and the bottom-right control point of the current block), accurate values rather than estimated values are used. W is the width of the current coding block, and H is the height of the current coding block.

Optionally, when the current coding block is a 4-parameter coding block, and motion vectors of one or more sub-blocks of the current coding block are obtained based on the target candidate motion vector group, if a bottom boundary of the current coding block overlaps a bottom boundary of a CTU in which the current coding block is located, a motion vector of a sub-block at the bottom-left corner of the current coding block is obtained through calculation based on location coordinates (0, H) of the bottom-left corner of the current coding block and a 4-parameter affine model constructed by using the two control points, and a motion vector of a sub-block at the bottom-right corner of the current coding block is obtained through calculation based on location coordinates (W, H) of the bottom-right corner of the current coding block and the 4-parameter affine model constructed by using the two control points. For example, the motion vector of the sub-block at the bottom-left corner of the current coding block can be obtained by substituting the location coordinates (0, H) of the bottom-left corner of the current coding block into the 4-parameter affine model (rather than substituting coordinates of a central point of the sub-block at the bottom-left corner into the affine model for calculation), and the motion vector of the sub-block at the bottom-right corner of the current coding block can be obtained by substituting the location coordinates (W, H) of the bottom-right corner of the current coding block into the 4-parameter affine model (rather than substituting coordinates of a central point of the sub-block at the bottom-right corner into the affine model for calculation). In this way, when a motion vector of a bottom-left control point and a motion vector of a bottom-right control point of the current coding block are used (for example, a candidate motion vector predictor MVP list of another block is subsequently constructed based on the motion vectors of the bottom-left control point and the bottom-right control point of the current block), accurate values rather than estimated values are used. W is the width of the current coding block, and H is the height of the current coding block.

Step S715: The video encoder performs motion compensation based on the motion vector of each sub-block of the current coding block, to obtain a predicted sample value of each sub-block. For example, a corresponding sub-block is found in a reference frame based on the motion vector of each sub-block and a reference frame index, and interpolation filtering is performed, to obtain the predicted sample value of each sub-block.

Merge Mode:

Step S721: The video encoder constructs a candidate motion information list.

Specifically, the video encoder constructs the candidate motion information list (also referred to as an affine candidate motion vector list) by using the inter prediction unit (also referred to as an inter prediction module). The construction may be performed in either of the following two manners or a combination of the two manners. The constructed candidate motion information list is a triplet candidate motion information list. The two manners are specifically as follows:

Manner 1: The candidate motion information list is constructed by using a motion model-based motion vector prediction method.

First, all or some neighboring blocks of the current coding block are traversed in a pre-specified order, to determine a neighboring affine coding block in the neighboring blocks. There may be one or more determined neighboring affine coding blocks. For example, neighboring blocks A, B, C, D, and E shown in FIG. 7A may be traversed sequentially, to determine a neighboring affine coding block in the neighboring blocks A, B, C, D, and E. The inter prediction unit determines a group of candidate motion vector predictors (each group of candidate motion vector predictors is a 2-tuple or a triplet) based on at least one neighboring affine coding block. The following uses one neighboring affine coding block as an example for description. For ease of description, the neighboring affine coding block is referred to as a first neighboring affine coding block. Details are as follows:

A first affine model is determined based on a motion vector of a control point of the first neighboring affine coding block. Further, a motion vector of a control point of the current coding block is predicted based on the first affine model. Details are as follows:

If the first neighboring affine coding block is located in a CTU above the current coding block, location coordinates and motion vectors of two lowermost control points of the first neighboring affine coding block are obtained. For example, location coordinates $(x_6, y_6)$ and a motion vector $(vx_6, vy_6)$ of a bottom-left control point of the first neighboring affine coding block and location coordinates $(x_7, y_7)$ and a motion vector $(vx_7, vy_7)$ of a bottom-right control point of the first neighboring affine coding block may be obtained.

A first affine model (the first affine model obtained in this case is a 4-parameter affine model) is formed based on the motion vectors of the two lowermost control points of the first neighboring affine coding block.

Optionally, the motion vector of the control point of the current coding block is predicted based on the first affine model. For example, location coordinates of a top-left control point of the current coding block, location coordinates of a top-right control point of the current coding block, and location coordinates of a bottom-left control point of the current coding block may be substituted into the first affine model, to predict a motion vector of the top-left control point of the current coding block, a motion vector of the top-right control point of the current coding block, and a motion vector of the bottom-left control point of the current coding block. A candidate motion vector triplet is formed and is added to the candidate motion information list. Details are shown in formulas (1), (2), and (3).

Optionally, the motion vector of the control point of the current coding block is predicted based on the first affine model. For example, location coordinates of a top-left control point of the current coding block and location coordinates of a top-right control point of the current coding block may be substituted into the first affine model, to predict a motion vector of the top-left control point of the current coding block and a motion vector of the top-right control point of the current coding block. A candidate motion vector 2-tuple is formed and is added to the candidate motion information list. Details are shown in formulas (1) and (2).

In the formulas (1), (2), and (3), $(x_0, y_0)$ are the coordinates of the top-left control point of the current coding block, $(x_1, y_1)$ are the coordinates of the top-right control point of the current coding block, and $(x_2, y_2)$ are the coordinates of the bottom-left control point of the current coding block. In addition, $(vx_0, vy_0)$ is the predicted motion vector of the top-left control point of the current coding block, $(vx_1, vy_1)$ is the predicted motion vector of the top-right control point of the current coding block, and $(vx_2, vy_2)$ is the predicted motion vector of the bottom-left control point of the current coding block.

If the first neighboring affine coding block is not located in the CTU above the current coding block, a manner of predicting the motion vector of the control point of the current coding block is not limited herein. Specifically, in this case, the manner of predicting the motion vector of the control point of the current coding block may be the same as or different from the prediction manner used when the first neighboring affine coding block is located in the CTU above the current coding block.

Manner 2: The candidate motion information list is constructed by using a control point combination-based motion vector prediction method.

The following lists two solutions, which are denoted as a solution A and a solution B.

Solution A: Motion information of two control points of the current coding block is combined, to construct a 4-parameter affine transformation model. The two control points are combined in a manner of {CP1, CP4}, {CP2, CP3}, {CP1, CP2}, {CP2, CP4}, {CP1, CP3}, or {CP3, CP4}. For example, a 4-parameter affine transformation model constructed by using control points CP1 and CP2 is denoted as Affine (CP1, CP2).

It should be noted that a combination of different control points may be transformed into control points at a same location. For example, a 4-parameter affine transformation model obtained based on a combination {CP1, CP4}, {CP2, CP3}, {CP2, CP4}, {CP1, CP3}, or {CP3, CP4} is transformed to be represented by control points {CP1, CP2} or {CP1, CP2, CP3}. A transformation method is as follows: A motion vector and coordinate information of a control point are substituted into a formula (7), to obtain a model parameter. Then, coordination information of {CP1, CP2} is substituted into the formula, to obtain motion vectors of {CP1, CP2}. The motion vectors are used as a group of candidate motion vector predictors.

$$\begin{cases} vx = a_1 + a_3 x + a_4 y \\ vy = a_2 - a_4 x + a_3 y \end{cases} \quad (7)$$

In the formula (7), $a_0, a_1, a_2, a_3$ are all parameters in the parameter model, and (x, y) represent location coordinates.

More directly, the transformation may be performed according to the following formulas, to obtain a group of motion vector predictors represented by the top-left control point and the top-right control point, and the group of motion vector predictors is added to the candidate motion information list.

A formula (8) for transforming {CP1, CP2} to {CP1, CP2, CP3} is as follows:

$$\begin{cases} vx_2 = -\dfrac{vy_1 - vy_0}{W} H + vx_0 \\ vy_2 = +\dfrac{vx_1 - vx_0}{W} H + vy_0 \end{cases} \quad (8)$$

A formula (9) for transforming {CP1, CP3} to {CP1, CP2, CP3} is as follows:

$$\begin{cases} vx_1 = +\dfrac{vy_2 - vy_0}{H} W + vx_0 \\ vy_1 = -\dfrac{vx_2 - vx_0}{H} W + vy_0 \end{cases} \quad (9)$$

A formula (10) for transforming {CP2, CP3} to {CP1, CP2, CP3} is as follows:

$$\begin{cases} vx_0 = \dfrac{vx_2 - vx_1}{W*W + H*H} W*W - \dfrac{vy_2 - vy_1}{W*W + H*H} H*W + vx_1 \\ vy_1 = \dfrac{vy_2 - vy_1}{W*W + H*H} W*W + \dfrac{vx_2 - vx_1}{W*W + H*H} H*W + vy_1 \end{cases} \quad (10)$$

A formula (11) for transforming {CP1, CP4} to {CP1, CP2, CP3} is as follows:

$$\begin{cases} vx_1 = \dfrac{vx_3 - vx_0}{W*W + H*H} W*W + \dfrac{vy_3 - vy_0}{W*W + H*H} H*W + vx_0 \\ vy_1 = \dfrac{vy_3 - vy_0}{W*W + H*H} W*W - \dfrac{vx_3 - vx_0}{W*W + H*H} H*W + vy_0 \end{cases} \quad (11)$$

A formula (12) for transforming {CP2, CP4} to {CP1, CP2, CP3} is as follows:

$$\begin{cases} vx_0 = -\dfrac{vy_3 - vy_1}{H} W + vx_1 \\ vy_0 = +\dfrac{vx_3 - vx_1}{H} W + vy_1 \end{cases} \quad (12)$$

A formula (13) for transforming {CP3, CP4} to {CP1, CP2, CP3} is as follows:

$$\begin{cases} vx_0 = +\dfrac{vy_3 - vy_2}{W} H + vx_2 \\ vy_0 = -\dfrac{vx_3 - vx_2}{W} H + vy_2 \end{cases} \quad (13)$$

Solution B: Motion information of three control points of the current coding block is combined, to construct a 6-parameter affine transformation model. The three control points are combined in a manner of {CP1, CP2, CP4}, {CP1, CP2, CP3}, {CP2, CP3, CP4}, or {CP1, CP3, CP4}. For example, a 6-parameter affine transformation model constructed by using control points CP1, CP2, and CP3 is denoted as Affine (CP1, CP2, CP3).

It should be noted that a combination of different control points may be transformed into control points at a same location. For example, a 6-parameter affine transformation model obtained based on a combination {CP1, CP2, CP4}, {CP2, CP3, CP4}, or {CP1, CP3, CP4} is transformed to be represented by control points {CP1, CP2, CP3}. A transformation method is as follows: A motion vector and coordinate information of a control point are substituted into a formula (14), to obtain a model parameter. Then, coordination information of {CP1, CP2, CP3} is substituted into the formula, to obtain motion vectors of {CP1, CP2, CP3}. The motion vectors are used as a group of candidate motion vector predictors.

$$\begin{cases} vx = a_1 + a_3 x + a_4 y \\ vy = a_2 + a_5 x + a_6 y \end{cases} \quad (14)$$

In the formula (14), $a_1, a_2, a_3, a_4, a_5, a_6$ are parameters in the parameter model, and (x, y) represent location coordinates.

More directly, the transformation may be performed according to the following formulas, to obtain a group of motion vector predictors represented by the top-left control point, the top-right control point, and the bottom-left control point, and the group of motion vector predictors is added to the candidate motion information list.

A formula (15) for transforming {CP1, CP2, CP4} to {CP1, CP2, CP3} is as follows:

$$\begin{cases} vx_2 = vx_3 + vx_0 - vx_1 \\ vy_2 = vy_3 + vy_0 - vy_1 \end{cases} \quad (15)$$

A formula (16) for transforming {CP2, CP3, CP4} to {CP1, CP2, CP3} is as follows:

$$\begin{cases} vx_0 = vx_1 + vx_2 - vx_3 \\ vy_0 = vy_1 + vy_2 - vy_3 \end{cases} \quad (16)$$

A formula (17) for transforming {CP1, CP3, CP4} to {CP1, CP2, CP3} is as follows:

$$\begin{cases} vx_1 = vx_3 + vx_0 - vx_2 \\ vy_1 = vy_3 + vy_0 - vy_2 \end{cases} \quad (17)$$

It should be noted that the candidate motion information list may be constructed by using only the candidate motion vector predictors predicted in the manner 1, or the candidate motion information list may be constructed by using only the candidate motion vector predictors predicted in the manner 2, or the candidate motion information list may be constructed by using both the candidate motion vector predictors predicted in the manner 1 and the candidate motion vector predictors predicted in the manner 2. In addition, the candidate motion information list may be further pruned and sorted according to a preconfigured rule, and then truncated or padded to a particular quantity. When each group of candidate motion vector predictors in the candidate motion information list includes motion vector predictors of three control points, this candidate motion information list may be referred to as a triplet list; or when each group of candidate motion vector predictors in the candidate motion information list includes motion vector predictors of two control points, this candidate motion information list may be referred to as a 2-tuple list.

Step S722: The video encoder determines a target candidate motion vector group in the candidate motion information list according to a rate-distortion cost criterion. Specifically, for each candidate motion vector group in the candidate motion information list, a motion vector of each sub-block of the current block is obtained through calculation, and motion compensation is performed to obtain a predictor of each sub-block, so as to obtain a predictor of the current block. A candidate motion vector group with a minimum error between a predictor and an original value is selected as a group of optimal motion vector predictors, that is, the target candidate motion vector group. In addition, the determined target candidate motion vector group is used as optimal candidate motion vector predictors of a group of control points, and the target candidate motion vector group corresponds to a unique index number in the candidate motion information list.

Step S723: The video encoder encodes an index corresponding to the target candidate motion vector group, a reference frame index, and an index corresponding to a prediction direction into a to-be-transmitted bitstream.

Optionally, in addition to the foregoing steps S721 to S723, steps S724 and S725 may be further performed in the merge mode.

Step S724: The video encoder obtains a motion vector of each sub-block of the current coding block based on the determined motion vector of the control point of the current coding block by using a parameter-based affine transformation model.

Specifically, the target candidate motion vector group includes motion vectors of two control points (the top-left control point and the top-right control point) or three control points (for example, the top-left control point, the top-right control point, and the bottom-left control point). For each sub-block of the current coding block (one sub-block may be equivalent to one motion compensation unit), motion information of a sample at a preset location in a motion compensation unit may be used to represent motion information of all samples in the motion compensation unit. If a size of the motion compensation unit is M×N (M is less than or equal to the width W of the current coding block, N is less than or equal to the height H of the current coding block, and M, N, W, and H each are a positive integer and are usually a power of 2, for example, 4, 8, 16, 32, 64, or 128), the sample at the preset location may be a center point (M/2, N/2) of the motion compensation unit, a top-left sample (0, 0), a top-right sample (M−1, 0), or a sample at another location. FIG. 8A shows a 4×4 motion compensation unit, and FIG. 8B shows an 8×8 motion compensation unit.

Coordinates of a center point of a motion compensation unit relative to a sample at a top-left vertex of the current coding block are calculated according to a formula (5), where i is an $i^{th}$ motion compensation unit (from left to right) in a horizontal direction, j is a $j^{th}$ motion compensation unit (from top to bottom) in a vertical direction, and $(x_{(i,j)}, y_{(i,j)})$ represent coordinates of a center point of an $(i, j)^{th}$ motion compensation unit relative to the sample at the top-left control point of the current coding block. Then, based on an affine model type (6-parameter or 4-parameter) of the current coding block, $(x_{(i,j)}, y_{(i,j)})$ are substituted into a 6-parameter affine model formula (6-1) or $(x_{(i,j)}, y_{(i,j)})$ are substituted into a 4-parameter affine model formula (6-2) to obtain motion information of a center point of each motion compensation unit, and the motion information is used as motion vectors $(vx_{(i,j)}, vy_{(i,j)})$ of all samples in the motion compensation unit.

Optionally, when the current coding block is a 6-parameter coding block, and motion vectors of one or more sub-blocks of the current coding block are obtained based on the target candidate motion vector group, if a bottom boundary of the current coding block overlaps a bottom boundary of a CTU in which the current coding block is located, a motion vector of a sub-block at the bottom-left corner of the current coding block is obtained through calculation based on location coordinates (0, H) of the bottom-left corner of the current coding block and a 6-parameter affine model constructed by using the three control points, and a motion vector of a sub-block at the bottom-right corner of the current coding block is obtained through calculation based on location coordinates (W, H) of the bottom-right corner of the current coding block and the 6-parameter affine model constructed by using the three control points. For example, the motion vector of the sub-block at the bottom-left corner of the current coding block can be obtained by substituting the location coordinates (0, H) of the bottom-left corner of the current coding block into the 6-parameter affine model (rather than substituting coordinates of a central point of the sub-block at the bottom-left corner into the affine model for calculation), and the motion vector of the sub-block at the bottom-right corner of the current coding block can be obtained by substituting the location coordinates (W, H) of the bottom-right corner of the current coding block into the 6-parameter affine model (rather than substituting coordinates of a central point of the sub-block at the bottom-right corner into the affine model for calculation). In this way, when a motion vector of a bottom-left control point and a motion vector of a bottom-right control point of the current coding block are used (for example, a candidate motion information list of another block is subsequently constructed based on the motion vectors of the bottom-left control point and the bottom-right control point of the current block), accurate values rather than estimated values are used. W is the width of the current coding block, and H is the height of the current coding block.

Optionally, when the current coding block is a 4-parameter coding block, and motion vectors of one or more sub-blocks of the current coding block are obtained based on the target candidate motion vector group, if a bottom boundary of the current coding block overlaps a bottom boundary of a CTU in which the current coding block is located, a motion vector of a sub-block at the bottom-left corner of the current coding block is obtained through calculation based on location coordinates (0, H) of the bottom-left corner of the current coding block and a 4-parameter affine model constructed by using the two control points, and a motion vector of a sub-block at the bottom-right corner of the current coding block is obtained through calculation based on location coordinates (W, H) of the bottom-right corner of the current coding block and the 4-parameter affine model constructed by using the two control points. For example, the motion vector of the sub-block at the bottom-left corner of the current coding block can be obtained by substituting the location coordinates (0, H) of the bottom-left corner of the current coding block into the 4-parameter affine model (rather than substituting coordinates of a central point of the sub-block at the bottom-left corner into the affine model for calculation), and the motion vector of the sub-block at the bottom-right corner of the current coding block can be obtained by substituting the location coordinates (W, H) of the bottom-right corner of the current coding block into the 4-parameter affine model (rather than substituting coordinates of a central point of the sub-block at the bottom-right corner into the affine model for calculation). In this way, when a motion vector of a bottom-left control point and a motion vector of a bottom-right control point of the current coding block are used (for example, a candidate motion information list of another block is subsequently constructed based on the motion vectors of the bottom-left control point and the bottom-right control point of the current block), accurate values rather than estimated values are used. W is the width of the current coding block, and H is the height of the current coding block.

Step S725: The video encoder performs motion compensation based on the motion vector of each sub-block of the current coding block, to obtain a predicted sample value of each sub-block. Specifically, a predicted sample value of the current coding block is predicted based on the motion vectors of the one or more sub-blocks of the current coding block, and a reference frame index and a prediction direction that are indicated by the indices.

It may be understood that, when the coding tree unit CTU in which the first neighboring affine coding block is located is above the current coding block, information about lowermost control points of the first neighboring affine coding block has been read from memory. Therefore, in the foregoing solution, in a process of constructing a candidate motion vector based on the first group of control points of the first neighboring affine coding block, the first group of control points includes the bottom-left control point and the bottom-right control point of the first neighboring affine coding block, instead of fixedly using a top-left control point, a top-right control point, and a bottom-left control point of a first neighboring coding block as a first group of control points in the prior art. Therefore, according to the method of determining the first group of control points in this application, the information that has been read from the memory can be directly reused as information (for example, location coordinates and motion vectors) about the first group of control points, thereby reducing a quantity of times of reading from the memory and improving encoding performance.

In another optional embodiment on an encoder side, if a first neighboring affine coding block is located in a coding tree unit (Coding Tree Unit, CTU) above a current coding block, a group of candidate motion vector predictors is determined based on a bottom-left control point and a bottom-right control point of the first neighboring affine coding block; or if a first neighboring affine coding block is located in a CTU on the left of a current coding block, a group of candidate motion vector predictors is determined based on a top-right control point and a bottom-right control point of the first neighboring affine coding block. Details are as follows:

Step S900: The video encoder determines an inter prediction mode for the current coding block.

Specifically, the inter prediction mode may be an advanced motion vector prediction (Advanced Motion Vector Prediction, AMVP) mode, or may be a merge (merge) mode.

If the determined inter prediction mode for the current coding block is the AMVP mode, steps S911 to S913 are performed.

If the determined inter prediction mode for the current coding block is the merge mode, steps S921 to S923 are performed.

AMVP Mode:

Step S911: The video encoder constructs a candidate motion vector predictor MVP list.

Specifically, the video encoder constructs the candidate motion vector predictor MVP list (also referred to as an affine candidate motion vector list) by using the inter prediction unit (also referred to as an inter prediction module). The construction may be performed in either of the following two manners or a combination of the two manners. The constructed candidate motion vector predictor MVP list may be a triplet candidate motion vector predictor MVP list or a 2-tuple candidate motion vector predictor MVP list. The two manners are specifically as follows:

Manner 1: The candidate motion vector predictor MVP list is constructed by using a motion model-based motion vector prediction method.

First, all or some neighboring blocks of the current coding block are traversed in a pre-specified order, to determine a neighboring affine coding block in the neighboring blocks. There may be one or more determined neighboring affine coding blocks. For example, neighboring blocks A, B, C, D, and E shown in FIG. 7A may be traversed sequentially, to determine a neighboring affine coding block in the neighboring blocks A, B, C, D, and E. The inter prediction unit determines a group of candidate motion vector predictors (each group of candidate motion vector predictors is a 2-tuple or a triplet) based on at least one neighboring affine coding block. The following uses one neighboring affine coding block as an example for description. For ease of description, the neighboring affine coding block is referred to as a first neighboring affine coding block. Details are as follows:

A first affine model is determined based on a motion vector of a control point of the first neighboring affine coding block. Further, a motion vector of a control point of the current coding block is predicted based on the first affine model. A manner of predicting the motion vector of the control point of the current coding block based on the motion vector of the control point of the first neighboring affine coding block varies with a parameter model of the current coding block. Therefore, the following provides descriptions for different cases.

A: The parameter model of the current coding block is a 4-parameter affine transformation model. A derivation manner may be as follows:

If the first neighboring affine coding block is located in a coding tree unit (Coding Tree Unit, CTU) above the current coding block, motion vectors of two lowermost control points of the first neighboring affine coding block are obtained. For example, location coordinates ($x_6$, $y_6$) and a motion vector ($vx_6$, $vy_6$) of a bottom-left control point of the first neighboring affine coding block and location coordinates ($x_7$, $y_7$) and a motion vector ($vx_7$, $vy_7$) of a bottom-right control point of the first neighboring affine coding block may be obtained.

A first affine model (the first affine model obtained in this case is a 4-parameter affine model) is formed based on the motion vectors and location coordinates of the two lowermost control points of the first neighboring affine coding block.

The motion vector of the control point of the current coding block is predicted based on the first affine model. For example, location coordinates of a top-left control point of the current coding block and location coordinates of a top-right control point of the current coding block may be substituted into the first affine model, to predict a motion vector of the top-left control point of the current coding block and a motion vector of the top-right control point of the current coding block. Details are shown in formulas (1) and (2).

In the formulas (1) and (2), ($x_0$, $y_0$) are the coordinates of the top-left control point of the current coding block, and ($x_1$, $y_1$) are the coordinates of the top-right control point of the current coding block. In addition, ($vx_0$, $vy_0$) is the predicted motion vector of the top-left control point of the current coding block, and ($vx_1$, $vy_1$) is the predicted motion vector of the top-right control point of the current coding block.

Optionally, both the location coordinates ($x_6$, $y_6$) of the bottom-left control point and the location coordinates ($x_7$, $y_7$) of the bottom-right control point of the first neighboring affine coding block are calculated based on location coordinates ($x_4$, $y_4$) of a top-left control point of the first neighboring affine coding block. The location coordinates ($x_6$, $y_6$) of the bottom-left control point of the first neighboring affine coding block are ($x_4$, $y_4$+cuH), and the location coordinates ($x_7$, $y_7$) of the bottom-right control point of the first neighboring affine coding block are ($x_4$+cuW, $y_4$+cuH), where cuW is the width of the first neighboring affine coding block, and cuH is the height of the first neighboring affine coding block. In addition, the motion vector of the bottom-left control point of the first neighboring affine coding block is a motion vector of a bottom-left sub-block of the first neighboring affine coding block, and the motion vector of the bottom-right control point of the first neighboring affine coding block is a motion vector of a bottom-right sub-block of the first neighboring affine coding block. It can be learned that in this case, a horizontal distance between the bottom-left control point and the bottom-right control point of the first neighboring affine coding block is cuW, and a horizontal distance between the top-left control point and the top-right control point of the first neighboring affine coding block is cuW. Because cuW is usually a power of 2, in a process of deriving the motion vector of the control point of the current coding block, a right-shifting manner may be used instead of a division operation, to reduce implementation complexity. It can be learned that both the location coordinates of the bottom-left control point and the location coordinates of the bottom-right control point of the first neighboring affine coding block are obtained through derivation, rather than being read from the memory. Therefore, according to this method, a quantity of times of reading from the memory can be further reduced and encoding performance can be improved. In another optional solution, the location coordinates of the bottom-left control point and the location coordinates of the bottom-right control point may be alternatively pre-stored in the memory, and read from the memory for use when necessary.

In this case, in the formulas (1) and (2), ($x_7$–$x_6$) is equal to cuW, ($vx_7$, $vy_7$) may be obtained by reading a motion vector of a location ($x_4$+cuW−1, $y_4$+cuH−1) in a picture, and ($vx_6$, $vy_6$) may be obtained by reading a motion vector of a location ($x_4$, $y_4$+cuH−1) in the picture.

If the first neighboring affine coding block is located in a coding tree unit (Coding Tree Unit, CTU) on the left of the current coding block, motion vectors of two rightmost control points of the first neighboring affine coding block are obtained. For example, location coordinates ($x_5$, $y_5$) and a motion vector ($vx_5$, $vy_5$) of a top-right control point of the first neighboring affine coding block and location coordinates ($x_7$, $y_7$) and a motion vector ($vx_7$, $vy_7$) of a bottom-right control point of the first neighboring affine coding block may be obtained.

A first affine model (the first affine model obtained in this case is a 4-parameter affine model) is formed based on the motion vectors and location coordinates of the two rightmost control points of the first neighboring affine coding block.

The motion vector of the control point of the current coding block is predicted based on the first affine model. For example, location coordinates of a top-left control point of the current coding block and location coordinates of a top-right control point of the current coding block may be substituted into the first affine model, to predict a motion vector of the top-left control point of the current coding block and a motion vector of the top-right control point of the current coding block. Details are shown in formulas (18) and (19).

$$\begin{cases} vx_0 = vx_5 - \frac{(vy_7 - vy_5)}{y_7 - y_5} \times (x_0 - x_5) + \frac{(vx_7 - vx_5)}{y_7 - y_5} \times (y_0 - y_5) \\ vy_0 = vy_5 + \frac{(vx_7 - vx_5)}{y_7 - y_5} \times (x_0 - x_5) + \frac{(vy_7 - vy_5)}{y_7 - y_5} \times (y_0 - y_5) \end{cases} \quad (18)$$

$$\begin{cases} vx_1 = vx_5 - \frac{(vy_7 - vy_5)}{y_7 - y_5} \times (x_1 - x_5) + \frac{(vx_7 - vx_5)}{y_7 - y_5} \times (y_1 - y_5) \\ vy_1 = vy_5 + \frac{(vx_7 - vx_5)}{y_7 - y_5} \times (x_1 - x_5) + \frac{(vy_7 - vy_5)}{y_7 - y_5} \times (y_1 - y_5) \end{cases} \quad (19)$$

In the formulas (18) and (19), ($x_0$, $y_0$) are the coordinates of the top-left control point of the current coding block, and ($x_1$, $y_1$) are the coordinates of the top-right control point of the current coding block. In addition, ($vx_0$, $vy_0$) is the predicted motion vector of the top-left control point of the current coding block, and ($vx_1$, $vy_1$) is the predicted motion vector of the top-right control point of the current coding block.

If the first neighboring affine coding block is not located in the CTU above the current coding block, and is not located in the CTU on the left of the current coding block, a manner of predicting the motion vector of the control point of the current coding block is not limited herein. For example, in this case, the manner of predicting the motion vector of the control point of the current coding block may be the same as or different from the prediction manner used when the first neighboring affine coding block is located in the CTU above the current coding block. For another example, in this case, the manner of predicting the motion vector of the control point of the current coding block may be the same as or different from the prediction manner used when the first neighboring affine coding block is located in the CTU on the left of the current coding block.

Optionally, the candidate motion vector predictor MVP list further includes a second candidate motion vector group, and the second candidate motion vector group is obtained based on a second group of control points of a second neighboring affine coding block. Locations of one or more control points in the second group of control points of the second neighboring affine coding block relative to the second neighboring affine coding block are different from locations of one or more control points in the first group of control points of the first neighboring affine coding block relative to the first neighboring affine coding block (for example, the control points included in the first group of control points of the first neighboring affine coding block are a bottom-left control point, a bottom-right control point, and a top-left control point of the first neighboring affine coding block, but the control points included in the second group of control points of the second neighboring affine coding block are a top-right control point, a bottom-right control point, and a bottom-left control point of the second neighboring affine coding block).

B: The parameter model of the current coding block is a 6-parameter affine transformation model. A derivation manner may be as follows:

If the first neighboring affine coding block is located in a CTU above the current coding block, location coordinates and motion vectors of two lowermost control points of the first neighboring affine coding block are obtained. For example, location coordinates $(x_6, y_6)$ and a motion vector $(vx_6, vy_6)$ of a bottom-left control point of the first neighboring affine coding block and location coordinates $(x_7, y_7)$ and a motion vector $(vx_7, vy_7)$ of a bottom-right control point of the first neighboring affine coding block may be obtained.

A first affine model (the first affine model obtained in this case is a 4-parameter affine model) is formed based on the motion vectors of the two lowermost control points of the first neighboring affine coding block.

The motion vector of the control point of the current coding block is predicted based on the first affine model. For example, location coordinates of a top-left control point of the current coding block, location coordinates of a top-right control point of the current coding block, and location coordinates of a bottom-left control point of the current coding block may be substituted into the first affine model, to predict a motion vector of the top-left control point of the current coding block, a motion vector of the top-right control point of the current coding block, and a motion vector of the bottom-left control point of the current coding block. Details are shown in formulas (1), (2), and (3).

In the formulas (1), (2), and (5), $(x_0, y_0)$ are the coordinates of the top-left control point of the current coding block, $(x_1, y_1)$ are the coordinates of the top-right control point of the current coding block, and $(x_2, y_2)$ are the coordinates of the bottom-left control point of the current coding block. In addition, $(vx_0, vy_0)$ is the predicted motion vector of the top-left control point of the current coding block, $(vx_1, vy_1)$ is the predicted motion vector of the top-right control point of the current coding block, and $(vx_2, vy_2)$ is the predicted motion vector of the bottom-left control point of the current coding block.

Optionally, both the location coordinates $(x_6, y_6)$ of the bottom-left control point and the location coordinates $(x_7, y_7)$ of the bottom-right control point of the first neighboring affine coding block are calculated based on location coordinates $(x_4, y_4)$ of a top-left control point of the first neighboring affine coding block. The location coordinates $(x_6, y_6)$ of the bottom-left control point of the first neighboring affine coding block are $(x_4, y_4+cuH)$, and the location coordinates $(x_7, y_7)$ of the bottom-right control point of the first neighboring affine coding block are $(x_4+cuW, y_4+cuH)$, where cuW is the width of the first neighboring affine coding block, and cuH is the height of the first neighboring affine coding block. In addition, the motion vector of the bottom-left control point of the first neighboring affine coding block is a motion vector of a bottom-left sub-block of the first neighboring affine coding block, and the motion vector of the bottom-right control point of the first neighboring affine coding block is a motion vector of a bottom-right sub-block of the first neighboring affine coding block. It can be learned that in this case, a horizontal distance between the bottom-left control point and the bottom-right control point of the first neighboring affine coding block is cuW, and a horizontal distance between the top-left control point and the top-right control point of the first neighboring affine coding block is cuW. Because cuW is usually a power of 2, in a process of deriving the motion vector of the control point of the current coding block, a right-shifting manner may be used instead of a division operation, to reduce implementation complexity. It can be learned that both the location coordinates of the bottom-left control point and the location coordinates of the bottom-right control point of the first neighboring affine coding block are obtained through derivation, rather than being read from the memory. Therefore, according to this method, a quantity of times of reading from the memory can be further reduced and encoding performance can be improved. In another optional solution, the location coordinates of the bottom-left control point and the location coordinates of the bottom-right control point may be alternatively pre-stored in the memory, and read from the memory for use when necessary.

If the first neighboring affine coding block is located in a CTU on the left of the current coding block, location coordinates and motion vectors of two rightmost control points of the first neighboring affine coding block are obtained. For example, location coordinates $(x_5, y_5)$ and a motion vector $(vx_5, vy_5)$ of a top-right control point of the first neighboring affine coding block and location coordinates $(x_7, y_7)$ and a motion vector $(vx_7, vy_7)$ of a bottom-right control point of the first neighboring affine coding block may be obtained.

A first affine model (the first affine model obtained in this case is a 4-parameter affine model) is formed based on the motion vectors of the two lowermost control points of the first neighboring affine coding block.

The motion vector of the control point of the current coding block is predicted based on the first affine model. For example, location coordinates of a top-left control point of the current coding block, location coordinates of a top-right control point of the current coding block, and location coordinates of a bottom-left control point of the current coding block may be substituted into the first affine model, to predict a motion vector of the top-left control point of the current coding block, a motion vector of the top-right control point of the current coding block, and a motion vector of the bottom-left control point of the current coding block. Details are shown in formulas (18), (19), and (20).

$$\begin{cases} vx_2 = vx_5 - \frac{(vy_7 - vy_5)}{y_7 - y_5} \times (x_2 - x_5) + \frac{(vx_7 - vx_5)}{y_7 - y_5} \times (y_2 - y_5) \\ vy_2 = vy_5 + \frac{(vx_7 - vx_5)}{y_7 - y_5} \times (x_2 - x_5) + \frac{(vy_7 - vy_5)}{y_7 - y_5} \times (y_2 - y_5) \end{cases} \quad (20)$$

In the formulas (18), (19), and (20), $(x_0, y_0)$ are the coordinates of the top-left control point of the current coding block, $(x_1, y_1)$ are the coordinates of the top-right control point of the current coding block, and $(x_2, y_2)$ are the coordinates of the bottom-left control point of the current coding block. In addition, $(vx_0, vy_0)$ is the predicted motion vector of the top-left control point of the current coding block, $(vx_1, vy_1)$ is the predicted motion vector of the top-right control point of the current coding block, and $(vx_2, vy_2)$ is the predicted motion vector of the bottom-left control point of the current coding block.

If the first neighboring affine coding block is not located in the CTU above the current coding block, and is not located in the CTU on the left of the current coding block, a manner of predicting the motion vector of the control point of the current coding block is not limited herein. For example, in this case, the manner of predicting the motion vector of the control point of the current coding block may be the same as or different from the prediction manner used when the first neighboring affine coding block is located in the CTU above the current coding block. For another example, in this case, the manner of predicting the motion vector of the control point of the current coding block may be the same as or different from the prediction manner used when the first neighboring affine coding block is located in the CTU on the left of the current coding block.

Optionally, the candidate motion vector predictor MVP list further includes a second candidate motion vector group, and the second candidate motion vector group is obtained based on a second group of control points of a second neighboring affine coding block. Locations of one or more control points in the second group of control points of the second neighboring affine coding block relative to the second neighboring affine coding block are different from locations of one or more control points in the first group of control points of the first neighboring affine coding block relative to the first neighboring affine coding block (for example, the control points included in the first group of control points of the first neighboring affine coding block are a bottom-left control point, a bottom-right control point, and a top-left control point of the first neighboring affine coding block, but the control points included in the second group of control points of the second neighboring affine coding block are a top-right control point, a bottom-right control point, and a bottom-left control point of the second neighboring affine coding block).

Manner 2: The candidate motion vector predictor MVP list is constructed by using a control point combination-based motion vector prediction method.

Specifically, a principle of the manner 2 is the same as that of the manner 2 in step S711. Therefore, details are not described herein again.

Step S912: The video encoder determines a target candidate motion vector group in the candidate motion vector predictor MVP list according to a rate-distortion cost criterion.

For details, refer to the description of step S712. Details are not described herein again.

Step S913: The video encoder encodes a motion vector difference MVD and an index corresponding to the target candidate motion vector group into a to-be-transmitted bitstream.

For details, refer to the description of step S713. Details are not described herein again.

Merge Mode:

Step S921: The video encoder constructs a candidate motion information list.

Specifically, the video encoder constructs the candidate motion information list (also referred to as an affine candidate motion vector list) by using the inter prediction unit (also referred to as an inter prediction module). The construction may be performed in either of the following two manners or a combination of the two manners. The constructed candidate motion information list is a triplet candidate motion information list. The two manners are specifically as follows:

Manner 1: The candidate motion information list is constructed by using a motion model-based motion vector prediction method.

First, all or some neighboring blocks of the current coding block are traversed in a pre-specified order, to determine a neighboring affine coding block in the neighboring blocks. There may be one or more determined neighboring affine coding blocks. For example, neighboring blocks A, B, C, D, and E shown in FIG. 7A may be traversed sequentially, to determine a neighboring affine coding block in the neighboring blocks A, B, C, D, and E. The inter prediction unit determines a group of candidate motion vector predictors (each group of candidate motion vector predictors is a 2-tuple or a triplet) based on at least one neighboring affine coding block. The following uses one neighboring affine coding block as an example for description. For ease of description, the neighboring affine coding block is referred to as a first neighboring affine coding block. Details are as follows:

A first affine model is determined based on a motion vector of a control point of the first neighboring affine coding block. Further, a motion vector of a control point of the current coding block is predicted based on the first affine model. Details are as follows:

If the first neighboring affine coding block is located in a CTU above the current coding block, location coordinates and motion vectors of two lowermost control points of the first neighboring affine coding block are obtained. For example, location coordinates $(x_6, y_6)$ and a motion vector $(vx_6, vy_6)$ of a bottom-left control point of the first neighboring affine coding block and location coordinates $(x_7, y_7)$ and a motion vector $(vx_7, vy_7)$ of a bottom-right control point of the first neighboring affine coding block may be obtained.

A first affine model (the first affine model obtained in this case is a 4-parameter affine model) is formed based on the motion vectors of the two lowermost control points of the first neighboring affine coding block.

Optionally, the motion vector of the control point of the current coding block is predicted based on the first affine model. For example, location coordinates of a top-left control point of the current coding block, location coordinates of a top-right control point of the current coding block, and location coordinates of a bottom-left control point of the current coding block may be substituted into the first affine model, to predict a motion vector of the top-left control point of the current coding block, a motion vector of the top-right control point of the current coding block, and a motion vector of the bottom-left control point of the current coding block. A candidate motion vector triplet is formed and is added to the candidate motion information list. Details are shown in formulas (1), (2), and (3).

Optionally, the motion vector of the control point of the current coding block is predicted based on the first affine model. For example, location coordinates of a top-left control point of the current coding block and location coordinates of a top-right control point of the current coding block may be substituted into the first affine model, to predict a motion vector of the top-left control point of the current coding block and a motion vector of the top-right control point of the current coding block. A candidate motion vector 2-tuple is formed and is added to the candidate motion information list. Details are shown in formulas (1) and (2).

In the formulas (1), (2), and (3), $(x_0, y_0)$ are the coordinates of the top-left control point of the current coding block, $(x_1, y_1)$ are the coordinates of the top-right control point of the current coding block, and $(x_2, y_2)$ are the coordinates of the bottom-left control point of the current coding block. In addition, $(vx_0, vy_0)$ is the predicted motion vector of the top-left control point of the current coding block, $(vx_1, vy_1)$ is the predicted motion vector of the top-right control point of the current coding block, and $(vx_2, vy_2)$ is the predicted motion vector of the bottom-left control point of the current coding block.

Optionally, both the location coordinates $(x_6, y_6)$ of the bottom-left control point and the location coordinates $(x_7, y_7)$ of the bottom-right control point of the first neighboring affine coding block are calculated based on location coordinates $(x_4, y_4)$ of a top-left control point of the first neighboring affine coding block. The location coordinates $(x_6, y_6)$ of the bottom-left control point of the first neighboring affine coding block are $(x_4, y_4+cuH)$, and the location coordinates $(x_7, y_7)$ of the bottom-right control point of the first neighboring affine coding block are $(x_4+cuW, y_4+cuH)$, where cuW is the width of the first neighboring affine coding block, and cuH is the height of the first neighboring affine coding block. In addition, the motion vector of the bottom-left control point of the first neighboring affine coding block is a motion vector of a bottom-left sub-block of the first neighboring affine coding block, and the motion vector of the bottom-right control point of the first neighboring affine coding block is a motion vector of a bottom-right sub-block of the first neighboring affine coding block. It can be learned that in this case, a horizontal distance between the bottom-left control point and the bottom-right control point of the first neighboring affine coding block is cuW, and a horizontal distance between the top-left control point and the top-right control point of the first neighboring affine coding block is cuW. Because cuW is usually a power of 2, in a process of deriving the motion vector of the control point of the current coding block, a right-shifting manner may be used instead of a division operation, to reduce implementation complexity. It can be learned that both the location coordinates of the bottom-left control point and the location coordinates of the bottom-right control point of the first neighboring affine coding block are obtained through derivation, rather than being read from the memory. Therefore, according to this method, a quantity of times of reading from the memory can be further reduced and encoding performance can be improved. In another optional solution, the location coordinates of the bottom-left control point and the location coordinates of the bottom-right control point may be alternatively pre-stored in the memory, and read from the memory for use when necessary.

If the first neighboring affine coding block is located in a CTU on the left of the current coding block, location coordinates and motion vectors of two rightmost control points of the first neighboring affine coding block are obtained. For example, location coordinates $(x_5, y_5)$ and a motion vector $(vx_5, vy_5)$ of a top-right control point of the first neighboring affine coding block and location coordinates $(x_7, y_7)$ and a motion vector $(vx_7, vy_7)$ of a bottom-right control point of the first neighboring affine coding block may be obtained.

A first affine model (the first affine model obtained in this case is a 4-parameter affine model) is formed based on the motion vectors of the two lowermost control points of the first neighboring affine coding block.

Optionally, the motion vector of the control point of the current coding block is predicted based on the first affine model. For example, location coordinates of a top-left control point of the current coding block, location coordinates of a top-right control point of the current coding block, and location coordinates of a bottom-left control point of the current coding block may be substituted into the first affine model, to predict a motion vector of the top-left control point of the current coding block, a motion vector of the top-right control point of the current coding block, and a motion vector of the bottom-left control point of the current coding block. A candidate motion vector triplet is formed and is added to the candidate motion information list. Details are shown in formulas (18), (19), and (20).

Optionally, the motion vector of the control point of the current coding block is predicted based on the first affine model. For example, location coordinates of a top-left control point of the current coding block and location coordinates of a top-right control point of the current coding block may be substituted into the first affine model, to predict a motion vector of the top-left control point of the current coding block and a motion vector of the top-right control point of the current coding block. A candidate motion vector 2-tuple is formed and is added to the candidate motion information list. Details are shown in formulas (18) and (19).

In the formulas (18), (19), and (20), $(x_0, y_0)$ are the coordinates of the top-left control point of the current coding block, $(x_1, y_1)$ are the coordinates of the top-right control point of the current coding block, and $(x_2, y_2)$ are the coordinates of the bottom-left control point of the current coding block. In addition, $(vx_0, vy_0)$ is the predicted motion vector of the top-left control point of the current coding block, $(vx_1, vy_1)$ is the predicted motion vector of the top-right control point of the current coding block, and $(vx_2, vy_2)$ is the predicted motion vector of the bottom-left control point of the current coding block.

If the first neighboring affine coding block is not located in the CTU above the current coding block, and is not located in the CTU on the left of the current coding block, a manner of predicting the motion vector of the control point of the current coding block is not limited herein. For example, in this case, the manner of predicting the motion vector of the control point of the current coding block may be the same as or different from the prediction manner used when the first neighboring affine coding block is located in the CTU above the current coding block. For another example, in this case, the manner of predicting the motion vector of the control point of the current coding block may be the same as or different from the prediction manner used when the first neighboring affine coding block is located in the CTU on the left of the current coding block.

Optionally, the candidate motion information list further includes a second candidate motion vector group, and the second candidate motion vector group is obtained based on a second group of control points of a second neighboring affine coding block. Locations of one or more control points in the second group of control points of the second neighboring affine coding block relative to the second neighboring affine coding block are different from locations of one or more control points in the first group of control points of the first neighboring affine coding block relative to the first neighboring affine coding block (for example, the control points included in the first group of control points of the first neighboring affine coding block are a bottom-left control point, a bottom-right control point, and a top-left control point of the first neighboring affine coding block, but the control points included in the second group of control points of the second neighboring affine coding block are a top-right control point, a bottom-right control point, and a bottom-left control point of the second neighboring affine coding block).

Manner 2: The candidate motion information list is constructed by using a control point combination-based motion vector prediction method.

Specifically, a principle of the manner 2 is the same as that of the manner 2 in step S721. Therefore, details are not described herein again.

Step S922: The video encoder determines a target candidate motion vector group in the candidate motion information list according to a rate-distortion cost criterion.

For details, refer to the description of step S722. Details are not described herein again.

Step S923: The video encoder encodes an index corresponding to the target candidate motion vector group, an index corresponding to a reference frame index, and an index corresponding to a prediction direction into a to-be-transmitted bitstream.

For details, refer to the description of step S723. Details are not described herein again.

Step S924: The video encoder obtains a motion vector of each sub-block of the current coding block based on motion vectors of three control points of the current coding block by using a 6-parameter affine transformation model.

For details, refer to the description of step S724. Details are not described herein again.

Step S925: The video encoder performs motion compensation based on the motion vector of each sub-block of the current coding block, to obtain a predicted sample value of each sub-block.

For details, refer to the description of step S725. Details are not described herein again.

It may be understood that, when the coding tree unit CTU in which the first neighboring affine coding block is located is above the current coding block, information about lowermost control points of the first neighboring affine coding block has been read from memory. When the coding tree unit CTU in which the first neighboring affine coding block is located is on the left of the current coding block, information about rightmost control points of the first neighboring affine coding block has been read from memory. Therefore, in the foregoing solution, in a process of constructing a candidate motion vector based on the first group of control points of the first neighboring affine coding block, the first group of control points are control points determined based on a coding tree unit CTU located relative to the current coding block, wherein the first neighboring affine coding block is located in the CTU, instead of fixedly using a top-left control point, a top-right control point, and a bottom-left control point of a first neighboring coding block as a first group of control points in the prior art. Therefore, according to the method of determining the first group of control points in this application, the information that has been read from the memory can be directly reused as information (for example, location coordinates and motion vectors) about the first group of control points, thereby reducing a quantity of times of reading from the memory and improving encoding performance.

In another optional embodiment on an encoder side, if a first neighboring affine coding block is located in a coding tree unit (Coding Tree Unit, CTU) above a current coding block, a group of candidate motion vector predictors is determined based on a bottom-left control point, a bottom-right control point, and a top-right control point of the first neighboring affine coding block.

Details are as follows:

Step S1000: The video encoder determines an inter prediction mode for the current coding block.

Specifically, the inter prediction mode may be an advanced motion vector prediction (Advanced Motion Vector Prediction, AMVP) mode, or may be a merge (merge) mode.

If the determined inter prediction mode for the current coding block is the AMVP mode, steps S1011 to S1013 are performed.

If the determined inter prediction mode for the current coding block is the merge mode, steps S1021 to S1023 are performed.

AMVP Mode:

Step S1011: The video encoder constructs a candidate motion vector predictor MVP list.

Specifically, the video encoder constructs the candidate motion vector predictor MVP list (also referred to as an affine candidate motion vector list) by using the inter prediction unit (also referred to as an inter prediction module). The construction may be performed in either of the following two manners or a combination of the two manners. The constructed candidate motion vector predictor MVP list may be a triplet candidate motion vector predictor MVP list or a 2-tuple candidate motion vector predictor MVP list. The two manners are specifically as follows:

Manner 1: The candidate motion vector predictor MVP list is constructed by using a motion model-based motion vector prediction method.

First, all or some neighboring blocks of the current coding block are traversed in a pre-specified order, to determine a neighboring affine coding block in the neighboring blocks. There may be one or more determined neighboring affine coding blocks. For example, neighboring blocks A, B, C, D, and E shown in FIG. 7A may be traversed sequentially, to determine a neighboring affine coding block in the neighboring blocks A, B, C, D, and E. The inter prediction unit determines a group of candidate motion vector predictors (each group of candidate motion vector predictors is a 2-tuple or a triplet) based on at least one neighboring affine coding block. The following uses one neighboring affine coding block as an example for description. For ease of description, the neighboring affine coding block is referred to as a first neighboring affine coding block. Details are as follows:

A first affine model is determined based on a motion vector of a control point of the first neighboring affine coding block. Further, a motion vector of a control point of the current coding block is predicted based on the first affine model. A manner of predicting the motion vector of the control point of the current coding block based on the motion vector of the control point of the first neighboring affine coding block varies with a parameter model of the current coding block. Therefore, the following provides descriptions for different cases.

A: The parameter model of the current coding block is a 4-parameter affine transformation model. A derivation manner may be as follows:

If the first neighboring affine coding block is located in a coding tree unit (Coding Tree Unit, CTU) above the current coding block, motion vectors of a top-left control point and two lowermost control points of the first neighboring affine coding block are obtained. For example, location coordinates $(x_4, y_4)$ and a motion vector $(vx_4, vy_4)$ of the top-left control point of the first neighboring affine coding block, location coordinates $(x_6, y_6)$ and a motion vector $(vx_6, vy_6)$ of a bottom-left control point of the first neighboring affine coding block, and location coordinates $(x_7, y_7)$ and a motion vector $(vx_7, vy_7)$ of a bottom-right control point of the first neighboring affine coding block may be obtained.

A first affine model (the first affine model obtained in this case is a 6-parameter affine model) is formed based on the location coordinates and the motion vector of the top-left control point of the first neighboring affine coding block, the location coordinates and the motion vector of the bottom-left control point of the first neighboring affine coding block, and the location coordinates and the motion vector of the bottom-right control point of the first neighboring affine coding block.

The motion vector of the control point of the current coding block is predicted based on the first affine model. For example, location coordinates of a top-left control point of the current coding block and location coordinates of a top-right control point of the current coding block may be substituted into the first affine model, to predict a motion vector of the top-left control point of the current coding block and a motion vector of the top-right control point of the current coding block. Details are shown in formulas (21) and (22).

$$\begin{cases} vx_0 = vx_6 + \frac{(vx_7 - vx_6)}{x_7 - x_6} \times (x_0 - x_6) + \frac{(vx_4 - vx_6)}{y_4 - y_6} \times (y_0 - y_6) \\ vy_0 = vy_6 + \frac{(vy_7 - vy_6)}{x_7 - x_6} \times (x_0 - x_6) + \frac{(vy_4 - vy_6)}{y_7 - y_6} \times (y_0 - y_6) \end{cases} \quad (21)$$

$$\begin{cases} vx_1 = vx_6 + \frac{(vx_7 - vx_6)}{x_7 - x_6} \times (x_1 - x_6) + \frac{(vx_4 - vx_6)}{y_4 - y_6} \times (y_1 - y_6) \\ vy_1 = vy_6 + \frac{(vy_7 - vy_6)}{x_7 - x_6} \times (x_1 - x_6) + \frac{(vy_4 - vy_6)}{y_7 - y_6} \times (y_1 - y_6) \end{cases} \quad (22)$$

In the formulas (21) and (22), $(x_0, y_0)$ are the coordinates of the top-left control point of the current coding block, and $(x_1, y_1)$ are the coordinates of the top-right control point of the current coding block. In addition, $(vx_0, vy_0)$ is the predicted motion vector of the top-left control point of the current coding block, and $(vx_1, vy_1)$ is the predicted motion vector of the top-right control point of the current coding block.

Optionally, both the location coordinates $(x_6, y_6)$ of the bottom-left control point and the location coordinates $(x_7, y_7)$ of the bottom-right control point of the first neighboring affine coding block are calculated based on location coordinates $(x_4, y_4)$ of a top-left control point of the first neighboring affine coding block. The location coordinates $(x_6, y_6)$ of the bottom-left control point of the first neighboring affine coding block are $(x_4, y_4+cuH)$, and the location coordinates $(x_7, y_7)$ of the bottom-right control point of the first neighboring affine coding block are $(x_4+cuW, y_4+cuH)$, where cuW is the width of the first neighboring affine coding block, and cuH is the height of the first neighboring affine coding block. In addition, the motion vector of the bottom-left control point of the first neighboring affine coding block is a motion vector of a bottom-left sub-block of the first neighboring affine coding block, and the motion vector of the bottom-right control point of the first neighboring affine coding block is a motion vector of a bottom-right sub-block of the first neighboring affine coding block. It can be learned that in this case, a horizontal distance between the bottom-left control point and the bottom-right control point of the first neighboring affine coding block is cuW, and a horizontal distance between the top-left control point and the top-right control point of the first neighboring affine coding block is cuW. Because cuW is usually a power of 2, in a process of deriving the motion vector of the control point of the current coding block, a right-shifting manner may be used instead of a division operation, to reduce implementation complexity. It can be learned that both the location coordinates of the bottom-left control point and the location coordinates of the bottom-right control point of the first neighboring affine coding block are obtained through derivation, rather than being read from the memory. Therefore, according to this method, a quantity of times of reading from the memory can be further reduced and encoding performance can be improved. In another optional solution, the location coordinates of the bottom-left control point and the location coordinates of the bottom-right control point may be alternatively pre-stored in the memory, and read from the memory for use when necessary.

In this case, in the formulas (21) and (22), $(x_7-x_6)$ is equal to cuW, $(vx_7, vy_7)$ may be obtained by reading a motion vector of a location $(x_4+cuW-1, y_4+cuH-1)$ in a picture, and $(vx_6, vy_6)$ may be obtained by reading a motion vector of a location $(x_4, y_4+cuH-1)$ in the picture.

If the first neighboring affine coding block is not located in the CTU above the current coding block, a manner of predicting the motion vector of the control point of the current coding block is not limited herein. Specifically, in this case, the manner of predicting the motion vector of the control point of the current coding block may be the same as or different from the prediction manner used when the first neighboring affine coding block is located in the CTU above the current coding block.

B: The parameter model of the current coding block is a 6-parameter affine transformation model. A derivation manner may be as follows:

If the first neighboring affine coding block is located in a CTU above the current coding block, location coordinates and motion vectors of a top-left control point and two lowermost control points of the first neighboring affine coding block are obtained. For example, location coordinates $(x_4, y_4)$ and a motion vector $(vx_4, vy_4)$ of the top-left control point of the first neighboring affine coding block, location coordinates $(x_6, y_6)$ and a motion vector $(vx_6, vy_6)$ of a bottom-left control point of the first neighboring affine coding block, and location coordinates $(x_7, y_7)$ and a motion vector $(vx_7, vy_7)$ of a bottom-right control point of the first neighboring affine coding block may be obtained.

A first affine model (the first affine model obtained in this case is a 6-parameter affine model) is formed based on the location coordinates and the motion vector of the top-left control point of the first neighboring affine coding block, the location coordinates and the motion vector of the bottom-left control point of the first neighboring affine coding block, and the location coordinates and the motion vector of the bottom-right control point of the first neighboring affine coding block.

The motion vector of the control point of the current coding block is predicted based on the first affine model. For example, location coordinates of a top-left control point of the current coding block, location coordinates of a top-right control point of the current coding block, and location coordinates of a bottom-left control point of the current coding block may be substituted into the first affine model, to predict a motion vector of the top-left control point of the current coding block, a motion vector of the top-right control point of the current coding block, and a motion vector of the bottom-left control point of the current coding block. Details are shown in formulas (21), (22), and (23).

$$\begin{cases} vx_2 = vx_6 + \dfrac{(vx_7 - vx_6)}{x_7 - x_6} \times (x_2 - x_6) + \dfrac{(vx_4 - vx_6)}{y_4 - y_6} \times (y_2 - y_6) \\ vy_2 = vy_6 + \dfrac{(vy_7 - vy_6)}{x_7 - x_6} \times (x_2 - x_6) + \dfrac{(vy_4 - vy_6)}{y_7 - y_6} \times (y_2 - y_6) \end{cases} \quad (23)$$

In the formulas (21), (22), and (23), $(x_0, y_0)$ are the coordinates of the top-left control point of the current coding block, $(x_1, y_1)$ are the coordinates of the top-right control point of the current coding block, and $(x_2, y_2)$ are the coordinates of the bottom-left control point of the current coding block. In addition, $(vx_0, vy_0)$ is the predicted motion vector of the top-left control point of the current coding block, $(vx_1, vy_1)$ is the predicted motion vector of the top-right control point of the current coding block, and $(vx_2, vy_2)$ is the predicted motion vector of the bottom-left control point of the current coding block.

If the first neighboring affine coding block is not located in the CTU above the current coding block, a manner of predicting the motion vector of the control point of the current coding block is not limited herein. Specifically, in this case, the manner of predicting the motion vector of the control point of the current coding block may be the same as or different from the prediction manner used when the first neighboring affine coding block is located in the CTU above the current coding block.

Manner 2: The candidate motion vector predictor MVP list is constructed by using a control point combination-based motion vector prediction method.

Specifically, a principle of the manner 2 is the same as that of the manner 2 in step S711. Therefore, details are not described herein again.

Step S1012: The video encoder determines a target candidate motion vector group in the candidate motion vector predictor MVP list according to a rate-distortion cost criterion.

For details, refer to the description of step S712. Details are not described herein again.

Step S1013: The video encoder encodes a motion vector difference MVD and an index corresponding to the target candidate motion vector group into a to-be-transmitted bitstream.

For details, refer to the description of step S713. Details are not described herein again.

Merge Mode:

Step S1021: The video encoder constructs a candidate motion information list.

Specifically, the video encoder constructs the candidate motion information list (also referred to as an affine candidate motion vector list) by using the inter prediction unit (also referred to as an inter prediction module). The construction may be performed in either of the following two manners or a combination of the two manners. The constructed candidate motion information list is a triplet candidate motion information list. The two manners are specifically as follows:

Manner 1: The candidate motion information list is constructed by using a motion model-based motion vector prediction method.

First, all or some neighboring blocks of the current coding block are traversed in a pre-specified order, to determine a neighboring affine coding block in the neighboring blocks. There may be one or more determined neighboring affine coding blocks. For example, neighboring blocks A, B, C, D, and E shown in FIG. 7A may be traversed sequentially, to determine a neighboring affine coding block in the neighboring blocks A, B, C, D, and E. The inter prediction unit determines a group of candidate motion vector predictors (each group of candidate motion vector predictors is a 2-tuple or a triplet) based on at least one neighboring affine coding block. The following uses one neighboring affine coding block as an example for description. For ease of description, the neighboring affine coding block is referred to as a first neighboring affine coding block. Details are as follows:

A first affine model is determined based on a motion vector of a control point of the first neighboring affine coding block. Further, a motion vector of a control point of the current coding block is predicted based on the first affine model. Details are as follows:

If the first neighboring affine coding block is located in a CTU above the current coding block, location coordinates and motion vectors of a top-left control point and two lowermost control points of the first neighboring affine coding block are obtained. For example, location coordinates $(x_4, y_4)$ and a motion vector $(vx_4, vy_4)$ of the top-left control point of the first neighboring affine coding block, location coordinates $(x_6, y_6)$ and a motion vector $(vx_6, vy_6)$ of a bottom-left control point of the first neighboring affine coding block, and location coordinates $(x_7, y_7)$ and a motion vector $(vx_7, vy_7)$ of a bottom-right control point of the first neighboring affine coding block may be obtained.

A first affine model (the first affine model obtained in this case is a 6-parameter affine model) is formed based on the location coordinates and the motion vector of the top-left control point of the first neighboring affine coding block, the location coordinates and the motion vector of the bottom-left control point of the first neighboring affine coding block, and the location coordinates and the motion vector of the bottom-right control point of the first neighboring affine coding block.

Optionally, the motion vector of the control point of the current coding block is predicted based on the first affine model. For example, location coordinates of a top-left control point of the current coding block, location coordinates of a top-right control point of the current coding block, and location coordinates of a bottom-left control point of the current coding block may be substituted into the first affine model, to predict a motion vector of the top-left control point of the current coding block, a motion vector of the top-right control point of the current coding block, and a motion vector of the bottom-left control point of the current coding block. A candidate motion vector triplet is formed and is added to the candidate motion information list. Details are shown in formulas (21), (22), and (23).

Optionally, the motion vector of the control point of the current coding block is predicted based on the first affine model. For example, location coordinates of a top-left control point of the current coding block and location coordinates of a top-right control point of the current coding block may be substituted into the first affine model, to predict a motion vector of the top-left control point of the current coding block and a motion vector of the top-right control point of the current coding block. A candidate motion vector 2-tuple is formed and is added to the candidate motion information list. Details are shown in formulas (21) and (22).

In the formulas (21), (22), and (23), $(x_0, y_0)$ are the coordinates of the top-left control point of the current coding block, $(x_1, y_1)$ are the coordinates of the top-right control point of the current coding block, and $(x_2, y_2)$ are the coordinates of the bottom-left control point of the current coding block. In addition, $(vx_0, vy_0)$ is the predicted motion vector of the top-left control point of the current coding block, $(vx_1, vy_1)$ is the predicted motion vector of the top-right control point of the current coding block, and $(vx_2, vy_2)$ is the predicted motion vector of the bottom-left control point of the current coding block.

If the first neighboring affine coding block is not located in the CTU above the current coding block, a manner of predicting the motion vector of the control point of the current coding block is not limited herein. Specifically, in this case, the manner of predicting the motion vector of the control point of the current coding block may be the same as or different from the prediction manner used when the first neighboring affine coding block is located in the CTU above the current coding block.

Manner 2: The candidate motion information list is constructed by using a control point combination-based motion vector prediction method.

Specifically, a principle of the manner 2 is the same as that of the manner 2 in step S721. Therefore, details are not described herein again.

Step S1022: The video encoder determines a target candidate motion vector group in the candidate motion information list according to a rate-distortion cost criterion.

For details, refer to the description of step S722. Details are not described herein again.

Step S1023: The video encoder encodes an index corresponding to the target candidate motion vector group into a to-be-transmitted bitstream.

For details, refer to the description of step S723. Details are not described herein again.

It may be understood that, when the coding tree unit CTU in which the first neighboring affine coding block is located is above the current coding block, information about lowermost control points of the first neighboring affine coding block has been read from memory. Therefore, in the foregoing solution, in a process of constructing a candidate motion vector based on the first group of control points of the first neighboring affine coding block, the first group of control points includes the bottom-left control point and the bottom-right control point of the first neighboring affine coding block, instead of fixedly using a top-left control point, a top-right control point, and a bottom-left control point of a first neighboring coding block as a first group of control points in the prior art. Therefore, according to the method of determining the first group of control points in this application, the information that has been read from the memory can be directly reused as information (for example, location coordinates and motion vectors) about the first group of control points, thereby reducing a quantity of times of reading from the memory and improving encoding performance.

In another optional embodiment on an encoder side, regardless of a location of a first neighboring affine coding block relative to a current coding block, a group of candidate motion vector predictors is directly determined based on a bottom-left control point and a bottom-right control point of the first neighboring affine coding block. Detailed descriptions are as follows:

Step S1100: The video encoder determines an inter prediction mode for the current coding block.

Specifically, the inter prediction mode may be an advanced motion vector prediction (Advanced Motion Vector Prediction, AMVP) mode, or may be a merge (merge) mode.

If the determined inter prediction mode for the current coding block is the AMVP mode, steps S1111 to S1113 are performed.

If the determined inter prediction mode for the current coding block is the merge mode, steps S1121 to S1123 are performed.

AMVP Mode:

Step S1111: The video encoder constructs a candidate motion vector predictor MVP list.

Specifically, the video encoder constructs the candidate motion vector predictor MVP list (also referred to as an affine candidate motion vector list) by using the inter prediction unit (also referred to as an inter prediction module). The construction may be performed in either of the following two manners or a combination of the two manners. The constructed candidate motion vector predictor MVP list may be a triplet candidate motion vector predictor MVP list or a 2-tuple candidate motion vector predictor MVP list. The two manners are specifically as follows:

Manner 1: The candidate motion vector predictor MVP list is constructed by using a motion model-based motion vector prediction method.

First, all or some neighboring blocks of the current coding block are traversed in a pre-specified order, to determine a neighboring affine coding block in the neighboring blocks. There may be one or more determined neighboring affine coding blocks. For example, neighboring blocks A, B, C, D, and E shown in FIG. 7A may be traversed sequentially, to determine a neighboring affine coding block in the neighboring blocks A, B, C, D, and E. The inter prediction unit determines a group of candidate motion vector predictors (each group of candidate motion vector predictors is a 2-tuple or a triplet) based on at least one neighboring affine coding block. The following uses one neighboring affine coding block as an example for description. For ease of description, the neighboring affine coding block is referred to as a first neighboring affine coding block. Details are as follows:

A first affine model is determined based on a motion vector of a control point of the first neighboring affine coding block. Further, a motion vector of a control point of the current coding block is predicted based on the first affine model. A manner of predicting the motion vector of the control point of the current coding block based on the motion vector of the control point of the first neighboring affine coding block varies with a parameter model of the current coding block. Therefore, the following provides descriptions for different cases.

A: The parameter model of the current coding block is a 4-parameter affine transformation model. A derivation manner may be as follows:

Regardless of the location of the first neighboring affine coding block relative to the current coding block, motion vectors of a top-left control point and two lowermost control points of the first neighboring affine coding block are directly obtained. For example, location coordinates ($x_4$, $y_4$) and a motion vector ($vx_4$, $vy_4$) of the top-left control point of the first neighboring affine coding block, location coordinates ($x_6$, $y_6$) and a motion vector ($vx_6$, $vy_6$) of a bottom-left control point of the first neighboring affine coding block, and location coordinates ($x_7$, $y_7$) and a motion vector ($vx_7$, $vy_7$) of a bottom-right control point of the first neighboring affine coding block may be obtained.

A first affine model (the first affine model obtained in this case is a 6-parameter affine model) is formed based on the location coordinates and the motion vector of the top-left control point of the first neighboring affine coding block, the location coordinates and the motion vector of the bottom-left control point of the first neighboring affine coding block, and the location coordinates and the motion vector of the bottom-right control point of the first neighboring affine coding block.

The motion vector of the control point of the current coding block is predicted based on the first affine model. For example, location coordinates of a top-left control point of the current coding block and location coordinates of a top-right control point of the current coding block may be substituted into the first affine model, to predict a motion vector of the top-left control point of the current coding block and a motion vector of the top-right control point of the current coding block. Details are shown in formulas (21) and (22).

$$\begin{cases} vx_0 = vx_6 + \frac{(vx_7 - vx_6)}{x_7 - x_6} \times (x_0 - x_6) + \frac{(vx_4 - vx_6)}{y_4 - y_6} \times (y_0 - y_6) \\ vy_0 = vy_6 + \frac{(vy_7 - vy_6)}{x_7 - x_6} \times (x_0 - x_6) + \frac{(vy_4 - vy_6)}{y_7 - y_6} \times (y_0 - y_6) \end{cases} \quad (21)$$

$$\begin{cases} vx_1 = vx_6 + \frac{(vx_7 - vx_6)}{x_7 - x_6} \times (x_1 - x_6) + \frac{(vx_4 - vx_6)}{y_4 - y_6} \times (y_1 - y_6) \\ vy_1 = vy_6 + \frac{(vy_7 - vy_6)}{x_7 - x_6} \times (x_1 - x_6) + \frac{(vy_4 - vy_6)}{y_7 - y_6} \times (y_1 - y_6) \end{cases} \quad (22)$$

In the formulas (21) and (22), ($x_0$, $y_0$) are the coordinates of the top-left control point of the current coding block, and ($x_1$, $y_1$) are the coordinates of the top-right control point of the current coding block. In addition, ($vx_0$, $vy_0$) is the predicted motion vector of the top-left control point of the current coding block, and ($vx_1$, $vy_1$) is the predicted motion vector of the top-right control point of the current coding block.

Optionally, both the location coordinates ($x_6$, $y_6$) of the bottom-left control point and the location coordinates ($x_7$, $y_7$) of the bottom-right control point of the first neighboring affine coding block are calculated based on location coordinates ($x_4$, $y_4$) of a top-left control point of the first neighboring affine coding block. The location coordinates ($x_6$, $y_6$) of the bottom-left control point of the first neighboring affine coding block are ($x_4$, $y_4$+cuH), and the location coordinates ($x_7$, $y_7$) of the bottom-right control point of the first neighboring affine coding block are ($x_4$+cuW, $y_4$+cuH), where cuW is the width of the first neighboring affine coding block, and cuH is the height of the first neighboring affine coding block. In addition, the motion vector of the bottom-left control point of the first neighboring affine coding block is a motion vector of a bottom-left sub-block of the first neighboring affine coding block, and the motion vector of the bottom-right control point of the first neighboring affine coding block is a motion vector of a bottom-right sub-block of the first neighboring affine coding block. It can be learned that in this case, a horizontal distance between the bottom-left control point and the bottom-right control point of the first neighboring affine coding block is cuW, and a horizontal distance between the top-left control point and the top-right control point of the first neighboring affine coding block is cuW. Because cuW is usually a power of 2, in a process of deriving the motion vector of the control point of the current coding block, a right-shifting manner may be used instead of a division operation, to reduce implementation complexity.

It can be learned that both the location coordinates of the bottom-left control point and the location coordinates of the bottom-right control point of the first neighboring affine coding block are obtained through derivation, rather than being read from the memory. Therefore, according to this method, a quantity of times of reading from the memory can be further reduced and encoding performance can be improved. In another optional solution, the location coordinates of the bottom-left control point and the location coordinates of the bottom-right control point may be alternatively pre-stored in the memory, and read from the memory for use when necessary.

In this case, in the formulas (21) and (22), ($x_7$−$x_6$) is equal to cuW, ($vx_7$, $vy_7$) may be obtained by reading a motion vector of a location ($x_4$+cuW−1, $y_4$+cuH−1) in a picture, and ($vx_6$, $vy_6$) may be obtained by reading a motion vector of a location ($x_4$, $y_4$+cuH−1) in the picture.

Optionally, the candidate motion vector predictor MVP list further includes a second candidate motion vector group, the second candidate motion vector group is obtained based on a second group of control points of a second neighboring affine coding block, and the second group of control points of the second neighboring affine coding block includes a bottom-left control point and a bottom-right control point of the second neighboring affine coding block.

B: The parameter model of the current coding block is a 6-parameter affine transformation model. A derivation manner may be as follows:

Regardless of the location of the first neighboring affine coding block relative to the current coding block, location coordinates and motion vectors of a top-left control point and two lowermost control points of the first neighboring affine coding block are directly obtained. For example, location coordinates ($x_4$, $y_4$) and a motion vector ($vx_4$, $vy_4$) of the top-left control point of the first neighboring affine coding block, location coordinates ($x_6$, $y_6$) and a motion vector ($vx_6$, $vy_6$) of a bottom-left control point of the first neighboring affine coding block, and location coordinates ($x_7$, $y_7$) and a motion vector ($vx_7$, $vy_7$) of a bottom-right control point of the first neighboring affine coding block may be obtained.

A first affine model (the first affine model obtained in this case is a 6-parameter affine model) is formed based on the location coordinates and the motion vector of the top-left control point of the first neighboring affine coding block, the location coordinates and the motion vector of the bottom-left control point of the first neighboring affine coding block, and the location coordinates and the motion vector of the bottom-right control point of the first neighboring affine coding block.

The motion vector of the control point of the current coding block is predicted based on the first affine model. For example, location coordinates of a top-left control point of the current coding block, location coordinates of a top-right control point of the current coding block, and location coordinates of a bottom-left control point of the current coding block may be substituted into the first affine model, to predict a motion vector of the top-left control point of the current coding block, a motion vector of the top-right control point of the current coding block, and a motion vector of the bottom-left control point of the current coding block. Details are shown in formulas (21), (22), and (23).

In the formulas (21), (22), and (23), $(x_0, y_0)$ are the coordinates of the top-left control point of the current coding block, $(x_1, y_1)$ are the coordinates of the top-right control point of the current coding block, and $(x_2, y_2)$ are the coordinates of the bottom-left control point of the current coding block. In addition, $(vx_0, vy_0)$ is the predicted motion vector of the top-left control point of the current coding block, $(vx_1, vy_1)$ is the predicted motion vector of the top-right control point of the current coding block, and $(vx_2, vy_2)$ is the predicted motion vector of the bottom-left control point of the current coding block.

Optionally, the candidate motion vector predictor MVP list further includes a second candidate motion vector group, the second candidate motion vector group is obtained based on a second group of control points of a second neighboring affine coding block, and the second group of control points of the second neighboring affine coding block includes a bottom-left control point and a bottom-right control point of the second neighboring affine coding block.

Manner 2: The candidate motion vector predictor MVP list is constructed by using a control point combination-based motion vector prediction method.

Specifically, a principle of the manner 2 is the same as that of the manner 2 in step S711. Therefore, details are not described herein again.

Step S1112: The video encoder determines a target candidate motion vector group in the candidate motion vector predictor MVP list according to a rate-distortion cost criterion.

For details, refer to the description of step S712. Details are not described herein again.

Step S1113: The video encoder encodes a motion vector difference MVD and an index corresponding to the target candidate motion vector group into a to-be-transmitted bitstream.

For details, refer to the description of step S713. Details are not described herein again.

Merge Mode:

Step S1121: The video encoder constructs an affine candidate motion vector list.

Specifically, the video encoder constructs the affine candidate motion vector list (also referred to as a candidate motion vector list) by using the inter prediction unit (also referred to as an inter prediction module). The construction may be performed in either of the following two manners or a combination of the two manners. The constructed affine candidate motion vector list is a triplet affine candidate motion vector list. The two manners are specifically as follows:

Manner 1: The affine candidate motion vector list is constructed by using a motion model-based motion vector prediction method.

First, all or some neighboring blocks of the current coding block are traversed in a pre-specified order, to determine a neighboring affine coding block in the neighboring blocks. There may be one or more determined neighboring affine coding blocks. For example, neighboring blocks A, B, C, D, and E shown in FIG. 7A may be traversed sequentially, to determine a neighboring affine coding block in the neighboring blocks A, B, C, D, and E. The inter prediction unit determines a group of candidate motion vector predictors (each group of candidate motion vector predictors is a 2-tuple or a triplet) based on at least one neighboring affine coding block. The following uses one neighboring affine coding block as an example for description. For ease of description, the neighboring affine coding block is referred to as a first neighboring affine coding block. Details are as follows:

A first affine model is determined based on a motion vector of a control point of the first neighboring affine coding block. Further, a motion vector of a control point of the current coding block is predicted based on the first affine model. Details are as follows:

Regardless of the location of the first neighboring affine coding block relative to the current coding block, location coordinates and motion vectors of a top-left control point and two lowermost control points of the first neighboring affine coding block are directly obtained. For example, location coordinates $(x_4, y_4)$ and a motion vector $(vx_4, vy_4)$ of the top-left control point of the first neighboring affine coding block, location coordinates $(x_6, y_6)$ and a motion vector $(vx_6, vy_6)$ of a bottom-left control point of the first neighboring affine coding block, and location coordinates $(x_7, y_7)$ and a motion vector $(vx_7, vy_7)$ of a bottom-right control point of the first neighboring affine coding block may be obtained.

A first affine model (the first affine model obtained in this case is a 6-parameter affine model) is formed based on the location coordinates and the motion vector of the top-left control point of the first neighboring affine coding block, the location coordinates and the motion vector of the bottom-left control point of the first neighboring affine coding block, and the location coordinates and the motion vector of the bottom-right control point of the first neighboring affine coding block.

Optionally, the motion vector of the control point of the current coding block is predicted based on the first affine model. For example, location coordinates of a top-left control point of the current coding block, location coordinates of a top-right control point of the current coding block, and location coordinates of a bottom-left control point of the current coding block may be substituted into the first affine model, to predict a motion vector of the top-left control point of the current coding block, a motion vector of the top-right control point of the current coding block, and a motion vector of the bottom-left control point of the current coding block. A candidate motion vector triplet is formed and is added to the affine candidate motion vector list. Details are shown in formulas (21), (22), and (23).

Optionally, the motion vector of the control point of the current coding block is predicted based on the first affine model. For example, location coordinates of a top-left control point of the current coding block and location coordinates of a top-right control point of the current coding block may be substituted into the first affine model, to predict a motion vector of the top-left control point of the current coding block and a motion vector of the top-right control point of the current coding block. A candidate motion vector 2-tuple is formed and is added to the affine candidate motion vector list. Details are shown in formulas (21) and (22).

In the formulas (21), (22), and (23), $(x_0, y_0)$ are the coordinates of the top-left control point of the current coding block, $(x_1, y_1)$ are the coordinates of the top-right control point of the current coding block, and $(x_2, y_2)$ are the coordinates of the bottom-left control point of the current coding block. In addition, $(vx_0, vy_0)$ is the predicted motion vector of the top-left control point of the current coding block, $(vx_1, vy_1)$ is the predicted motion vector of the top-right control point of the current coding block, and $(vx_2,$ vy$_2$) is the predicted motion vector of the bottom-left control point of the current coding block.

Optionally, the affine candidate motion vector list further includes a second candidate motion vector group, the second candidate motion vector group is obtained based on a second group of control points of a second neighboring affine coding block, and the second group of control points of the second neighboring affine coding block includes a bottom-left control point and a bottom-right control point of the second neighboring affine coding block.

Manner 2: The affine candidate motion vector list is constructed by using a control point combination-based motion vector prediction method.

Specifically, a principle of the manner 2 is the same as that of the manner 2 in step S721. Therefore, details are not described herein again.

Step S1122: The video encoder determines a target candidate motion vector group in the affine candidate motion vector list according to a rate-distortion cost criterion.

For details, refer to the description of step S712. Details are not described herein again.

Step S1123: The video encoder encodes an index corresponding to the target candidate motion vector group into a to-be-transmitted bitstream.

For details, refer to the description of step S713. Details are not described herein again.

It may be understood that, when the coding tree unit CTU in which the first neighboring affine coding block is located is above the current coding block, information about lowermost control points of the first neighboring affine coding block has been read from memory. Therefore, in the foregoing solution, in a process of constructing a candidate motion vector based on the first group of control points of the first neighboring affine coding block, the first group of control points includes the bottom-left control point and the bottom-right control point of the first neighboring affine coding block, instead of fixedly using a top-left control point, a top-right control point, and a bottom-left control point of a first neighboring coding block as a first group of control points in the prior art. Therefore, according to the method of determining the first group of control points in this application, there is a very high probability that the information that has been read from the memory can be directly reused as information (for example, location coordinates and motion vectors) about the first group of control points, thereby reducing a quantity of times of reading from the memory and improving encoding performance.

Figure 9:
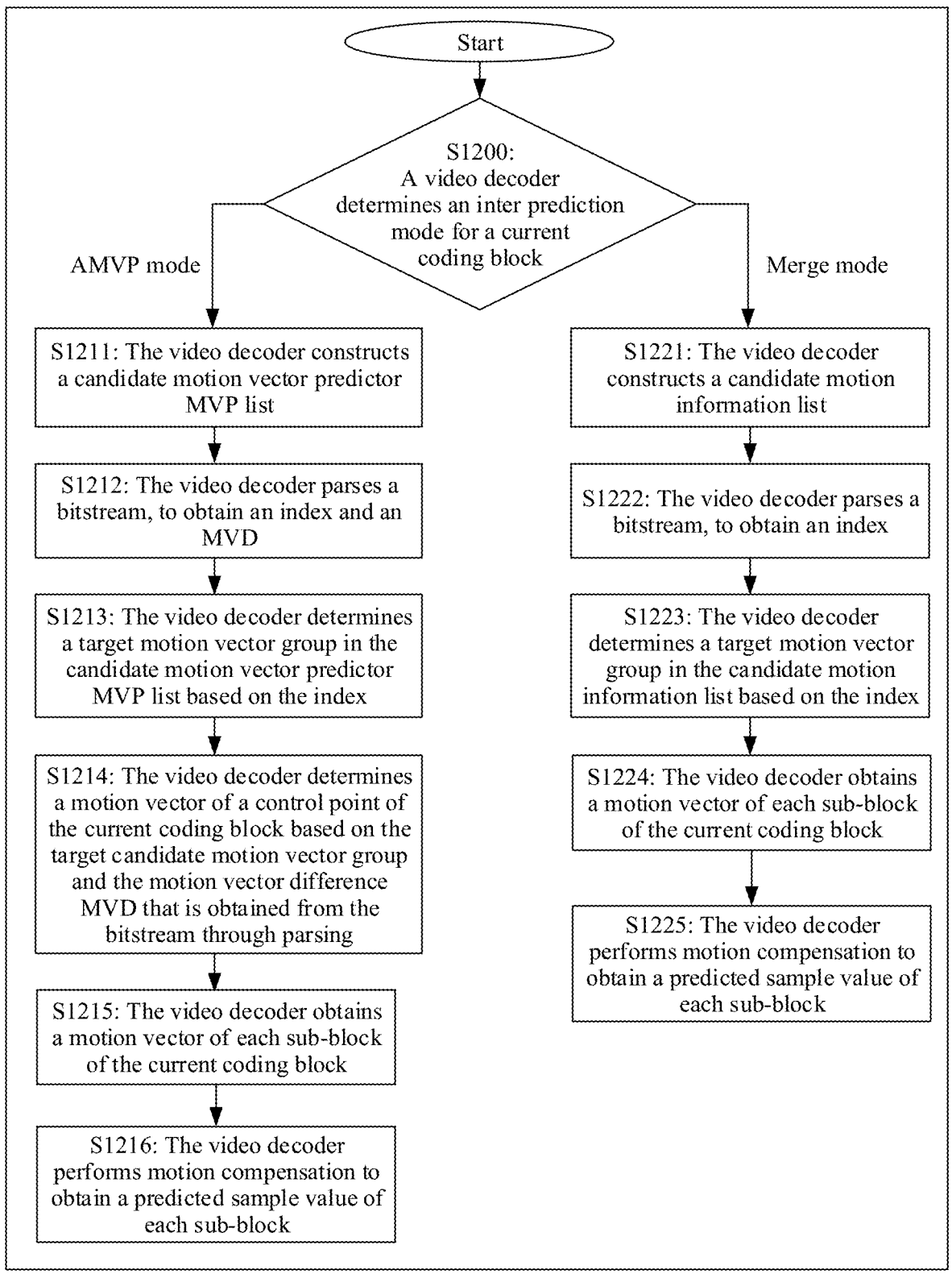
FIG. 9 is a schematic flowchart of a decoding method according to an embodiment of this application.

FIG. 9 is a flowchart of a process 900 of a decoding method according to an embodiment of this application. The process 900 may be performed by the video decoder 200, and specifically, may be performed by the inter prediction unit (also referred to as an inter predictor) 210 and the entropy decoding unit (also referred to as an entropy decoder) 203 of the video decoder 200. The process 900 is described as a series of steps or operations. It should be understood that steps or operations of the process 900 may be performed in various sequences and/or simultaneously, and are not limited to an execution sequence shown in FIG. 9. It is assumed that a video data stream including a plurality of video frames is using the video decoder. If a first neighboring affine coding block is located in a coding tree unit (Coding Tree Unit, CTU) above a current coding block, a group of candidate motion vector predictors is determined based on a bottom-left control point and a bottom-right control point of the first neighboring affine coding block. Corresponding to the process shown in FIG. 9, related descriptions are as follows:

In an optional embodiment on a decoder side, if a first neighboring affine coding block is located in a coding tree unit (Coding Tree Unit, CTU) above a current coding block, a group of candidate motion vector predictors is determined based on a bottom-left control point and a bottom-right control point of the first neighboring affine coding block. Details are as follows:

Step S1200: The video decoder determines an inter prediction mode for the current coding block.

Specifically, the inter prediction mode may be an advanced motion vector prediction (Advanced Motion Vector Prediction, AMVP) mode, or may be a merge (merge) mode.

If the determined inter prediction mode for the current coding block is the AMVP mode, steps S1211 to S1216 are performed.

If the determined inter prediction mode for the current coding block is the merge mode, steps S1221 to S1225 are performed.

AMVP Mode:

Step S1211: The video decoder constructs a candidate motion vector predictor MVP list.

Specifically, the video decoder constructs the candidate motion vector predictor MVP list (also referred to as an affine candidate motion vector list) by using the inter prediction unit (also referred to as an inter prediction module). The construction may be performed in either of the following two manners or a combination of the two manners. The constructed candidate motion vector predictor MVP list may be a triplet candidate motion vector predictor MVP list or a 2-tuple candidate motion vector predictor MVP list. The two manners are specifically as follows:

Manner 1: The candidate motion vector predictor MVP list is constructed by using a motion model-based motion vector prediction method.

First, all or some neighboring blocks of the current coding block are traversed in a pre-specified order, to determine a neighboring affine coding block in the neighboring blocks. There may be one or more determined neighboring affine coding blocks. For example, neighboring blocks A, B, C, D, and E shown in FIG. 7A may be traversed sequentially, to determine a neighboring affine coding block in the neighboring blocks A, B, C, D, and E. The inter prediction unit determines a group of candidate motion vector predictors (each group of candidate motion vector predictors is a 2-tuple or a triplet) based on at least one neighboring affine coding block. The following uses one neighboring affine coding block as an example for description. For ease of description, the neighboring affine coding block is referred to as a first neighboring affine coding block. Details are as follows:

A first affine model is determined based on a motion vector of a control point of the first neighboring affine coding block. Further, a motion vector of a control point of the current coding block is predicted based on the first affine model. A manner of predicting the motion vector of the control point of the current coding block based on the motion vector of the control point of the first neighboring affine coding block varies with a parameter model of the current coding block. Therefore, the following provides descriptions for different cases.

Figure 9A:
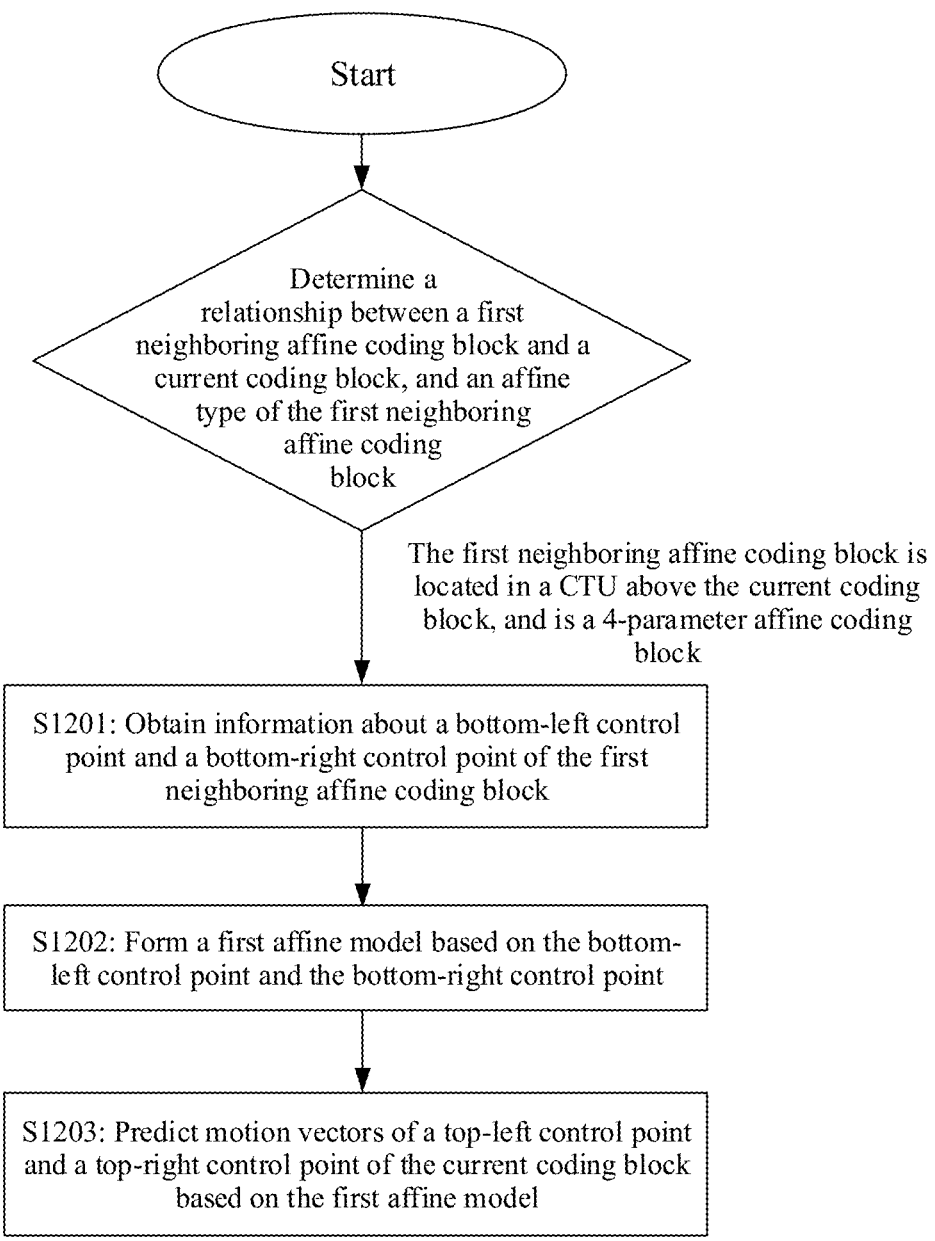
FIG. 9A is a schematic flowchart of constructing an affine candidate motion vector list according to an embodiment of this application.

A: The parameter model of the current coding block is a 4-parameter affine transformation model. A derivation manner may be as follows (as shown in FIG. 9A):

If the first neighboring affine coding block is located in a coding tree unit (Coding Tree Unit, CTU) above the current coding block, motion vectors of two lowermost control points of the first neighboring affine coding block are obtained. For example, location coordinates ($x_6$, $y_6$) and a motion vector ($vx_6$, $vy_6$) of a bottom-left control point of the first neighboring affine coding block and location coordinates ($x_7$, $y_7$) and a motion vector ($vx_7$, $vy_7$) of a bottom-right control point of the first neighboring affine coding block may be obtained (step S1201).

A first affine model (the first affine model obtained in this case is a 4-parameter affine model) is formed based on the motion vectors and location coordinates of the two lowermost control points of the first neighboring affine coding block (step S1202).

The motion vector of the control point of the current coding block is predicted based on the first affine model. For example, location coordinates of a top-left control point of the current coding block and location coordinates of a top-right control point of the current coding block may be substituted into the first affine model, to predict a motion vector of the top-left control point of the current coding block and a motion vector of the top-right control point of the current coding block. Details are shown in formulas (1) and (2) (step S1203).

$$\begin{cases} vx_0 = vx_6 + \frac{(vx_7 - vx_6)}{x_7 - x_6} \times (x_0 - x_6) - \frac{(vy_7 - vy_6)}{x_7 - x_6} \times (y_0 - y_6) \\ vy_0 = vy_6 + \frac{(vy_7 - vy_6)}{x_7 - x_6} \times (x_0 - x_6) + \frac{(vx_7 - vx_6)}{x_7 - x_6} \times (y_0 - y_6) \end{cases} \quad (1)$$

$$\begin{cases} vx_1 = vx_6 + \frac{(vx_7 - vx_6)}{x_7 - x_6} \times (x_1 - x_6) - \frac{(vy_7 - vy_6)}{x_7 - x_6} \times (y_1 - y_6) \\ vy_1 = vy_6 + \frac{(vy_7 - vy_6)}{x_7 - x_6} \times (x_1 - x_6) + \frac{(vx_7 - vx_6)}{x_7 - x_6} \times (y_1 - y_6) \end{cases} \quad (2)$$

In the formulas (1) and (2), ($x_0$, $y_0$) are the coordinates of the top-left control point of the current coding block, and ($x_1$, $y_1$) are the coordinates of the top-right control point of the current coding block. In addition, ($vx_0$, $vy_0$) is the predicted motion vector of the top-left control point of the current coding block, and ($vx_1$, $vy_1$) is the predicted motion vector of the top-right control point of the current coding block.

Optionally, both the location coordinates ($x_6$, $y_6$) of the bottom-left control point and the location coordinates ($x_7$, $y_7$) of the bottom-right control point of the first neighboring affine coding block are calculated based on location coordinates ($x_4$, $y_4$) of a top-left control point of the first neighboring affine coding block. The location coordinates ($x_6$, $y_6$) of the bottom-left control point of the first neighboring affine coding block are ($x_4$, $y_4$+cuH), and the location coordinates ($x_7$, $y_7$) of the bottom-right control point of the first neighboring affine coding block are ($x_4$+cuW, $y_4$+cuH), where cuW is the width of the first neighboring affine coding block, and cuH is the height of the first neighboring affine coding block. In addition, the motion vector of the bottom-left control point of the first neighboring affine coding block is a motion vector of a bottom-left sub-block of the first neighboring affine coding block, and the motion vector of the bottom-right control point of the first neighboring affine coding block is a motion vector of a bottom-right sub-block of the first neighboring affine coding block. It can be learned that in this case, a horizontal distance between the bottom-left control point and the bottom-right control point of the first neighboring affine coding block is cuW, and a horizontal distance between the top-left control point and the top-right control point of the first neighboring affine coding block is cuW. Because cuW is usually a power of 2, in a process of deriving the motion vector of the control point of the current coding block, a right-shifting manner may be used instead of a division operation, to reduce implementation complexity. It can be learned that both the location coordinates of the bottom-left control point and the location coordinates of the bottom-right control point of the first neighboring affine coding block are obtained through derivation, rather than being read from the memory. Therefore, according to this method, a quantity of times of reading from the memory can be further reduced and decoding performance can be improved. In another optional solution, the location coordinates of the bottom-left control point and the location coordinates of the bottom-right control point may be alternatively pre-stored in the memory, and read from the memory for use when necessary.

In this case, in the formulas (1) and (2), ($x_7$–$x_6$) is equal to cuW, ($vx_7$, $vy_7$) may be obtained by reading a motion vector of a location ($x_4$+cuW–1, $y_4$+cuH–1) in a picture, and ($vx_6$, $vy_6$) may be obtained by reading a motion vector of a location ($x_4$, $y_4$+cuH–1) in the picture.

If the first neighboring affine coding block is not located in the CTU above the current coding block, a manner of predicting the motion vector of the control point of the current coding block is not limited herein. Specifically, in this case, the manner of predicting the motion vector of the control point of the current coding block may be the same as or different from the prediction manner used when the first neighboring affine coding block is located in the CTU above the current coding block.

B: The parameter model of the current coding block is a 6-parameter affine transformation model. A derivation manner may be as follows:

If the first neighboring affine coding block is located in a CTU above the current coding block, location coordinates and motion vectors of two lowermost control points of the first neighboring affine coding block are obtained. For example, location coordinates ($x_6$, $y_6$) and a motion vector ($vx_6$, $vy_6$) of a bottom-left control point of the first neighboring affine coding block and location coordinates ($x_7$, $y_7$) and a motion vector ($vx_7$, $vy_7$) of a bottom-right control point of the first neighboring affine coding block may be obtained.

A first affine model (the first affine model obtained in this case is a 4-parameter affine model) is formed based on the motion vectors of the two lowermost control points of the first neighboring affine coding block.

The motion vector of the control point of the current coding block is predicted based on the first affine model. For example, location coordinates of a top-left control point of the current coding block, location coordinates of a top-right control point of the current coding block, and location coordinates of a bottom-left control point of the current coding block may be substituted into the first affine model, to predict a motion vector of the top-left control point of the current coding block, a motion vector of the top-right control point of the current coding block, and a motion vector of the bottom-left control point of the current coding block. Details are shown in formulas (1), (2), and (3).

$$\begin{cases} vx_2 = vx_6 + \frac{(vx_7 - vx_6)}{x_7 - x_6} \times (x_2 - x_6) - \frac{(vy_7 - vy_6)}{x_7 - x_6} \times (y_2 - y_6) \\ vy_2 = vy_6 + \frac{(vy_7 - vy_6)}{x_7 - x_6} \times (x_2 - x_6) + \frac{(vx_7 - vx_6)}{x_7 - x_6} \times (y_2 - y_6) \end{cases} \quad (3)$$

The formulas (1) and (2) have been described above. In the formulas (1), (2), and (3), $(x_0, y_0)$ are the coordinates of the top-left control point of the current coding block, $(x_1, y_1)$ are the coordinates of the top-right control point of the current coding block, and $(x_2, y_2)$ are the coordinates of the bottom-left control point of the current coding block. In addition, $(vx_0, vy_0)$ is the predicted motion vector of the top-left control point of the current coding block, $(vx_1, vy_1)$ is the predicted motion vector of the top-right control point of the current coding block, and $(vx_2, vy_2)$ is the predicted motion vector of the bottom-left control point of the current coding block.

If the first neighboring affine coding block is not located in the CTU above the current coding block, a manner of predicting the motion vector of the control point of the current coding block is not limited herein. Specifically, in this case, the manner of predicting the motion vector of the control point of the current coding block may be the same as or different from the prediction manner used when the first neighboring affine coding block is located in the CTU above the current coding block.

Manner 2: The candidate motion vector predictor MVP list is constructed by using a control point combination-based motion vector prediction method.

A manner of constructing the candidate motion vector predictor MVP list varies with a parameter model of the current coding block. Details are described below.

A: The parameter model of the current coding block is a 4-parameter affine transformation model. A derivation manner may be as follows:

Motion vectors of a top-left vertex and a top-right vertex of the current coding block are estimated based on motion information of neighboring decoded blocks of the current coding block. As shown in FIG. 7B, first, motion vectors of neighboring decoded blocks A and/or B and/or C of the top-left vertex are used as candidate motion vectors for the motion vector of the top-left vertex of the current coding block, and motion vectors of neighboring decoded blocks D and/or E of the top-right vertex are used as candidate motion vectors for the motion vector of the top-right vertex of the current coding block. A candidate motion vector of the top-left vertex and a candidate motion vector of the top-right vertex may be combined to obtain a group of candidate motion vector predictors. A plurality of records obtained through combination in this manner may constitute the candidate motion vector predictor MVP list.

B: The parameter model of the current coding block is a 6-parameter affine transformation model. A derivation manner may be as follows:

Motion vectors of a top-left vertex, a top-right vertex, and a bottom-left vertex of the current coding block are estimated based on motion information of neighboring decoded blocks of the current coding block. As shown in FIG. 7B, first, motion vectors of neighboring decoded blocks A and/or B and/or C of the top-left vertex are used as candidate motion vectors for the motion vector of the top-left vertex of the current coding block, motion vectors of neighboring decoded blocks D and/or E of the top-right vertex are used as candidate motion vectors for the motion vector of the top-right vertex of the current coding block, and motion vectors of neighboring decoded blocks F and/or G of the bottom-left vertex are used as candidate motion vectors for the motion vector of the bottom-left vertex of the current coding block. A candidate motion vector of the top-left vertex, a candidate motion vector of the top-right vertex, and a candidate motion vector of the bottom-left vertex may be combined to obtain a group of candidate motion vector predictors. A plurality of groups of candidate motion vector predictors obtained through combination in this manner may constitute the candidate motion vector predictor MVP list.

It should be noted that the candidate motion vector predictor MVP list may be constructed by using only the candidate motion vector predictors predicted in the manner 1, or the candidate motion vector predictor MVP list may be constructed by using only the candidate motion vector predictors predicted in the manner 2, or the candidate motion vector predictor MVP list may be constructed by using both the candidate motion vector predictors predicted in the manner 1 and the candidate motion vector predictors predicted in the manner 2. In addition, the candidate motion vector predictor MVP list may be further pruned and sorted according to a preconfigured rule, and then truncated or padded to a particular quantity. When each group of candidate motion vector predictors in the candidate motion vector predictor MVP list includes motion vector predictors of three control points, this candidate motion vector predictor MVP list may be referred to as a triplet list; or when each group of candidate motion vector predictors in the candidate motion vector predictor MVP list includes motion vector predictors of two control points, this candidate motion vector predictor MVP list may be referred to as a 2-tuple list.

Step S1212: The video decoder parses a bitstream, to obtain an index and a motion vector difference MVD.

Specifically, the video decoder may parse the bitstream by using the entropy decoding unit. The index is used to indicate a target candidate motion vector group of the current coding block, and the target candidate motion vector group represents motion vector predictors of a group of control points of the current coding block.

Step S1213: The video decoder determines the target motion vector group in the candidate motion vector predictor MVP list based on the index.

Specifically, the target candidate motion vector group determined by the video decoder in the candidate motion vector predictor MVP list based on the index is used as optimal candidate motion vector predictors (optionally, when a length of the candidate motion vector predictor MVP list is 1, the bitstream does not need to be parsed to obtain the index, but the target motion vector group can be directly determined). The following briefly describes the optimal candidate motion vector predictors.

If the parameter model of the current coding block is a 4-parameter affine transformation model, optimal motion vector predictors of two control points are selected from the constructed candidate motion vector predictor MVP list. For example, the video decoder parses the bitstream to obtain an index number, and then determines optimal motion vector predictors of two control points in a 2-tuple candidate motion vector predictor MVP list based on the index number. Each group of candidate motion vector predictors in the candidate motion vector predictor MVP list corresponds to a respective index number.

If the parameter model of the current coding block is a 6-parameter affine transformation model, optimal motion vector predictors of three control points are selected from the constructed candidate motion vector predictor MVP list. For example, the video decoder parses the bitstream to obtain an index number, and then determines optimal motion vector predictors of three control points in a triplet candidate motion vector predictor MVP list based on the index number. Each group of candidate motion vector predictors in the candidate motion vector predictor MVP list corresponds to a respective index number.

Step S1214: The video decoder determines the motion vector of the control point of the current coding block based on the target candidate motion vector group and the motion vector difference MVD that is obtained from the bitstream through parsing.

If the parameter model of the current coding block is a 4-parameter affine transformation model, motion vector differences of two control points of the current coding block are obtained from the bitstream through decoding, and a new candidate motion vector group is obtained based on the motion vector differences of the control points and the target candidate motion vector group indicated by the index. For example, a motion vector difference MVD of a top-left control point and a motion vector difference MVD of a top-right control point are obtained from the bitstream through decoding, and are respectively added to a motion vector of a top-left control point and a motion vector of a top-right control point in the target candidate motion vector group, to obtain a new candidate motion vector group. Therefore, the new candidate motion vector group includes new motion vectors of the top-left control point and the top-right control point of the current coding block.

Optionally, a motion vector of a third control point may be further obtained based on the motion vectors of the two control points of the current coding block in the new candidate motion vector group by using the 4-parameter affine transformation model. For example, a motion vector $(vx_0, vy_0)$ of the top-left control point of the current coding block and a motion vector $(vx_1, vy_1)$ of the top-right control point of the current coding block are obtained. Then, a motion vector $(vx_2, vy_2)$ of a bottom-left control point $(x_2, y_2)$ of the current coding block is obtained through calculation according to a formula (4).

$$\begin{cases} vx_2 = -\dfrac{vy_1 - vy_0}{W}H + vx_0 \\ vy_2 = +\dfrac{vx_1 - vx_0}{W}H + vy_0 \end{cases} \quad (4)$$

Herein, $(x_0, y_0)$ are location coordinates of the top-left control point, $(x_1, y_1)$ are location coordinates of the top-right control point, W is the width of the current coding block, and H is the height of the current coding block.

If the parameter model of the current coding block is a 6-parameter affine transformation model, motion vector differences of three control points of the current coding block are obtained from the bitstream through decoding, and a new candidate motion vector group is obtained based on the motion vector differences MVDs of the control points and the target candidate motion vector group indicated by the index. For example, a motion vector difference MVD of a top-left control point, a motion vector difference MVD of a top-right control point, and a motion vector difference of a bottom-left control point are obtained from the bitstream through decoding, and are respectively added to a motion vector of a top-left control point, a motion vector of a top-right control point, and a motion vector of a bottom-left control point in the target candidate motion vector group, to obtain a new candidate motion vector group. Therefore, the new candidate motion vector group includes motion vectors of the top-left control point, the top-right control point, and the bottom-left control point of the current coding block.

Step S1215: The video decoder obtains a motion vector of each sub-block of the current coding block based on the determined motion vector of the control point of the current coding block by using an affine transformation model.

Specifically, the new candidate motion vector group obtained based on the target candidate motion vector group and the MVDs includes motion vectors of two control points (the top-left control point and the top-right control point) or three control points (for example, the top-left control point, the top-right control point, and the bottom-left control point). For each sub-block of the current coding block (one sub-block may be equivalent to one motion compensation unit), motion information of a sample at a preset location in a motion compensation unit may be used to represent motion information of all samples in the motion compensation unit. If a size of the motion compensation unit is M×N (M is less than or equal to the width W of the current coding block, N is less than or equal to the height H of the current coding block, and M, N, W, and H each are a positive integer and are usually a power of 2, for example, 4, 8, 16, 32, 64, or 128), the sample at the preset location may be a center point (M/2, N/2) of the motion compensation unit, a top-left sample (0, 0), a top-right sample (M−1, 0), or a sample at another location. FIG. 8A shows a 4×4 motion compensation unit, and FIG. 8B shows an 8×8 motion compensation unit.

Coordinates of a center point of a motion compensation unit relative to a sample at a top-left vertex of the current coding block are calculated according to a formula (5), where i is an $i^{th}$ motion compensation unit (from left to right) in a horizontal direction, j is a $j^{th}$ motion compensation unit (from top to bottom) in a vertical direction, and $(x_{(i,j)}, y_{(i,j)})$ represent coordinates of a center point of an $(i, j)^{th}$ motion compensation unit relative to the sample at the top-left control point of the current coding block. Then, based on an affine model type (6-parameter or 4-parameter) of the current coding block, $(x_{(i,j)}, y_{(i,j)})$ are substituted into a 6-parameter affine model formula (6-1) or $(x_{(i,j)}, y_{(i,j)})$ are substituted into a 4-parameter affine model formula (6-2) to obtain motion information of a center point of each motion compensation unit, and the motion information is used as motion vectors $(vx_{(i,j)}, vy_{(i,j)})$ of all samples in the motion compensation unit.

$$\begin{cases} x_{(i,j)} = M \times i + \dfrac{M}{2}, i = 0, 1 \ldots \\ y_{(i,j)} = N \times j + \dfrac{N}{2}, j = 0, 1 \ldots \end{cases} \quad (5)$$

$$\begin{cases} vx = \dfrac{vx_1 - vx_0}{W}x + \dfrac{vx_2 - vx_0}{H}y + vx_0 \\ vy = \dfrac{vy_1 - vy_0}{W}x + \dfrac{vy_2 - vy_0}{H}y + vy_0 \end{cases} \quad (6\text{-}1)$$

$$\begin{cases} vx = \dfrac{vx_1 - vx_0}{W}x - \dfrac{vy_1 - vy_0}{W}y + vx_0 \\ vy = \dfrac{vy_1 - vy_0}{W}x + \dfrac{vx_1 - vx_0}{W}y + vy_0 \end{cases} \quad (6\text{-}2)$$

Optionally, when the current coding block is a 6-parameter coding block, and motion vectors of one or more sub-blocks of the current coding block are obtained based on the target candidate motion vector group, if a bottom boundary of the current coding block overlaps a bottom boundary of a CTU in which the current coding block is located, a motion vector of a sub-block at the bottom-left corner of the current coding block is obtained through calculation based on location coordinates (0, H) of the bottom-left corner of the current coding block and a 6-parameter affine model constructed by using the three control points, and a motion vector of a sub-block at the bottom-right corner of the current coding block is obtained through calculation based on location coordinates (W, H) of the bottom-right corner of the current coding block and the 6-parameter affine model constructed by using the three control points. For example, the motion vector of the sub-block at the bottom-left corner of the current coding block can be obtained by substituting the location coordinates (0, H) of the bottom-left corner of the current coding block into the 6-parameter affine model (rather than substituting coordinates of a central point of the sub-block at the bottom-left corner into the affine model for calculation), and the motion vector of the sub-block at the bottom-right corner of the current coding block can be obtained by substituting the location coordinates (W, H) of the bottom-right corner of the current coding block into the 6-parameter affine model (rather than substituting coordinates of a central point of the sub-block at the bottom-right corner into the affine model for calculation). In this way, when a motion vector of a bottom-left control point and a motion vector of a bottom-right control point of the current coding block are used (for example, a candidate motion vector predictor MVP list of another block is subsequently constructed based on the motion vectors of the bottom-left control point and the bottom-right control point of the current block), accurate values rather than estimated values are used. W is the width of the current coding block, and H is the height of the current coding block.

Optionally, when the current coding block is a 4-parameter coding block, and motion vectors of one or more sub-blocks of the current coding block are obtained based on the target candidate motion vector group, if a bottom boundary of the current coding block overlaps a bottom boundary of a CTU in which the current coding block is located, a motion vector of a sub-block at the bottom-left corner of the current coding block is obtained through calculation based on location coordinates (0, H) of the bottom-left corner of the current coding block and a 4-parameter affine model constructed by using the two control points, and a motion vector of a sub-block at the bottom-right corner of the current coding block is obtained through calculation based on location coordinates (W, H) of the bottom-right corner of the current coding block and the 4-parameter affine model constructed by using the two control points. For example, the motion vector of the sub-block at the bottom-left corner of the current coding block can be obtained by substituting the location coordinates (0, H) of the bottom-left corner of the current coding block into the 4-parameter affine model (rather than substituting coordinates of a central point of the sub-block at the bottom-left corner into the affine model for calculation), and the motion vector of the sub-block at the bottom-right corner of the current coding block can be obtained by substituting the location coordinates (W, H) of the bottom-right corner of the current coding block into the 4-parameter affine model (rather than substituting coordinates of a central point of the sub-block at the bottom-right corner into the affine model for calculation). In this way, when a motion vector of a bottom-left control point and a motion vector of a bottom-right control point of the current coding block are used (for example, a candidate motion vector predictor MVP list of another block is subsequently constructed based on the motion vectors of the bottom-left control point and the bottom-right control point of the current block), accurate values rather than estimated values are used. W is the width of the current coding block, and H is the height of the current coding block.

Step S1216: The video decoder performs motion compensation based on the motion vector of each sub-block of the current coding block, to obtain a predicted sample value of each sub-block. For example, a corresponding sub-block is found in a reference frame based on the motion vector of each sub-block and a reference frame index, and interpolation filtering is performed, to obtain the predicted sample value of each sub-block.

Merge Mode:

Step S1221: The video decoder constructs a candidate motion information list.

Specifically, the video decoder constructs the candidate motion information list (also referred to as an affine candidate motion vector list) by using the inter prediction unit (also referred to as an inter prediction module). The construction may be performed in either of the following two manners or a combination of the two manners. The constructed candidate motion information list is a triplet candidate motion information list. The two manners are specifically as follows:

Manner 1: The candidate motion information list is constructed by using a motion model-based motion vector prediction method.

First, all or some neighboring blocks of the current coding block are traversed in a pre-specified order, to determine a neighboring affine coding block in the neighboring blocks. There may be one or more determined neighboring affine coding blocks. For example, neighboring blocks A, B, C, D, and E shown in FIG. 7A may be traversed sequentially, to determine a neighboring affine coding block in the neighboring blocks A, B, C, D, and E. The inter prediction unit determines a group of candidate motion vector predictors (each group of candidate motion vector predictors is a 2-tuple or a triplet) based on at least one neighboring affine coding block. The following uses one neighboring affine coding block as an example for description. For ease of description, the neighboring affine coding block is referred to as a first neighboring affine coding block. Details are as follows:

A first affine model is determined based on a motion vector of a control point of the first neighboring affine coding block. Further, a motion vector of a control point of the current coding block is predicted based on the first affine model. Details are as follows:

If the first neighboring affine coding block is located in a CTU above the current coding block, location coordinates and motion vectors of two lowermost control points of the first neighboring affine coding block are obtained. For example, location coordinates $(x_6, y_6)$ and a motion vector $(vx_6, vy_6)$ of a bottom-left control point of the first neighboring affine coding block and location coordinates $(x_7, y_7)$ and a motion vector $(vx_7, vy_7)$ of a bottom-right control point of the first neighboring affine coding block may be obtained.

A first affine model (the first affine model obtained in this case is a 4-parameter affine model) is formed based on the motion vectors of the two lowermost control points of the first neighboring affine coding block.

Optionally, the motion vector of the control point of the current coding block is predicted based on the first affine model. For example, location coordinates of a top-left control point of the current coding block, location coordinates of a top-right control point of the current coding block, and location coordinates of a bottom-left control point of the current coding block may be substituted into the first affine model, to predict a motion vector of the top-left control point of the current coding block, a motion vector of the top-right control point of the current coding block, and a motion vector of the bottom-left control point of the current coding block. A candidate motion vector triplet is formed and is added to the candidate motion information list. Details are shown in formulas (1), (2), and (3).

Optionally, the motion vector of the control point of the current coding block is predicted based on the first affine model. For example, location coordinates of a top-left control point of the current coding block and location coordinates of a top-right control point of the current coding block may be substituted into the first affine model, to predict a motion vector of the top-left control point of the current coding block and a motion vector of the top-right control point of the current coding block. A candidate motion vector 2-tuple is formed and is added to the candidate motion information list. Details are shown in formulas (1) and (2).

In the formulas (1), (2), and (3), $(x_0, y_0)$ are the coordinates of the top-left control point of the current coding block, $(x_1, y_1)$ are the coordinates of the top-right control point of the current coding block, and $(x_2, y_2)$ are the coordinates of the bottom-left control point of the current coding block. In addition, $(vx_0, vy_0)$ is the predicted motion vector of the top-left control point of the current coding block, $(vx_1, vy_1)$ is the predicted motion vector of the top-right control point of the current coding block, and $(vx_2, vy_2)$ is the predicted motion vector of the bottom-left control point of the current coding block.

If the first neighboring affine coding block is not located in the CTU above the current coding block, a manner of predicting the motion vector of the control point of the current coding block is not limited herein. Specifically, in this case, the manner of predicting the motion vector of the control point of the current coding block may be the same as or different from the prediction manner used when the first neighboring affine coding block is located in the CTU above the current coding block.

Manner 2: The candidate motion information list is constructed by using a control point combination-based motion vector prediction method.

The following lists two solutions, which are denoted as a solution A and a solution B.

Solution A: Motion information of two control points of the current coding block is combined, to construct a 4-parameter affine transformation model. The two control points are combined in a manner of {CP1, CP4}, {CP2, CP3}, {CP1, CP2}, {CP2, CP4}, {CP1, CP3}, or {CP3, CP4}. For example, a 4-parameter affine transformation model constructed by using control points CP1 and CP2 is denoted as Affine (CP1, CP2).

It should be noted that a combination of different control points may be transformed into control points at a same location. For example, a 4-parameter affine transformation model obtained based on a combination {CP1, CP4}, {CP2, CP3}, {CP2, CP4}, {CP1, CP3}, or {CP3, CP4} is transformed to be represented by control points {CP1, CP2} or {CP1, CP2, CP3}. A transformation method is as follows: A motion vector and coordinate information of a control point are substituted into a formula (7), to obtain a model parameter. Then, coordination information of {CP1, CP2} is substituted into the formula, to obtain motion vectors of {CP1, CP2}. The motion vectors are used as a group of candidate motion vector predictors.

$$\begin{cases} vx = a_1 + a_3 x + a_4 y \\ vy = a_2 - a_4 x + a_3 y \end{cases} \quad (7)$$

In the formula (7), $a_0$, $a_1$, $a_2$, $a_3$ are all parameters in the parameter model, and (x, y) represent location coordinates.

More directly, the transformation may be performed according to the following formulas, to obtain a group of motion vector predictors represented by the top-left control point and the top-right control point, and the group of motion vector predictors is added to the candidate motion information list.

A formula (8) for transforming {CP1, CP2} to {CP1, CP2, CP3} is as follows:

$$\begin{cases} vx_2 = -\frac{vy_1 - vy_0}{w} H + vx_0 \\ vy_2 = +\frac{vx_1 - vx_0}{w} H + vy_0 \end{cases} \quad (8)$$

A formula (9) for transforming {CP1, CP3} to {CP1, CP2, CP3} is as follows:

$$\begin{cases} vx_1 = +\frac{vy_2 - vy_0}{H} W + vx_0 \\ vy_1 = -\frac{vx_2 - vx_0}{H} W + vy_0 \end{cases} \quad (9)$$

A formula (10) for transforming {CP2, CP3} to {CP1, CP2, CP3} is as follows:

$$\begin{cases} vx_0 = \frac{vx_2 - vx_1}{W*W + H*H} W*W - \frac{vy_2 - vy_1}{W*W + H*H} H*W + vx_1 \\ vy_1 = \frac{vy_2 - vy_1}{W*W + H*H} W*W + \frac{vx_2 - vx_1}{W*W + H*H} H*W + vy_1 \end{cases} \quad (10)$$

A formula (11) for transforming {CP1, CP4} to {CP1, CP2, CP3} is as follows:

$$\begin{cases} vx_1 = \frac{vx_3 - vx_0}{W*W + H*H} W*W + \frac{vy_3 - vy_0}{W*W + H*H} H*W + vx_0 \\ vy_1 = \frac{vy_3 - vy_0}{W*W + H*H} W*W - \frac{vx_3 - vx_0}{W*W + H*H} H*W + vy_0 \end{cases} \quad (11)$$

A formula (12) for transforming {CP2, CP4} to {CP1, CP2, CP3} is as follows:

$$\begin{cases} vx_0 = -\frac{vy_3 - vy_1}{H} W + vx_1 \\ vy_0 = +\frac{vx_3 - vx_1}{H} W + vy_1 \end{cases} \quad (12)$$

A formula (13) for transforming {CP3, CP4} to {CP1, CP2, CP3} is as follows:

$$\begin{cases} vx_0 = +\frac{vy_3 - vy_2}{w} H + vx_2 \\ vy_0 = -\frac{vx_3 - vx_2}{w} H + vy_2 \end{cases} \quad (13)$$

Solution B: Motion information of three control points of the current coding block is combined, to construct a 6-parameter affine transformation model. The three control points are combined in a manner of {CP1, CP2, CP4}, {CP1, CP2, CP3}, {CP2, CP3, CP4}, or {CP1, CP3, CP4}. For example, a 6-parameter affine transformation model constructed by using control points CP1, CP2, and CP3 is denoted as Affine (CP1, CP2, CP3).

It should be noted that a combination of different control points may be transformed into control points at a same location. For example, a 6-parameter affine transformation model obtained based on a combination {CP1, CP2, CP4}, {CP2, CP3, CP4}, or {CP1, CP3, CP4} is transformed to be represented by control points {CP1, CP2, CP3}. A transformation method is as follows: A motion vector and coordinate information of a control point are substituted into a formula (14), to obtain a model parameter. Then, coordination information of {CP1, CP2, CP3} is substituted into the formula, to obtain motion vectors of {CP1, CP2, CP3}. The motion vectors are used as a group of candidate motion vector predictors.

$$\begin{cases} vx = a_1 + a_3 x + a_4 y \\ vy = a_2 + a_5 x + a_6 y \end{cases} \quad (14)$$

In the formula (14), $a_1$, $a_2$, $a_3$, $a_4$, $a_5$, $a_6$ are parameters in the parameter model, and (x, y) represent location coordinates.

More directly, the transformation may be performed according to the following formulas, to obtain a group of motion vector predictors represented by the top-left control point, the top-right control point, and the bottom-left control point, and the group of motion vector predictors is added to the candidate motion information list.

A formula (15) for transforming {CP1, CP2, CP4} to {CP1, CP2, CP3} is as follows:

$$\begin{cases} vx_2 = vx_3 + vx_0 - vx_1 \\ vy_2 = vy_3 + vy_0 - vy_1 \end{cases} \quad (15)$$

A formula (16) for transforming {CP2, CP3, CP4} to {CP1, CP2, CP3} is as follows:

$$\begin{cases} vx_0 = vx_1 + vx_2 - vx_3 \\ vy_0 = vy_1 + vy_2 - vy_3 \end{cases} \quad (16)$$

A formula (17) for transforming {CP1, CP3, CP4} to {CP1, CP2, CP3} is as follows:

$$\begin{cases} vx_1 = vx_3 + vx_0 - vx_2 \\ vy_1 = vy_3 + vy_0 - vy_2 \end{cases} \quad (17)$$

It should be noted that the candidate motion information list may be constructed by using only the candidate motion vector predictors predicted in the manner 1, or the candidate motion information list may be constructed by using only the candidate motion vector predictors predicted in the manner 2, or the candidate motion information list may be constructed by using both the candidate motion vector predictors predicted in the manner 1 and the candidate motion vector predictors predicted in the manner 2. In addition, the candidate motion information list may be further pruned and sorted according to a preconfigured rule, and then truncated or padded to a particular quantity. When each group of candidate motion vector predictors in the candidate motion information list includes motion vector predictors of three control points, this candidate motion information list may be referred to as a triplet list; or when each group of candidate motion vector predictors in the candidate motion information list includes motion vector predictors of two control points, this candidate motion information list may be referred to as a 2-tuple list.

Step S1222: The video decoder parses a bitstream, to obtain an index.

Specifically, the video decoder may parse the bitstream by using the entropy decoding unit. The index is used to indicate a target candidate motion vector group of the current coding block, and the target candidate motion vector group represents motion vector predictors of a group of control points of the current coding block.

Step S1223: The video decoder determines the target motion vector group in the candidate motion information list based on the index.

Specifically, the target candidate motion vector group determined by the video decoder in the candidate motion vector predictor MVP list based on the index is used as optimal candidate motion vector predictors (optionally, when a length of the candidate motion information list is 1, the bitstream does not need to be parsed to obtain the index, but the target motion vector group can be directly determined). Specifically, the optimal candidate motion vector predictors are optimal motion vector predictors of two or three control points. For example, the video decoder obtains an index number from the bitstream through parsing, and then determines optimal motion vector predictors of two or three control points in the candidate motion information list based on the index number. Each group of candidate motion vector predictors in the candidate motion information list corresponds to a respective index number.

Step S1224: The video decoder obtains a motion vector of each sub-block of the current coding block based on the determined motion vector of the control point of the current coding block by using a parameter-based affine transformation model.

Specifically, the target candidate motion vector group includes motion vectors of two control points (the top-left control point and the top-right control point) or three control points (for example, the top-left control point, the top-right control point, and the bottom-left control point). For each sub-block of the current coding block (one sub-block may be equivalent to one motion compensation unit), motion information of a sample at a preset location in a motion compensation unit may be used to represent motion information of all samples in the motion compensation unit. If a size of the motion compensation unit is M×N (M is less than or equal to the width W of the current coding block, N is less than or equal to the height H of the current coding block, and M, N, W, and H each are a positive integer and are usually a power of 2, for example, 4, 8, 16, 32, 64, or 128), the sample at the preset location may be a center point (M/2, N/2) of the motion compensation unit, a top-left sample (0, 0), a top-right sample (M−1, 0), or a sample at another location. FIG. 8A shows a 4×4 motion compensation unit, and FIG. 8B shows an 8×8 motion compensation unit.

Coordinates of a center point of a motion compensation unit relative to a sample at a top-left vertex of the current coding block are calculated according to a formula (5), where i is an $i^{th}$ motion compensation unit (from left to right) in a horizontal direction, j is a $j^{th}$ motion compensation unit (from top to bottom) in a vertical direction, and $(x_{(i,j)}, y_{(i,j)})$ represent coordinates of a center point of an $(i, j)^{th}$ motion compensation unit relative to the sample at the top-left control point of the current coding block. Then, based on an affine model type (6-parameter or 4-parameter) of the current coding block, $(x_{(i,j)}, y_{(i,j)})$ are substituted into a 6-parameter affine model formula (6-1) or $(x_{(i,j)}, y_{(i,j)})$ are substituted into a 4-parameter affine model formula (6-2) to obtain motion information of a center point of each motion compensation unit, and the motion information is used as motion vectors ($vx_{(i,j)}$, $vy_{(i,j)}$) of all samples in the motion compensation unit.

Optionally, when the current coding block is a 6-parameter coding block, and motion vectors of one or more sub-blocks of the current coding block are obtained based on the target candidate motion vector group, if a bottom boundary of the current coding block overlaps a bottom boundary of a CTU in which the current coding block is located, a motion vector of a sub-block at the bottom-left corner of the current coding block is obtained through calculation based on location coordinates (0, H) of the bottom-left corner of the current coding block and a 6-parameter affine model constructed by using the three control points, and a motion vector of a sub-block at the bottom-right corner of the current coding block is obtained through calculation based on location coordinates (W, H) of the bottom-right corner of the current coding block and the 6-parameter affine model constructed by using the three control points. For example, the motion vector of the sub-block at the bottom-left corner of the current coding block can be obtained by substituting the location coordinates (0, H) of the bottom-left corner of the current coding block into the 6-parameter affine model (rather than substituting coordinates of a central point of the sub-block at the bottom-left corner into the affine model for calculation), and the motion vector of the sub-block at the bottom-right corner of the current coding block can be obtained by substituting the location coordinates (W, H) of the bottom-right corner of the current coding block into the 6-parameter affine model (rather than substituting coordinates of a central point of the sub-block at the bottom-right corner into the affine model for calculation). In this way, when a motion vector of a bottom-left control point and a motion vector of a bottom-right control point of the current coding block are used (for example, a candidate motion information list of another block is subsequently constructed based on the motion vectors of the bottom-left control point and the bottom-right control point of the current block), accurate values rather than estimated values are used. W is the width of the current coding block, and H is the height of the current coding block.

Optionally, when the current coding block is a 4-parameter coding block, and motion vectors of one or more sub-blocks of the current coding block are obtained based on the target candidate motion vector group, if a bottom boundary of the current coding block overlaps a bottom boundary of a CTU in which the current coding block is located, a motion vector of a sub-block at the bottom-left corner of the current coding block is obtained through calculation based on location coordinates (0, H) of the bottom-left corner of the current coding block and a 4-parameter affine model constructed by using the two control points, and a motion vector of a sub-block at the bottom-right corner of the current coding block is obtained through calculation based on location coordinates (W, H) of the bottom-right corner of the current coding block and the 4-parameter affine model constructed by using the two control points. For example, the motion vector of the sub-block at the bottom-left corner of the current coding block can be obtained by substituting the location coordinates (0, H) of the bottom-left corner of the current coding block into the 4-parameter affine model (rather than substituting coordinates of a central point of the sub-block at the bottom-left corner into the affine model for calculation), and the motion vector of the sub-block at the bottom-right corner of the current coding block can be obtained by substituting the location coordinates (W, H) of the bottom-right corner of the current coding block into the 4-parameter affine model (rather than substituting coordinates of a central point of the sub-block at the bottom-right corner into the affine model for calculation). In this way, when a motion vector of a bottom-left control point and a motion vector of a bottom-right control point of the current coding block are used (for example, a candidate motion information list of another block is subsequently constructed based on the motion vectors of the bottom-left control point and the bottom-right control point of the current block), accurate values rather than estimated values are used. W is the width of the current coding block, and H is the height of the current coding block.

Step S1225: The video decoder performs motion compensation based on the motion vector of each sub-block of the current coding block, to obtain a predicted sample value of each sub-block. Specifically, a predicted sample value of the current coding block is predicted based on the motion vectors of the one or more sub-blocks of the current coding block, and a reference frame index and a prediction direction that is indicated by the index.

It may be understood that, when the coding tree unit CTU in which the first neighboring affine coding block is located is above the current coding block, information about lowermost control points of the first neighboring affine coding block has been read from memory. Therefore, in the foregoing solution, in a process of constructing a candidate motion vector based on the first group of control points of the first neighboring affine coding block, the first group of control points includes the bottom-left control point and the bottom-right control point of the first neighboring affine coding block, instead of fixedly using a top-left control point, a top-right control point, and a bottom-left control point of a first neighboring coding block as a first group of control points (or fixedly using a top-left control point and a top-right control point of a first neighboring coding block as a first group of control points) in the prior art. Therefore, according to the method of determining the first group of control points in this application, the information that has been read from the memory can be directly reused as information (for example, location coordinates and motion vectors) about the first group of control points, thereby reducing a quantity of times of reading from the memory and improving decoding performance.

In another optional embodiment on a decoder side, if a first neighboring affine coding block is located in a coding tree unit (Coding Tree Unit, CTU) above a current coding block, a group of candidate motion vector predictors is determined based on a bottom-left control point and a bottom-right control point of the first neighboring affine coding block; or if a first neighboring affine coding block is located in a CTU on the left of a current coding block, a group of candidate motion vector predictors is determined based on a top-right control point and a bottom-right control point of the first neighboring affine coding block. Details are as follows:

Step S1300: The video decoder determines an inter prediction mode for the current coding block.

Specifically, the inter prediction mode may be an advanced motion vector prediction (Advanced Motion Vector Prediction, AMVP) mode, or may be a merge (merge) mode.

If the determined inter prediction mode for the current coding block is the AMVP mode, steps S1311 to S1316 are performed.

If the determined inter prediction mode for the current coding block is the merge mode, steps S1321 to S1325 are performed.

AMVP Mode:

Step S1311: The video decoder constructs a candidate motion vector predictor MVP list.

Specifically, the video decoder constructs the candidate motion vector predictor MVP list (also referred to as an affine candidate motion vector list) by using the inter prediction unit (also referred to as an inter prediction module). The construction may be performed in either of the following two manners or a combination of the two manners. The constructed candidate motion vector predictor MVP list may be a triplet candidate motion vector predictor MVP list or a 2-tuple candidate motion vector predictor MVP list. The two manners are specifically as follows:

Manner 1: The candidate motion vector predictor MVP list is constructed by using a motion model-based motion vector prediction method.

First, all or some neighboring blocks of the current coding block are traversed in a pre-specified order, to determine a neighboring affine coding block in the neighboring blocks. There may be one or more determined neighboring affine coding blocks. For example, neighboring blocks A, B, C, D, and E shown in FIG. 7A may be traversed sequentially, to determine a neighboring affine coding block in the neighboring blocks A, B, C, D, and E. The inter prediction unit determines a group of candidate motion vector predictors (each group of candidate motion vector predictors is a 2-tuple or a triplet) based on at least one neighboring affine coding block. The following uses one neighboring affine coding block as an example for description. For ease of description, the neighboring affine coding block is referred to as a first neighboring affine coding block. Details are as follows:

A first affine model is determined based on a motion vector of a control point of the first neighboring affine coding block. Further, a motion vector of a control point of the current coding block is predicted based on the first affine model. A manner of predicting the motion vector of the control point of the current coding block based on the motion vector of the control point of the first neighboring affine coding block varies with a parameter model of the current coding block. Therefore, the following provides descriptions for different cases.

Figure 9B:
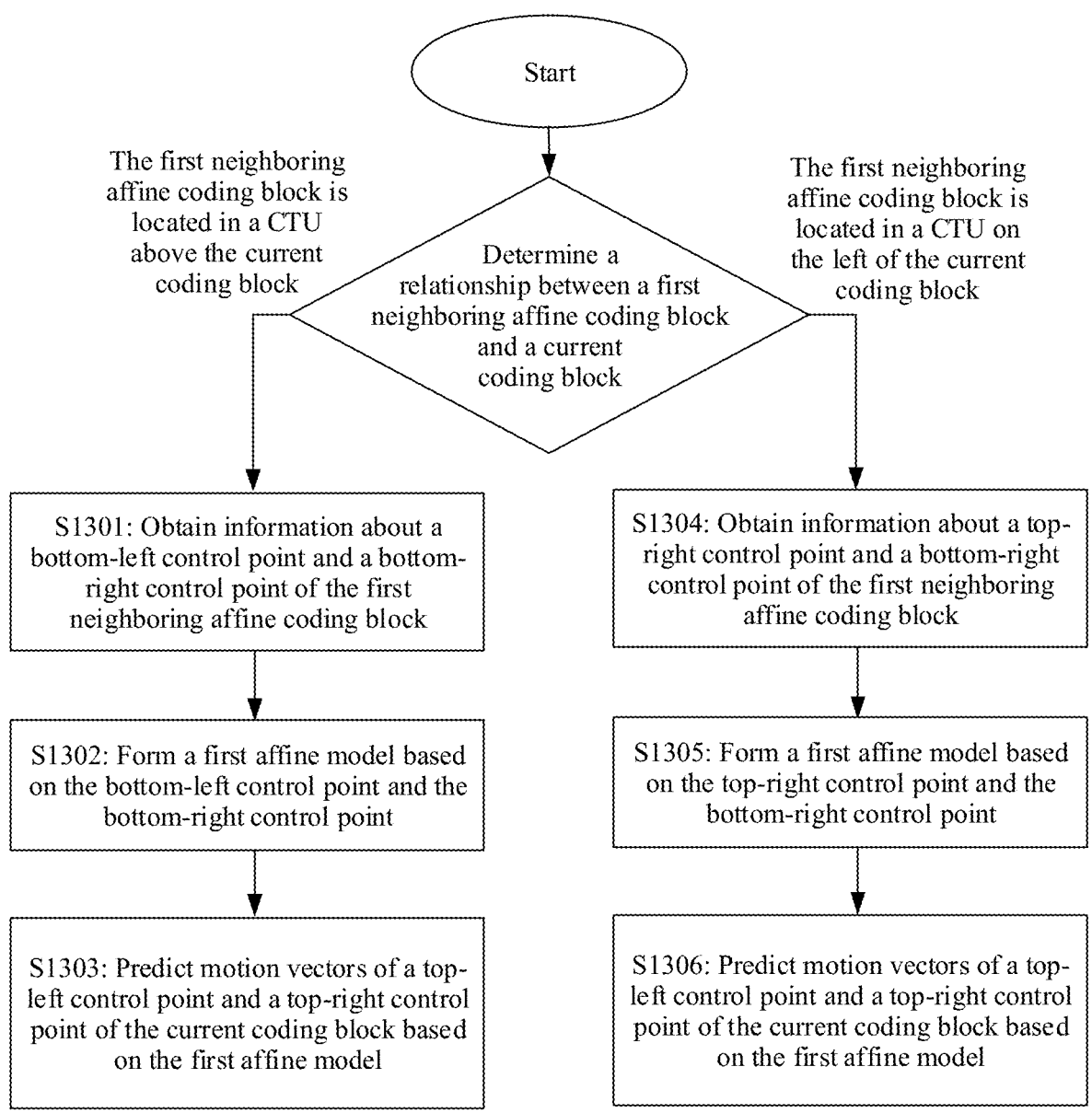
FIG. 9B is a schematic flowchart of constructing an affine candidate motion vector list according to an embodiment of this application.

A: The parameter model of the current coding block is a 4-parameter affine transformation model. A derivation manner may be as follows (as shown in FIG. 9B):

If the first neighboring affine coding block is located in a coding tree unit (Coding Tree Unit, CTU) above the current coding block, motion vectors of two lowermost control points of the first neighboring affine coding block are obtained. For example, location coordinates $(x_6, y_6)$ and a motion vector $(vx_6, vy_6)$ of a bottom-left control point of the first neighboring affine coding block and location coordinates $(x_7, y_7)$ and a motion vector $(vx_7, vy_7)$ of a bottom-right control point of the first neighboring affine coding block may be obtained (step S1301).

A first affine model (the first affine model obtained in this case is a 4-parameter affine model) is formed based on the motion vectors and location coordinates of the two lowermost control points of the first neighboring affine coding block (step S1302).

The motion vector of the control point of the current coding block is predicted based on the first affine model. For example, location coordinates of a top-left control point of the current coding block and location coordinates of a top-right control point of the current coding block may be substituted into the first affine model, to predict a motion vector of the top-left control point of the current coding block and a motion vector of the top-right control point of the current coding block. Details are shown in formulas (1) and (2) (step S1303).

In the formulas (1) and (2), $(x_0, y_0)$ are the coordinates of the top-left control point of the current coding block, and $(x_1, y_1)$ are the coordinates of the top-right control point of the current coding block. In addition, $(vx_0, vy_0)$ is the predicted motion vector of the top-left control point of the current coding block, and $(vx_1, vy_1)$ is the predicted motion vector of the top-right control point of the current coding block.

Optionally, both the location coordinates $(x_6, y_6)$ of the bottom-left control point and the location coordinates $(x_7, y_7)$ of the bottom-right control point of the first neighboring affine coding block are calculated based on location coordinates $(x_4, y_4)$ of a top-left control point of the first neighboring affine coding block. The location coordinates $(x_6, y_6)$ of the bottom-left control point of the first neighboring affine coding block are $(x_4, y_4+cuH)$, and the location coordinates $(x_7, y_7)$ of the bottom-right control point of the first neighboring affine coding block are $(x_4+cuW, y_4+cuH)$, where cuW is the width of the first neighboring affine coding block, and cuH is the height of the first neighboring affine coding block. In addition, the motion vector of the bottom-left control point of the first neighboring affine coding block is a motion vector of a bottom-left sub-block of the first neighboring affine coding block, and the motion vector of the bottom-right control point of the first neighboring affine coding block is a motion vector of a bottom-right sub-block of the first neighboring affine coding block. It can be learned that in this case, a horizontal distance between the bottom-left control point and the bottom-right control point of the first neighboring affine coding block is cuW, and a horizontal distance between the top-left control point and the top-right control point of the first neighboring affine coding block is cuW. Because cuW is usually a power of 2, in a process of deriving the motion vector of the control point of the current coding block, a right-shifting manner may be used instead of a division operation, to reduce implementation complexity. It can be learned that both the location coordinates of the bottom-left control point and the location coordinates of the bottom-right control point of the first neighboring affine coding block are obtained through derivation, rather than being read from the memory. Therefore, according to this method, a quantity of times of reading from the memory can be further reduced and decoding performance can be improved. In another optional solution, the location coordinates of the bottom-left control point and the location coordinates of the bottom-right control point may be alternatively pre-stored in the memory, and read from the memory for use when necessary.

In this case, in the formulas (1) and (2), $(x_7-x_6)$ is equal to cuW, $(vx_7, vy_7)$ may be obtained by reading a motion vector of a location $(x_4+cuW-1, y_4+cuH-1)$ in a picture, and $(vx_6, vy_6)$ may be obtained by reading a motion vector of a location $(x_4, y_4+cuH-1)$ in the picture.

If the first neighboring affine coding block is located in a coding tree unit (Coding Tree Unit, CTU) on the left of the current coding block, motion vectors of two rightmost control points of the first neighboring affine coding block are obtained. For example, location coordinates $(x_5, y_5)$ and a motion vector $(vx_5, vy_5)$ of a top-right control point of the first neighboring affine coding block and location coordinates $(x_7, y_7)$ and a motion vector $(vx_7, vy_7)$ of a bottom-right control point of the first neighboring affine coding block may be obtained (step S1304).

A first affine model (the first affine model obtained in this case is a 4-parameter affine model) is formed based on the motion vectors and location coordinates of the two rightmost control points of the first neighboring affine coding block (step S1305).

The motion vector of the control point of the current coding block is predicted based on the first affine model. For example, location coordinates of a top-left control point of the current coding block and location coordinates of a top-right control point of the current coding block may be substituted into the first affine model, to predict a motion vector of the top-left control point of the current coding block and a motion vector of the top-right control point of the current coding block. Details are shown in formulas (18) and (19) (step S1306).

$$\begin{cases} vx_0 = vx_5 - \frac{(vy_7 - vy_5)}{y_7 - y_5} \times (x_0 - x_5) + \frac{(vx_7 - vx_5)}{y_7 - y_5} \times (y_0 - y_5) \\ vy_0 = vy_5 + \frac{(vx_7 - vx_5)}{y_7 - y_5} \times (x_0 - x_5) + \frac{(vy_7 - vy_5)}{y_7 - y_5} \times (y_0 - y_5) \end{cases} \quad (18)$$

$$\begin{cases} vx_1 = vx_5 - \frac{(vx_7 - vx_5)}{y_7 - y_5} \times (x_1 - x_5) + \frac{(vx_7 - vx_5)}{y_7 - \gamma y_5} \times (y_1 - y_5) \\ vy_1 = vy_5 + \frac{(vx_7 - vx_5)}{y_7 - y_5} \times (x_1 - x_5) + \frac{(vy_7 - vy_5)}{y_7 - y_5} \times (y_1 - y_5) \end{cases} \quad (19)$$

In the formulas (18) and (19), $(x_0, y_0)$ are the coordinates of the top-left control point of the current coding block, and $(x_1, y_1)$ are the coordinates of the top-right control point of the current coding block. In addition, $(vx_0, vy_0)$ is the predicted motion vector of the top-left control point of the current coding block, and $(vx_1, vy_1)$ is the predicted motion vector of the top-right control point of the current coding block.

If the first neighboring affine coding block is not located in the CTU above the current coding block, and is not located in the CTU on the left of the current coding block, a manner of predicting the motion vector of the control point of the current coding block is not limited herein. For example, in this case, the manner of predicting the motion vector of the control point of the current coding block may be the same as or different from the prediction manner used when the first neighboring affine coding block is located in the CTU above the current coding block. For another example, in this case, the manner of predicting the motion vector of the control point of the current coding block may be the same as or different from the prediction manner used when the first neighboring affine coding block is located in the CTU on the left of the current coding block.

Optionally, the candidate motion vector predictor MVP list further includes a second candidate motion vector group, and the second candidate motion vector group is obtained based on a second group of control points of a second neighboring affine coding block. Locations of one or more control points in the second group of control points of the second neighboring affine coding block relative to the second neighboring affine coding block are different from locations of one or more control points in the first group of control points of the first neighboring affine coding block relative to the first neighboring affine coding block (for example, the control points included in the first group of control points of the first neighboring affine coding block are a bottom-left control point, a bottom-right control point, and a top-left control point of the first neighboring affine coding block, but the control points included in the second group of control points of the second neighboring affine coding block are a top-right control point, a bottom-right control point, and a bottom-left control point of the second neighboring affine coding block).

B: The parameter model of the current coding block is a 6-parameter affine transformation model. A derivation manner may be as follows:

If the first neighboring affine coding block is located in a CTU above the current coding block, location coordinates and motion vectors of two lowermost control points of the first neighboring affine coding block are obtained. For example, location coordinates $(x_6, y_6)$ and a motion vector $(vx_6, vy_6)$ of a bottom-left control point of the first neighboring affine coding block and location coordinates $(x_7, y_7)$ and a motion vector $(vx_7, vy_7)$ of a bottom-right control point of the first neighboring affine coding block may be obtained.

A first affine model (the first affine model obtained in this case is a 4-parameter affine model) is formed based on the motion vectors of the two lowermost control points of the first neighboring affine coding block.

The motion vector of the control point of the current coding block is predicted based on the first affine model. For example, location coordinates of a top-left control point of the current coding block, location coordinates of a top-right control point of the current coding block, and location coordinates of a bottom-left control point of the current coding block may be substituted into the first affine model, to predict a motion vector of the top-left control point of the current coding block, a motion vector of the top-right control point of the current coding block, and a motion vector of the bottom-left control point of the current coding block. Details are shown in formulas (1), (2), and (3).

In the formulas (1), (2), and (5), $(x_0, y_0)$ are the coordinates of the top-left control point of the current coding block, $(x_1, y_1)$ are the coordinates of the top-right control point of the current coding block, and $(x_2, y_2)$ are the coordinates of the bottom-left control point of the current coding block. In addition, $(vx_0, vy_0)$ is the predicted motion vector of the top-left control point of the current coding block, $(vx_1, vy_1)$ is the predicted motion vector of the top-right control point of the current coding block, and $(vx_2, vy_2)$ is the predicted motion vector of the bottom-left control point of the current coding block.

Optionally, both the location coordinates $(x_6, y_6)$ of the bottom-left control point and the location coordinates $(x_7, y_7)$ of the bottom-right control point of the first neighboring affine coding block are calculated based on location coordinates $(x_4, y_4)$ of a top-left control point of the first neighboring affine coding block. The location coordinates $(x_6, y_6)$ of the bottom-left control point of the first neighboring affine coding block are $(x_4, y_4+cuH)$, and the location coordinates $(x_7, y_7)$ of the bottom-right control point of the first neighboring affine coding block are $(x_4+cuW, y_4+cuH)$, where cuW is the width of the first neighboring affine coding block, and cuH is the height of the first neighboring affine coding block. In addition, the motion vector of the bottom-left control point of the first neighboring affine coding block is a motion vector of a bottom-left sub-block of the first neighboring affine coding block, and the motion vector of the bottom-right control point of the first neighboring affine coding block is a motion vector of a bottom-right sub-block of the first neighboring affine coding block. It can be learned that in this case, a horizontal distance between the bottom-left control point and the bottom-right control point of the first neighboring affine coding block is cuW, and a horizontal distance between the top-left control point and the top-right control point of the first neighboring affine coding block is cuW. Because cuW is usually a power of 2, in a process of deriving the motion vector of the control point of the current coding block, a right-shifting manner may be used instead of a division operation, to reduce implementation complexity. It can be learned that both the location coordinates of the bottom-left control point and the location coordinates of the bottom-right control point of the first neighboring affine coding block are obtained through derivation, rather than being read from the memory. Therefore, according to this method, a quantity of times of reading from the memory can be further reduced and decoding performance can be improved. In another optional solution, the location coordinates of the bottom-left control point and the location coordinates of the bottom-right control point may be alternatively pre-stored in the memory, and read from the memory for use when necessary.

If the first neighboring affine coding block is located in a CTU on the left of the current coding block, location coordinates and motion vectors of two rightmost control points of the first neighboring affine coding block are obtained. For example, location coordinates $(x_5, y_5)$ and a motion vector $(vx_5, vy_5)$ of a top-right control point of the first neighboring affine coding block and location coordinates $(x_7, y_7)$ and a motion vector $(vx_7, vy_7)$ of a bottom-right control point of the first neighboring affine coding block may be obtained.

A first affine model (the first affine model obtained in this case is a 4-parameter affine model) is formed based on the motion vectors of the two lowermost control points of the first neighboring affine coding block.

The motion vector of the control point of the current coding block is predicted based on the first affine model. For example, location coordinates of a top-left control point of the current coding block, location coordinates of a top-right control point of the current coding block, and location coordinates of a bottom-left control point of the current coding block may be substituted into the first affine model, to predict a motion vector of the top-left control point of the current coding block, a motion vector of the top-right control point of the current coding block, and a motion vector of the bottom-left control point of the current coding block. Details are shown in formulas (18), (19), and (20).

$$\begin{cases} vx_2 = vx_5 - \dfrac{(vy_7 - vy_5)}{y_7 - y_5} \times (x_2 - x_5) + \dfrac{(vx_7 - vx_5)}{y_7 - y_5} \times (y_2 - y_5) \\ vy_2 = vy_5 + \dfrac{(vx_7 - vx_5)}{y_7 - y_5} \times (x_2 - x_5) + \dfrac{(vy_7 - vy_5)}{y_7 - y_5} \times (y_2 - y_5) \end{cases} \quad (20)$$

In the formulas (18), (19), and (20), $(x_0, y_0)$ are the coordinates of the top-left control point of the current coding block, $(x_1, y_1)$ are the coordinates of the top-right control point of the current coding block, and $(x_2, y_2)$ are the coordinates of the bottom-left control point of the current coding block. In addition, $(vx_0, vy_0)$ is the predicted motion vector of the top-left control point of the current coding block, $(vx_1, vy_1)$ is the predicted motion vector of the top-right control point of the current coding block, and $(vx_2, vy_2)$ is the predicted motion vector of the bottom-left control point of the current coding block.

If the first neighboring affine coding block is not located in the CTU above the current coding block, and is not located in the CTU on the left of the current coding block, a manner of predicting the motion vector of the control point of the current coding block is not limited herein. For example, in this case, the manner of predicting the motion vector of the control point of the current coding block may be the same as or different from the prediction manner used when the first neighboring affine coding block is located in the CTU above the current coding block. For another example, in this case, the manner of predicting the motion vector of the control point of the current coding block may be the same as or different from the prediction manner used when the first neighboring affine coding block is located in the CTU on the left of the current coding block.

Optionally, the candidate motion vector predictor MVP list further includes a second candidate motion vector group, and the second candidate motion vector group is obtained based on a second group of control points of a second neighboring affine coding block. Locations of one or more control points in the second group of control points of the second neighboring affine coding block relative to the second neighboring affine coding block are different from locations of one or more control points in the first group of control points of the first neighboring affine coding block relative to the first neighboring affine coding block (for example, the control points included in the first group of control points of the first neighboring affine coding block are a bottom-left control point, a bottom-right control point, and a top-left control point of the first neighboring affine coding block, but the control points included in the second group of control points of the second neighboring affine coding block are a top-right control point, a bottom-right control point, and a bottom-left control point of the second neighboring affine coding block).

Manner 2: The candidate motion vector predictor MVP list is constructed by using a control point combination-based motion vector prediction method.

Specifically, a principle of the manner 2 is the same as that of the manner 2 in step S1211. Therefore, details are not described herein again.

Step S1312: The video decoder parses a bitstream, to obtain an index and a motion vector difference MVD.

For details, refer to the description of step S1212. Details are not described herein again.

Step S1313: The video decoder determines the target motion vector group in the candidate motion vector predictor MVP list based on the index.

For details, refer to the description of step S1213. Details are not described herein again.

Step S1314: The video decoder determines the motion vector of the control point of the current coding block based on the target candidate motion vector group and the motion vector difference MVD that is obtained from the bitstream through parsing.

For details, refer to the description of step S1214. Details are not described herein again.

Step S1315: The video decoder obtains a motion vector of each sub-block of the current coding block based on the determined motion vector of the control point of the current coding block by using a parameter-based affine transformation model.

For details, refer to the description of step S1215. Details are not described herein again.

Step S1316: The video decoder performs motion compensation based on the motion vector of each sub-block of the current coding block, to obtain a predicted sample value of each sub-block.

For details, refer to the description of step S1216. Details are not described herein again.

Merge Mode:

Step S1321: The video decoder constructs a candidate motion information list.

Specifically, the video decoder constructs the candidate motion information list (also referred to as an affine candidate motion vector list) by using the inter prediction unit (also referred to as an inter prediction module). The construction may be performed in either of the following two manners or a combination of the two manners. The constructed candidate motion information list is a triplet candidate motion information list. The two manners are specifically as follows:

Manner 1: The candidate motion information list is constructed by using a motion model-based motion vector prediction method.

First, all or some neighboring blocks of the current coding block are traversed in a pre-specified order, to determine a neighboring affine coding block in the neighboring blocks. There may be one or more determined neighboring affine coding blocks. For example, neighboring blocks A, B, C, D, and E shown in FIG. 7A may be traversed sequentially, to determine a neighboring affine coding block in the neighboring blocks A, B, C, D, and E. The inter prediction unit determines a group of candidate motion vector predictors (each group of candidate motion vector predictors is a 2-tuple or a triplet) based on at least one neighboring affine coding block. The following uses one neighboring affine coding block as an example for description. For ease of description, the neighboring affine coding block is referred to as a first neighboring affine coding block. Details are as follows:

A first affine model is determined based on a motion vector of a control point of the first neighboring affine coding block. Further, a motion vector of a control point of the current coding block is predicted based on the first affine model. Details are as follows:

If the first neighboring affine coding block is located in a CTU above the current coding block, location coordinates and motion vectors of two lowermost control points of the first neighboring affine coding block are obtained. For example, location coordinates $(x_6, y_6)$ and a motion vector $(vx_6, vy_6)$ of a bottom-left control point of the first neighboring affine coding block and location coordinates $(x_7, y_7)$ and a motion vector $(vx_7, vy_7)$ of a bottom-right control point of the first neighboring affine coding block may be obtained.

A first affine model (the first affine model obtained in this case is a 4-parameter affine model) is formed based on the motion vectors of the two lowermost control points of the first neighboring affine coding block.

Optionally, the motion vector of the control point of the current coding block is predicted based on the first affine model. For example, location coordinates of a top-left control point of the current coding block, location coordinates of a top-right control point of the current coding block, and location coordinates of a bottom-left control point of the current coding block may be substituted into the first affine model, to predict a motion vector of the top-left control point of the current coding block, a motion vector of the top-right control point of the current coding block, and a motion vector of the bottom-left control point of the current coding block. A candidate motion vector triplet is formed and is added to the candidate motion information list. Details are shown in formulas (1), (2), and (3).

Optionally, the motion vector of the control point of the current coding block is predicted based on the first affine model. For example, location coordinates of a top-left control point of the current coding block and location coordinates of a top-right control point of the current coding block may be substituted into the first affine model, to predict a motion vector of the top-left control point of the current coding block and a motion vector of the top-right control point of the current coding block. A candidate motion vector 2-tuple is formed and is added to the candidate motion information list. Details are shown in formulas (1) and (2).

In the formulas (1), (2), and (3), $(x_0, y_0)$ are the coordinates of the top-left control point of the current coding block, $(x_1, y_1)$ are the coordinates of the top-right control point of the current coding block, and $(x_2, y_2)$ are the coordinates of the bottom-left control point of the current coding block. In addition, $(vx_0, vy_0)$ is the predicted motion vector of the top-left control point of the current coding block, $(vx_1, vy_1)$ is the predicted motion vector of the top-right control point of the current coding block, and $(vx_2, vy_2)$ is the predicted motion vector of the bottom-left control point of the current coding block.

Optionally, both the location coordinates $(x_6, y_6)$ of the bottom-left control point and the location coordinates $(x_7, y_7)$ of the bottom-right control point of the first neighboring affine coding block are calculated based on location coordinates $(x_4, y_4)$ of a top-left control point of the first neighboring affine coding block. The location coordinates $(x_6, y_6)$ of the bottom-left control point of the first neighboring affine coding block are $(x_4, y_4+cuH)$, and the location coordinates $(x_7, y_7)$ of the bottom-right control point of the first neighboring affine coding block are $(x_4+cuW, y_4+cuH)$, where cuW is the width of the first neighboring affine coding block, and cuH is the height of the first neighboring affine coding block. In addition, the motion vector of the bottom-left control point of the first neighboring affine coding block is a motion vector of a bottom-left sub-block of the first neighboring affine coding block, and the motion vector of the bottom-right control point of the first neighboring affine coding block is a motion vector of a bottom-right sub-block of the first neighboring affine coding block. It can be learned that in this case, a horizontal distance between the bottom-left control point and the bottom-right control point of the first neighboring affine coding block is cuW, and a horizontal distance between the top-left control point and the top-right control point of the first neighboring affine coding block is cuW. Because cuW is usually a power of 2, in a process of deriving the motion vector of the control point of the current coding block, a right-shifting manner may be used instead of a division operation, to reduce implementation complexity. It can be learned that both the location coordinates of the bottom-left control point and the location coordinates of the bottom-right control point of the first neighboring affine coding block are obtained through derivation, rather than being read from the memory. Therefore, according to this method, a quantity of times of reading from the memory can be further reduced and decoding performance can be improved. In another optional solution, the location coordinates of the bottom-left control point and the location coordinates of the bottom-right control point may be alternatively pre-stored in the memory, and read from the memory for use when necessary.

In this case, in the formulas (1) and (2), $(x_7-x_6)$ is equal to cuW, $(vx_7, vy_7)$ may be obtained by reading a motion vector of a location $(x_4+cuW-1, y_4+cuH-1)$ in a picture, and $(vx_6, vy_6)$ may be obtained by reading a motion vector of a location $(x_4, y_4+cuH-1)$ in the picture.

If the first neighboring affine coding block is located in a CTU on the left of the current coding block, location coordinates and motion vectors of two rightmost control points of the first neighboring affine coding block are obtained. For example, location coordinates ($x_5$, $y_5$) and a motion vector ($vx_5$, $vy_5$) of a top-right control point of the first neighboring affine coding block and location coordinates ($x_7$, $y_7$) and a motion vector ($vx_7$, $vy_7$) of a bottom-right control point of the first neighboring affine coding block may be obtained.

A first affine model (the first affine model obtained in this case is a 4-parameter affine model) is formed based on the motion vectors of the two lowermost control points of the first neighboring affine coding block.

Optionally, the motion vector of the control point of the current coding block is predicted based on the first affine model. For example, location coordinates of a top-left control point of the current coding block, location coordinates of a top-right control point of the current coding block, and location coordinates of a bottom-left control point of the current coding block may be substituted into the first affine model, to predict a motion vector of the top-left control point of the current coding block, a motion vector of the top-right control point of the current coding block, and a motion vector of the bottom-left control point of the current coding block. A candidate motion vector triplet is formed and is added to the candidate motion information list. Details are shown in formulas (18), (19), and (20).

Optionally, the motion vector of the control point of the current coding block is predicted based on the first affine model. For example, location coordinates of a top-left control point of the current coding block and location coordinates of a top-right control point of the current coding block may be substituted into the first affine model, to predict a motion vector of the top-left control point of the current coding block and a motion vector of the top-right control point of the current coding block. A candidate motion vector 2-tuple is formed and is added to the candidate motion information list. Details are shown in formulas (18) and (19).

In the formulas (18), (19), and (20), ($x_0$, $y_0$) are the coordinates of the top-left control point of the current coding block, ($x_1$, $y_1$) are the coordinates of the top-right control point of the current coding block, and ($x_2$, $y_2$) are the coordinates of the bottom-left control point of the current coding block. In addition, ($vx_0$, $vy_0$) is the predicted motion vector of the top-left control point of the current coding block, ($vx_1$, $vy_1$) is the predicted motion vector of the top-right control point of the current coding block, and ($vx_2$, $vy_2$) is the predicted motion vector of the bottom-left control point of the current coding block.

If the first neighboring affine coding block is not located in the CTU above the current coding block, and is not located in the CTU on the left of the current coding block, a manner of predicting the motion vector of the control point of the current coding block is not limited herein. For example, in this case, the manner of predicting the motion vector of the control point of the current coding block may be the same as or different from the prediction manner used when the first neighboring affine coding block is located in the CTU above the current coding block. For another example, in this case, the manner of predicting the motion vector of the control point of the current coding block may be the same as or different from the prediction manner used when the first neighboring affine coding block is located in the CTU on the left of the current coding block.

Optionally, the candidate motion information list further includes a second candidate motion vector group, and the second candidate motion vector group is obtained based on a second group of control points of a second neighboring affine coding block. Locations of one or more control points in the second group of control points of the second neighboring affine coding block relative to the second neighboring affine coding block are different from locations of one or more control points in the first group of control points of the first neighboring affine coding block relative to the first neighboring affine coding block (for example, the control points included in the first group of control points of the first neighboring affine coding block are a bottom-left control point, a bottom-right control point, and a top-left control point of the first neighboring affine coding block, but the control points included in the second group of control points of the second neighboring affine coding block are a top-right control point, a bottom-right control point, and a bottom-left control point of the second neighboring affine coding block).

Manner 2: The candidate motion information list is constructed by using a control point combination-based motion vector prediction method.

Specifically, a principle of the manner 2 is the same as that of the manner 2 in step S1221. Therefore, details are not described herein again.

Step S1322: The video decoder parses a bitstream, to obtain an index.

For details, refer to the description of step S1222. Details are not described herein again.

Step S1323: The video decoder determines the target motion vector group in the candidate motion information list based on the index.

For details, refer to the description of step S1223. Details are not described herein again.

Step S1324: The video decoder obtains a motion vector of each sub-block of the current coding block based on the determined motion vector of the control point of the current coding block by using a parameter-based affine transformation model.

For details, refer to the description of step S1224. Details are not described herein again.

Step S1325: The video decoder performs motion compensation based on the motion vector of each sub-block of the current coding block, to obtain a predicted sample value of each sub-block.

For details, refer to the description of step S1225. Details are not described herein again.

It may be understood that, when the coding tree unit CTU in which the first neighboring affine coding block is located is above the current coding block, information about lowermost control points of the first neighboring affine coding block has been read from memory. When the coding tree unit CTU in which the first neighboring affine coding block is located is on the left of the current coding block, information about rightmost control points of the first neighboring affine coding block has been read from memory. Therefore, in the foregoing solution, in a process of constructing a candidate motion vector based on the first group of control points of the first neighboring affine coding block, the first group of control points are control points determined based on a coding tree unit CTU located relative to the current coding block, wherein the first neighboring affine coding block is located in the CTU, instead of fixedly using a top-left control point, a top-right control point, and a bottom-left control point of a first neighboring coding block as a first group of control points (or fixedly using a top-left control point and a top-right control point of a first neighboring coding block as a first group of control points) in the prior art. Therefore, according to the method of determining the first group of control points in this application, the information that has been read from the memory can be directly reused as information (for example, location coordinates and motion vectors) about the first group of control points, thereby reducing a quantity of times of reading from the memory and improving decoding performance.

In another optional embodiment on a decoder side, if a first neighboring affine coding block is located in a coding tree unit (Coding Tree Unit, CTU) above a current coding block, a group of candidate motion vector predictors is determined based on a bottom-left control point, a bottom-right control point, and a top-right control point of the first neighboring affine coding block. Details are as follows:

Step S1400: The video decoder determines an inter prediction mode for the current coding block.

Specifically, the inter prediction mode may be an advanced motion vector prediction (Advanced Motion Vector Prediction, AMVP) mode, or may be a merge (merge) mode.

If the determined inter prediction mode for the current coding block is the AMVP mode, steps S1411 to S1416 are performed.

If the determined inter prediction mode for the current coding block is the merge mode, steps S1421 to S1425 are performed.

AMVP Mode:

Step S1411: The video decoder constructs a candidate motion vector predictor MVP list.

Specifically, the video decoder constructs the candidate motion vector predictor MVP list (also referred to as an affine candidate motion vector list) by using the inter prediction unit (also referred to as an inter prediction module). The construction may be performed in either of the following two manners or a combination of the two manners. The constructed candidate motion vector predictor MVP list may be a triplet candidate motion vector predictor MVP list or a 2-tuple candidate motion vector predictor MVP list. The two manners are specifically as follows:

Manner 1: The candidate motion vector predictor MVP list is constructed by using a motion model-based motion vector prediction method.

First, all or some neighboring blocks of the current coding block are traversed in a pre-specified order, to determine a neighboring affine coding block in the neighboring blocks. There may be one or more determined neighboring affine coding blocks. For example, neighboring blocks A, B, C, D, and E shown in FIG. 7A may be traversed sequentially, to determine a neighboring affine coding block in the neighboring blocks A, B, C, D, and E. The inter prediction unit determines a group of candidate motion vector predictors (each group of candidate motion vector predictors is a 2-tuple or a triplet) based on at least one neighboring affine coding block. The following uses one neighboring affine coding block as an example for description. For ease of description, the neighboring affine coding block is referred to as a first neighboring affine coding block. Details are as follows:

A first affine model is determined based on a motion vector of a control point of the first neighboring affine coding block. Further, a motion vector of a control point of the current coding block is predicted based on the first affine model. A manner of predicting the motion vector of the control point of the current coding block based on the motion vector of the control point of the first neighboring affine coding block varies with a parameter model of the current coding block. Therefore, the following provides descriptions for different cases.

Figure 9C:
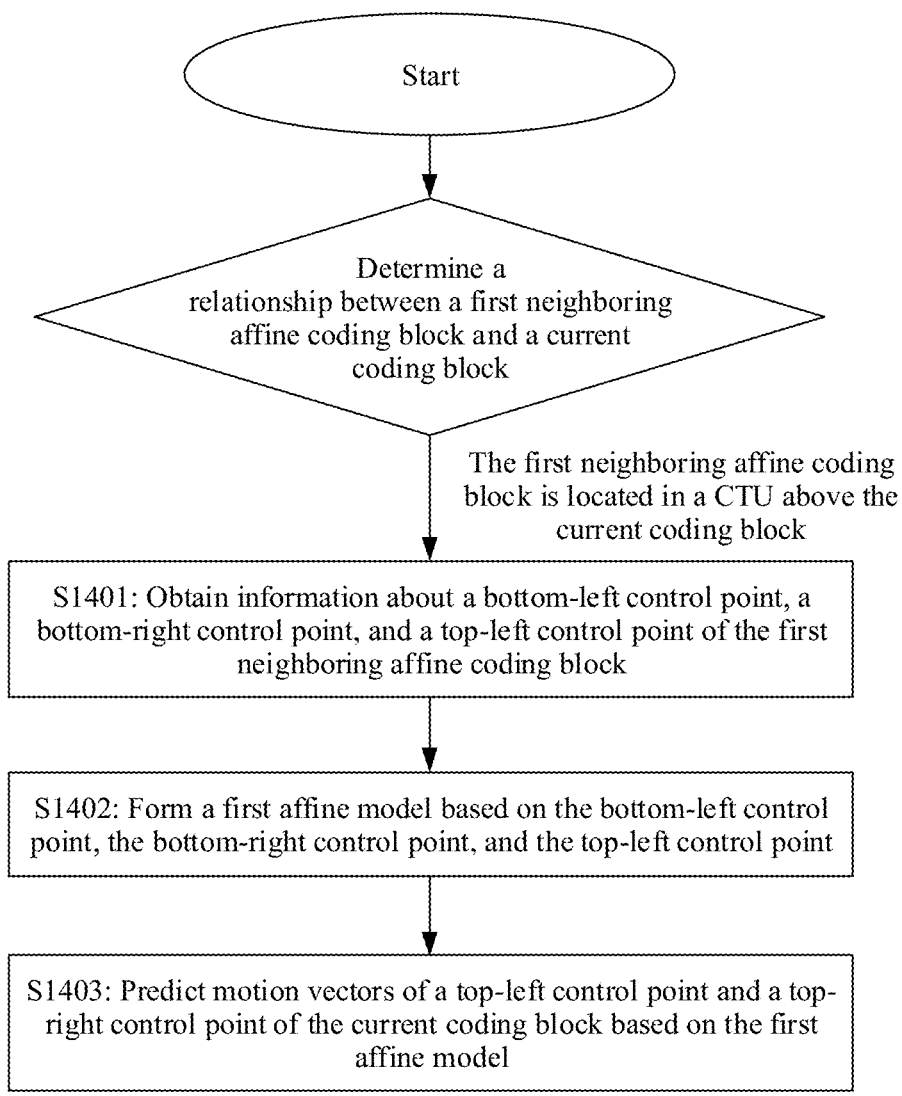
FIG. 9C is a schematic flowchart of constructing an affine candidate motion vector list according to an embodiment of this application.

A: The parameter model of the current coding block is a 4-parameter affine transformation model. A derivation manner may be as follows (as shown in FIG. 9C):

If the first neighboring affine coding block is located in a coding tree unit (Coding Tree Unit, CTU) above the current coding block, motion vectors of a top-left control point and two lowermost control points of the first neighboring affine coding block are obtained. For example, location coordinates $(x_4, y_4)$ and a motion vector $(vx_4, vy_4)$ of the top-left control point of the first neighboring affine coding block, location coordinates $(x_6, y_6)$ and a motion vector $(vx_6, vy_6)$ of a bottom-left control point of the first neighboring affine coding block, and location coordinates $(x_7, y_7)$ and a motion vector $(vx_7, vy_7)$ of a bottom-right control point of the first neighboring affine coding block may be obtained (step S1401).

A first affine model (the first affine model obtained in this case is a 6-parameter affine model) is formed based on the location coordinates and the motion vector of the top-left control point of the first neighboring affine coding block, the location coordinates and the motion vector of the bottom-left control point of the first neighboring affine coding block, and the location coordinates and the motion vector of the bottom-right control point of the first neighboring affine coding block (step S1402).

The motion vector of the control point of the current coding block is predicted based on the first affine model. For example, location coordinates of a top-left control point of the current coding block and location coordinates of a top-right control point of the current coding block may be substituted into the first affine model, to predict a motion vector of the top-left control point of the current coding block and a motion vector of the top-right control point of the current coding block. Details are shown in formulas (21) and (22) (step S1403).

$$\begin{cases} vx_0 = vx_6 + \dfrac{(vy_7 - vy_6)}{x_7 - x_6} \times (x_0 - x_6) + \dfrac{(vx_4 - vx_6)}{y_4 - y_6} \times (y_0 - y_6) \\ vy_0 = vy_6 + \dfrac{(vx_7 - vx_6)}{x_7 - x_6} \times (x_0 - x_6) + \dfrac{(vy_4 - vy_6)}{y_7 - y_6} \times (y_0 - y_6) \end{cases} \quad (21)$$

$$\begin{cases} vx_1 = vx_6 + \dfrac{(vy_7 - vy_6)}{x_7 - x_6} \times (x_1 - x_6) + \dfrac{(vx_4 - vx_6)}{y_4 - y_6} \times (y_1 - y_6) \\ vy_1 = vy_6 + \dfrac{(vx_7 - vx_6)}{x_7 - x_6} \times (x_1 - x_6) + \dfrac{(vy_4 - vy_6)}{y_7 - y_6} \times (y_1 - y_6) \end{cases} \quad (22)$$

In the formulas (21) and (22), $(x_0, y_0)$ are the coordinates of the top-left control point of the current coding block, and $(x_1, y_1)$ are the coordinates of the top-right control point of the current coding block. In addition, $(vx_0, vy_0)$ is the predicted motion vector of the top-left control point of the current coding block, and $(vx_1, vy_1)$ is the predicted motion vector of the top-right control point of the current coding block.

Optionally, both the location coordinates $(x_6, y_6)$ of the bottom-left control point and the location coordinates $(x_7, y_7)$ of the bottom-right control point of the first neighboring affine coding block are calculated based on location coordinates $(x_4, y_4)$ of a top-left control point of the first neighboring affine coding block. The location coordinates $(x_6, y_6)$ of the bottom-left control point of the first neighboring affine coding block are $(x_4, y_4+cuH)$, and the location coordinates $(x_7, y_7)$ of the bottom-right control point of the first neighboring affine coding block are $(x_4+cuW, y_4+cuH)$, where cuW is the width of the first neighboring affine coding block, and cuH is the height of the first neighboring affine coding block. In addition, the motion vector of the bottom-left control point of the first neighboring affine coding block is a motion vector of a bottom-left sub-block of the first neighboring affine coding block, and the motion vector of the bottom-right control point of the first neighboring affine coding block is a motion vector of a bottom-right sub-block of the first neighboring affine coding block. It can be learned that in this case, a horizontal distance between the bottom-left control point and the bottom-right control point of the first neighboring affine coding block is cuW, and a horizontal distance between the top-left control point and the top-right control point of the first neighboring affine coding block is cuW. Because cuW is usually a power of 2, in a process of deriving the motion vector of the control point of the current coding block, a right-shifting manner may be used instead of a division operation, to reduce implementation complexity. It can be learned that both the location coordinates of the bottom-left control point and the location coordinates of the bottom-right control point of the first neighboring affine coding block are obtained through derivation, rather than being read from the memory. Therefore, according to this method, a quantity of times of reading from the memory can be further reduced and decoding performance can be improved. In another optional solution, the location coordinates of the bottom-left control point and the location coordinates of the bottom-right control point may be alternatively pre-stored in the memory, and read from the memory for use when necessary.

In this case, in the formulas (21) and (22), $(x_7 - x_6)$ is equal to cuW, $(vx_7, vy_7)$ may be obtained by reading a motion vector of a location $(x_4 + cuW - 1, y_4 + cuH - 1)$ in a picture, and $(vx_6, vy_6)$ may be obtained by reading a motion vector of a location $(x_4, y_4 + cuH - 1)$ in the picture.

If the first neighboring affine coding block is not located in the CTU above the current coding block, a manner of predicting the motion vector of the control point of the current coding block is not limited herein. Specifically, in this case, the manner of predicting the motion vector of the control point of the current coding block may be the same as or different from the prediction manner used when the first neighboring affine coding block is located in the CTU above the current coding block.

B: The parameter model of the current coding block is a 6-parameter affine transformation model. A derivation manner may be as follows:

If the first neighboring affine coding block is located in a CTU above the current coding block, location coordinates and motion vectors of a top-left control point and two lowermost control points of the first neighboring affine coding block are obtained. For example, location coordinates $(x_4, y_4)$ and a motion vector $(vx_4, vy_4)$ of the top-left control point of the first neighboring affine coding block, location coordinates $(x_6, y_6)$ and a motion vector $(vx_6, vy_6)$ of a bottom-left control point of the first neighboring affine coding block, and location coordinates $(x_7, y_7)$ and a motion vector $(vx_7, vy_7)$ of a bottom-right control point of the first neighboring affine coding block may be obtained.

A first affine model (the first affine model obtained in this case is a 6-parameter affine model) is formed based on the location coordinates and the motion vector of the top-left control point of the first neighboring affine coding block, the location coordinates and the motion vector of the bottom-left control point of the first neighboring affine coding block, and the location coordinates and the motion vector of the bottom-right control point of the first neighboring affine coding block.

The motion vector of the control point of the current coding block is predicted based on the first affine model. For example, location coordinates of a top-left control point of the current coding block, location coordinates of a top-right control point of the current coding block, and location coordinates of a bottom-left control point of the current coding block may be substituted into the first affine model, to predict a motion vector of the top-left control point of the current coding block, a motion vector of the top-right control point of the current coding block, and a motion vector of the bottom-left control point of the current coding block. Details are shown in formulas (21), (22), and (23).

$$\begin{cases} vx_2 = vx_6 + \dfrac{(vx_7 - vx_6)}{x_7 - x_6} \times (x_2 - x_6) + \dfrac{(vx_4 - vx_6)}{y_4 - y_6} \times (y_2 - y_6) \\ vy_2 = vy_6 + \dfrac{(vy_7 - vy_6)}{x_7 - x_6} \times (x_2 - x_6) + \dfrac{(vy_4 - vy_6)}{y_4 - y_6} \times (y_2 - y_6) \end{cases} \quad (23)$$

In the formulas (21), (22), and (23), $(x_0, y_0)$ are the coordinates of the top-left control point of the current coding block, $(x_1, y_1)$ are the coordinates of the top-right control point of the current coding block, and $(x_2, y_2)$ are the coordinates of the bottom-left control point of the current coding block. In addition, $(vx_0, vy_0)$ is the predicted motion vector of the top-left control point of the current coding block, $(vx_1, vy_1)$ is the predicted motion vector of the top-right control point of the current coding block, and $(vx_2, vy_2)$ is the predicted motion vector of the bottom-left control point of the current coding block.

If the first neighboring affine coding block is not located in the CTU above the current coding block, a manner of predicting the motion vector of the control point of the current coding block is not limited herein. Specifically, in this case, the manner of predicting the motion vector of the control point of the current coding block may be the same as or different from the prediction manner used when the first neighboring affine coding block is located in the CTU above the current coding block.

Manner 2: The candidate motion vector predictor MVP list is constructed by using a control point combination-based motion vector prediction method.

Specifically, a principle of the manner 2 is the same as that of the manner 2 in step S1211. Therefore, details are not described herein again.

Step S1412: The video decoder parses a bitstream, to obtain an index and a motion vector difference MVD.

For details, refer to the description of step S1212. Details are not described herein again.

Step S1413: The video decoder determines the target motion vector group in the candidate motion vector predictor MVP list based on the index.

For details, refer to the description of step S1213. Details are not described herein again.

Step S1414: The video decoder determines the motion vector of the control point of the current coding block based on the target candidate motion vector group and the motion vector difference MVD that is obtained from the bitstream through parsing.

For details, refer to the description of step S1214. Details are not described herein again.

Step S1415: The video decoder obtains a motion vector of each sub-block of the current coding block based on the determined motion vector of the control point of the current coding block by using a parameter-based affine transformation model.

For details, refer to the description of step S1215. Details are not described herein again.

Step S1416: The video decoder performs motion compensation based on the motion vector of each sub-block of the current coding block, to obtain a predicted sample value of each sub-block.

For details, refer to the description of step S1216. Details are not described herein again.

Merge Mode:

Step S1421: The video decoder constructs a candidate motion information list.

Specifically, the video decoder constructs the candidate motion information list (also referred to as an affine candidate motion vector list) by using the inter prediction unit (also referred to as an inter prediction module). The construction may be performed in either of the following two manners or a combination of the two manners. The constructed candidate motion information list is a triplet candidate motion information list. The two manners are specifically as follows:

Manner 1: The candidate motion information list is constructed by using a motion model-based motion vector prediction method.

First, all or some neighboring blocks of the current coding block are traversed in a pre-specified order, to determine a neighboring affine coding block in the neighboring blocks. There may be one or more determined neighboring affine coding blocks. For example, neighboring blocks A, B, C, D, and E shown in FIG. 7A may be traversed sequentially, to determine a neighboring affine coding block in the neighboring blocks A, B, C, D, and E. The inter prediction unit determines a group of candidate motion vector predictors (each group of candidate motion vector predictors is a 2-tuple or a triplet) based on at least one neighboring affine coding block. The following uses one neighboring affine coding block as an example for description. For ease of description, the neighboring affine coding block is referred to as a first neighboring affine coding block. Details are as follows:

A first affine model is determined based on a motion vector of a control point of the first neighboring affine coding block. Further, a motion vector of a control point of the current coding block is predicted based on the first affine model. Details are as follows:

If the first neighboring affine coding block is located in a CTU above the current coding block, location coordinates and motion vectors of a top-left control point and two lowermost control points of the first neighboring affine coding block are obtained. For example, location coordinates $(x_4, y_4)$ and a motion vector $(vx_4, vy_4)$ of the top-left control point of the first neighboring affine coding block, location coordinates $(x_6, y_6)$ and a motion vector $(vx_6, vy_6)$ of a bottom-left control point of the first neighboring affine coding block, and location coordinates $(x_7, y_7)$ and a motion vector $(vx_7, vy_7)$ of a bottom-right control point of the first neighboring affine coding block may be obtained.

A first affine model (the first affine model obtained in this case is a 6-parameter affine model) is formed based on the location coordinates and the motion vector of the top-left control point of the first neighboring affine coding block, the location coordinates and the motion vector of the bottom-left control point of the first neighboring affine coding block, and the location coordinates and the motion vector of the bottom-right control point of the first neighboring affine coding block.

Optionally, the motion vector of the control point of the current coding block is predicted based on the first affine model. For example, location coordinates of a top-left control point of the current coding block, location coordinates of a top-right control point of the current coding block, and location coordinates of a bottom-left control point of the current coding block may be substituted into the first affine model, to predict a motion vector of the top-left control point of the current coding block, a motion vector of the top-right control point of the current coding block, and a motion vector of the bottom-left control point of the current coding block. A candidate motion vector triplet is formed and is added to the candidate motion information list. Details are shown in formulas (21), (22), and (23).

Optionally, the motion vector of the control point of the current coding block is predicted based on the first affine model. For example, location coordinates of a top-left control point of the current coding block and location coordinates of a top-right control point of the current coding block may be substituted into the first affine model, to predict a motion vector of the top-left control point of the current coding block and a motion vector of the top-right control point of the current coding block. A candidate motion vector 2-tuple is formed and is added to the candidate motion information list. Details are shown in formulas (21) and (22).

In the formulas (21), (22), and (23), $(x_0, y_0)$ are the coordinates of the top-left control point of the current coding block, $(x_1, y_1)$ are the coordinates of the top-right control point of the current coding block, and $(x_2, y_2)$ are the coordinates of the bottom-left control point of the current coding block. In addition, $(vx_0, vy_0)$ is the predicted motion vector of the top-left control point of the current coding block, $(vx_1, vy_1)$ is the predicted motion vector of the top-right control point of the current coding block, and $(vx_2, vy_2)$ is the predicted motion vector of the bottom-left control point of the current coding block.

If the first neighboring affine coding block is not located in the CTU above the current coding block, a manner of predicting the motion vector of the control point of the current coding block is not limited herein. Specifically, in this case, the manner of predicting the motion vector of the control point of the current coding block may be the same as or different from the prediction manner used when the first neighboring affine coding block is located in the CTU above the current coding block.

Manner 2: The candidate motion information list is constructed by using a control point combination-based motion vector prediction method.

Specifically, a principle of the manner 2 is the same as that of the manner 2 in step S1221. Therefore, details are not described herein again.

Step S1422: The video decoder parses a bitstream, to obtain an index.

For details, refer to the description of step S1222. Details are not described herein again.

Step S1423: The video decoder determines the target motion vector group in the candidate motion information list based on the index.

For details, refer to the description of step S1223. Details are not described herein again.

Step S1424: The video decoder obtains a motion vector of each sub-block of the current coding block based on the determined motion vector of the control point of the current coding block by using a 6-parameter affine transformation model.

For details, refer to the description of step S1224. Details are not described herein again.

Step S1425: The video decoder performs motion compensation based on the motion vector of each sub-block of the current coding block, to obtain a predicted sample value of each sub-block.

For details, refer to the description of step S1225. Details are not described herein again.

It may be understood that, when the coding tree unit CTU in which the first neighboring affine coding block is located is above the current coding block, information about lowermost control points of the first neighboring affine coding block has been read from memory. Therefore, in the foregoing solution, in a process of constructing a candidate motion vector based on the first group of control points of the first neighboring affine coding block, the first group of control points includes the bottom-left control point and the bottom-right control point of the first neighboring affine coding block, instead of fixedly using a top-left control point, a top-right control point, and a bottom-left control point of a first neighboring coding block as a first group of control points (or fixedly using a top-left control point and a top-right control point of a first neighboring coding block as a first group of control points) in the prior art. Therefore, according to the method of determining the first group of control points in this application, the information that has been read from the memory can be directly reused as information (for example, location coordinates and motion vectors) about the first group of control points, thereby reducing a quantity of times of reading from the memory and improving decoding performance.

In another optional embodiment on a decoder side, regardless of a location of a first neighboring affine coding block relative to a current coding block, a group of candidate motion vector predictors is directly determined based on a bottom-left control point and a bottom-right control point of the first neighboring affine coding block. Detailed descriptions are as follows:

Step S1500: The video decoder determines an inter prediction mode for the current coding block.

Specifically, the inter prediction mode may be an advanced motion vector prediction (Advanced Motion Vector Prediction, AMVP) mode, or may be a merge (merge) mode.

If the determined inter prediction mode for the current coding block is the AMVP mode, steps S1511 to S1516 are performed.

If the determined inter prediction mode for the current coding block is the merge mode, steps S1521 to S1525 are performed.

AMVP Mode:

Step S1511: The video decoder constructs a candidate motion vector predictor MVP list.

Specifically, the video decoder constructs the candidate motion vector predictor MVP list (also referred to as an affine candidate motion vector list) by using the inter prediction unit (also referred to as an inter prediction module). The construction may be performed in either of the following two manners or a combination of the two manners. The constructed candidate motion vector predictor MVP list may be a triplet candidate motion vector predictor MVP list or a 2-tuple candidate motion vector predictor MVP list. The two manners are specifically as follows:

Manner 1: The candidate motion vector predictor MVP list is constructed by using a motion model-based motion vector prediction method.

First, all or some neighboring blocks of the current coding block are traversed in a pre-specified order, to determine a neighboring affine coding block in the neighboring blocks.

There may be one or more determined neighboring affine coding blocks. For example, neighboring blocks A, B, C, D, and E shown in FIG. 7A may be traversed sequentially, to determine a neighboring affine coding block in the neighboring blocks A, B, C, D, and E. The inter prediction unit determines a group of candidate motion vector predictors (each group of candidate motion vector predictors is a 2-tuple or a triplet) based on at least one neighboring affine coding block. The following uses one neighboring affine coding block as an example for description. For ease of description, the neighboring affine coding block is referred to as a first neighboring affine coding block. Details are as follows:

A first affine model is determined based on a motion vector of a control point of the first neighboring affine coding block. Further, a motion vector of a control point of the current coding block is predicted based on the first affine model. A manner of predicting the motion vector of the control point of the current coding block based on the motion vector of the control point of the first neighboring affine coding block varies with a parameter model of the current coding block. Therefore, the following provides descriptions for different cases.

Figure 9D:
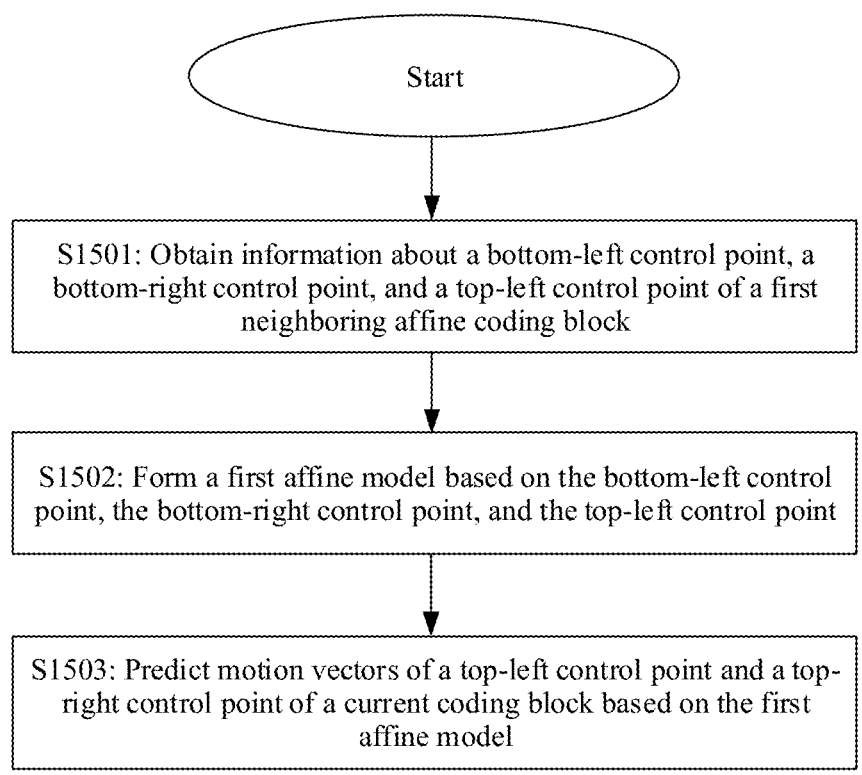
FIG. 9D is a schematic flowchart of constructing an affine candidate motion vector list according to an embodiment of this application.

A: The parameter model of the current coding block is a 4-parameter affine transformation model. A derivation manner may be as follows (as shown in FIG. 9D):

Regardless of the location of the first neighboring affine coding block relative to the current coding block, motion vectors of a top-left control point and two lowermost control points of the first neighboring affine coding block are directly obtained. For example, location coordinates $(x_4, y_4)$ and a motion vector $(vx_4, vy_4)$ of the top-left control point of the first neighboring affine coding block, location coordinates $(x_6, y_6)$ and a motion vector $(vx_6, vy_6)$ of a bottom-left control point of the first neighboring affine coding block, and location coordinates $(x_7, y_7)$ and a motion vector $(vx_7, vy_7)$ of a bottom-right control point of the first neighboring affine coding block may be obtained (step S1501).

A first affine model (the first affine model obtained in this case is a 6-parameter affine model) is formed based on the location coordinates and the motion vector of the top-left control point of the first neighboring affine coding block, the location coordinates and the motion vector of the bottom-left control point of the first neighboring affine coding block, and the location coordinates and the motion vector of the bottom-right control point of the first neighboring affine coding block (step S1502).

The motion vector of the control point of the current coding block is predicted based on the first affine model. For example, location coordinates of a top-left control point of the current coding block and location coordinates of a top-right control point of the current coding block may be substituted into the first affine model, to predict a motion vector of the top-left control point of the current coding block and a motion vector of the top-right control point of the current coding block. Details are shown in formulas (21) and (22) (step S1503).

$$\begin{cases} vx_0 = vx_6 + \dfrac{(vx_7 - vx_6)}{x_7 - x_6} \times (x_0 - x_6) + \dfrac{(vx_4 - vx_6)}{y_4 - y_6} \times (y_0 - y_6) \\ vy_0 = vy_6 + \dfrac{(vy_7 - vy_6)}{x_7 - x_6} \times (x_0 - x_6) + \dfrac{(vy_4 - vy_6)}{y_4 - y_6} \times (y_0 - y_6) \end{cases} \quad (21)$$

-continued $$\begin{cases} vx_1 = vx_6 + \frac{(vx_7 - vx_6)}{x_7 - x_6} \times (x_1 - x_6) + \frac{(vx_4 - vx_6)}{y_4 - y_6} \times (y_1 - y_6) \\ vy_1 = vy_6 + \frac{(vy_7 - vy_6)}{x_7 - x_6} \times (x_1 - x_6) + \frac{(vy_4 - vy_6)}{y_7 - y_6} \times (y_1 - y_6) \end{cases} \quad (22)$$

In the formulas (21) and (22), $(x_0, y_0)$ are the coordinates of the top-left control point of the current coding block, and $(x_1, y_1)$ are the coordinates of the top-right control point of the current coding block. In addition, $(vx_0, vy_0)$ is the predicted motion vector of the top-left control point of the current coding block, and $(vx_1, vy_1)$ is the predicted motion vector of the top-right control point of the current coding block.

Optionally, both the location coordinates $(x_6, y_6)$ of the bottom-left control point and the location coordinates $(x_7, y_7)$ of the bottom-right control point of the first neighboring affine coding block are calculated based on location coordinates $(x_4, y_4)$ of a top-left control point of the first neighboring affine coding block. The location coordinates $(x_6, y_6)$ of the bottom-left control point of the first neighboring affine coding block are $(x_4, y_4+cuH)$, and the location coordinates $(x_7, y_7)$ of the bottom-right control point of the first neighboring affine coding block are $(x_4+cuW, y_4+cuH)$, where cuW is the width of the first neighboring affine coding block, and cuH is the height of the first neighboring affine coding block. In addition, the motion vector of the bottom-left control point of the first neighboring affine coding block is a motion vector of a bottom-left sub-block of the first neighboring affine coding block, and the motion vector of the bottom-right control point of the first neighboring affine coding block is a motion vector of a bottom-right sub-block of the first neighboring affine coding block. It can be learned that in this case, a horizontal distance between the bottom-left control point and the bottom-right control point of the first neighboring affine coding block is cuW, and a horizontal distance between the top-left control point and the top-right control point of the first neighboring affine coding block is cuW. Because cuW is usually a power of 2, in a process of deriving the motion vector of the control point of the current coding block, a right-shifting manner may be used instead of a division operation, to reduce implementation complexity. It can be learned that both the location coordinates of the bottom-left control point and the location coordinates of the bottom-right control point of the first neighboring affine coding block are obtained through derivation, rather than being read from the memory. Therefore, according to this method, a quantity of times of reading from the memory can be further reduced and decoding performance can be improved. In another optional solution, the location coordinates of the bottom-left control point and the location coordinates of the bottom-right control point may be alternatively pre-stored in the memory, and read from the memory for use when necessary.

In this case, in the formulas (21) and (22), $(x_7-x_6)$ is equal to cuW, $(vx_7, vy_7)$ may be obtained by reading a motion vector of a location $(x_4+cuW-1, y_4+cuH-1)$ in a picture, and $(vx_6, vy_6)$ may be obtained by reading a motion vector of a location $(x_4, y_4+cuH-1)$ in the picture.

Optionally, the candidate motion vector predictor MVP list further includes a second candidate motion vector group, the second candidate motion vector group is obtained based on a second group of control points of a second neighboring affine coding block, and the second group of control points of the second neighboring affine coding block includes a bottom-left control point and a bottom-right control point of the second neighboring affine coding block.

B: The parameter model of the current coding block is a 6-parameter affine transformation model. A derivation manner may be as follows:

Regardless of the location of the first neighboring affine coding block relative to the current coding block, location coordinates and motion vectors of a top-left control point and two lowermost control points of the first neighboring affine coding block are directly obtained. For example, location coordinates $(x_4, y_4)$ and a motion vector $(vx_4, vy_4)$ of the top-left control point of the first neighboring affine coding block, location coordinates $(x_6, y_6)$ and a motion vector $(vx_6, vy_6)$ of a bottom-left control point of the first neighboring affine coding block, and location coordinates $(x_7, y_7)$ and a motion vector $(vx_7, vy_7)$ of a bottom-right control point of the first neighboring affine coding block may be obtained.

A first affine model (the first affine model obtained in this case is a 6-parameter affine model) is formed based on the location coordinates and the motion vector of the top-left control point of the first neighboring affine coding block, the location coordinates and the motion vector of the bottom-left control point of the first neighboring affine coding block, and the location coordinates and the motion vector of the bottom-right control point of the first neighboring affine coding block.

The motion vector of the control point of the current coding block is predicted based on the first affine model. For example, location coordinates of a top-left control point of the current coding block, location coordinates of a top-right control point of the current coding block, and location coordinates of a bottom-left control point of the current coding block may be substituted into the first affine model, to predict a motion vector of the top-left control point of the current coding block, a motion vector of the top-right control point of the current coding block, and a motion vector of the bottom-left control point of the current coding block. Details are shown in formulas (21), (22), and (23).

In the formulas (21), (22), and (23), $(x_0, y_0)$ are the coordinates of the top-left control point of the current coding block, $(x_1, y_1)$ are the coordinates of the top-right control point of the current coding block, and $(x_2, y_2)$ are the coordinates of the bottom-left control point of the current coding block. In addition, $(vx_0, vy_0)$ is the predicted motion vector of the top-left control point of the current coding block, $(vx_1, vy_1)$ is the predicted motion vector of the top-right control point of the current coding block, and $(vx_2, vy_2)$ is the predicted motion vector of the bottom-left control point of the current coding block.

Optionally, the candidate motion vector predictor MVP list further includes a second candidate motion vector group, the second candidate motion vector group is obtained based on a second group of control points of a second neighboring affine coding block, and the second group of control points of the second neighboring affine coding block includes a bottom-left control point and a bottom-right control point of the second neighboring affine coding block.

Manner 2: The candidate motion vector predictor MVP list is constructed by using a control point combination-based motion vector prediction method.

Specifically, a principle of the manner 2 is the same as that of the manner 2 in step S1211. Therefore, details are not described herein again.

Step S1512: The video decoder parses a bitstream, to obtain an index and a motion vector difference MVD.

For details, refer to the description of step S1212. Details are not described herein again.

Step S1513: The video decoder determines the target motion vector group in the candidate motion vector predictor MVP list based on the index.

For details, refer to the description of step S1213. Details are not described herein again.

Step S1514: The video decoder determines the motion vector of the control point of the current coding block based on the target candidate motion vector group and the motion vector difference MVD that is obtained from the bitstream through parsing.

For details, refer to the description of step S1214. Details are not described herein again.

Step S1515: The video decoder obtains a motion vector of each sub-block of the current coding block based on the determined motion vector of the control point of the current coding block by using a parameter-based affine transformation model.

For details, refer to the description of step S1215. Details are not described herein again.

Step S1516: The video decoder performs motion compensation based on the motion vector of each sub-block of the current coding block, to obtain a predicted sample value of each sub-block.

For details, refer to the description of step S1216. Details are not described herein again.

Merge Mode:

Step S1521: The video decoder constructs a candidate motion information list.

Specifically, the video decoder constructs the candidate motion information list (also referred to as an affine candidate motion vector list) by using the inter prediction unit (also referred to as an inter prediction module). The construction may be performed in either of the following two manners or a combination of the two manners. The constructed candidate motion information list is a triplet candidate motion information list. The two manners are specifically as follows:

Manner 1: The candidate motion information list is constructed by using a motion model-based motion vector prediction method.

First, all or some neighboring blocks of the current coding block are traversed in a pre-specified order, to determine a neighboring affine coding block in the neighboring blocks. There may be one or more determined neighboring affine coding blocks. For example, neighboring blocks A, B, C, D, and E shown in FIG. 7A may be traversed sequentially, to determine a neighboring affine coding block in the neighboring blocks A, B, C, D, and E. The inter prediction unit determines a group of candidate motion vector predictors (each group of candidate motion vector predictors is a 2-tuple or a triplet) based on at least one neighboring affine coding block. The following uses one neighboring affine coding block as an example for description. For ease of description, the neighboring affine coding block is referred to as a first neighboring affine coding block. Details are as follows:

A first affine model is determined based on a motion vector of a control point of the first neighboring affine coding block. Further, a motion vector of a control point of the current coding block is predicted based on the first affine model. Details are as follows:

Regardless of the location of the first neighboring affine coding block relative to the current coding block, location coordinates and motion vectors of a top-left control point and two lowermost control points of the first neighboring affine coding block are directly obtained. For example, location coordinates $(x_4, y_4)$ and a motion vector $(vx_4, vy_4)$ of the top-left control point of the first neighboring affine coding block, location coordinates $(x_6, y_6)$ and a motion vector $(vx_6, vy_6)$ of a bottom-left control point of the first neighboring affine coding block, and location coordinates $(x_7, y_7)$ and a motion vector $(vx_7, vy_7)$ of a bottom-right control point of the first neighboring affine coding block may be obtained.

A first affine model (the first affine model obtained in this case is a 6-parameter affine model) is formed based on the location coordinates and the motion vector of the top-left control point of the first neighboring affine coding block, the location coordinates and the motion vector of the bottom-left control point of the first neighboring affine coding block, and the location coordinates and the motion vector of the bottom-right control point of the first neighboring affine coding block.

Optionally, the motion vector of the control point of the current coding block is predicted based on the first affine model. For example, location coordinates of a top-left control point of the current coding block, location coordinates of a top-right control point of the current coding block, and location coordinates of a bottom-left control point of the current coding block may be substituted into the first affine model, to predict a motion vector of the top-left control point of the current coding block, a motion vector of the top-right control point of the current coding block, and a motion vector of the bottom-left control point of the current coding block. A candidate motion vector triplet is formed and is added to the candidate motion information list. Details are shown in formulas (21), (22), and (23).

Optionally, the motion vector of the control point of the current coding block is predicted based on the first affine model. For example, location coordinates of a top-left control point of the current coding block and location coordinates of a top-right control point of the current coding block may be substituted into the first affine model, to predict a motion vector of the top-left control point of the current coding block and a motion vector of the top-right control point of the current coding block. A candidate motion vector 2-tuple is formed and is added to the candidate motion information list. Details are shown in formulas (21) and (22).

In the formulas (21), (22), and (23), $(x_0, y_0)$ are the coordinates of the top-left control point of the current coding block, $(x_1, y_1)$ are the coordinates of the top-right control point of the current coding block, and $(x_2, y_2)$ are the coordinates of the bottom-left control point of the current coding block. In addition, $(vx_0, vy_0)$ is the predicted motion vector of the top-left control point of the current coding block, $(vx_1, vy_1)$ is the predicted motion vector of the top-right control point of the current coding block, and $(vx_2, vy_2)$ is the predicted motion vector of the bottom-left control point of the current coding block.

Optionally, the candidate motion information list further includes a second candidate motion vector group, the second candidate motion vector group is obtained based on a second group of control points of a second neighboring affine coding block, and the second group of control points of the second neighboring affine coding block includes a bottom-left control point and a bottom-right control point of the second neighboring affine coding block.

Manner 2: The candidate motion information list is constructed by using a control point combination-based motion vector prediction method.

Specifically, a principle of the manner 2 is the same as that of the manner 2 in step S1221. Therefore, details are not described herein again.

Step S1522: The video decoder parses a bitstream, to obtain an index.

For details, refer to the description of step S1222. Details are not described herein again.

Step S1523: The video decoder determines the target motion vector group in the candidate motion information list based on the index.

For details, refer to the description of step S1223. Details are not described herein again.

Step S1524: The video decoder obtains a motion vector of each sub-block of the current coding block based on the determined motion vector of the control point of the current coding block by using a parameter-based affine transformation model.

For details, refer to the description of step S1224. Details are not described herein again.

Step S1525: The video decoder performs motion compensation based on the motion vector of each sub-block of the current coding block, to obtain a predicted sample value of each sub-block.

For details, refer to the description of step S1225. Details are not described herein again.

It may be understood that, when the coding tree unit CTU in which the first neighboring affine coding block is located is above the current coding block, information about lowermost control points of the first neighboring affine coding block has been read from memory. Therefore, in the foregoing solution, in a process of constructing a candidate motion vector based on the first group of control points of the first neighboring affine coding block, the first group of control points includes the bottom-left control point and the bottom-right control point of the first neighboring affine coding block, instead of fixedly using a top-left control point, a top-right control point, and a bottom-left control point of a first neighboring coding block as a first group of control points (or fixedly using a top-left control point and a top-right control point of a first neighboring coding block as a first group of control points) in the prior art. Therefore, according to the method of determining the first group of control points in this application, there is a very high probability that the information that has been read from the memory can be directly reused as information (for example, location coordinates and motion vectors) about the first group of control points, thereby reducing a quantity of times of reading from the memory and improving decoding performance.

Figure 10:
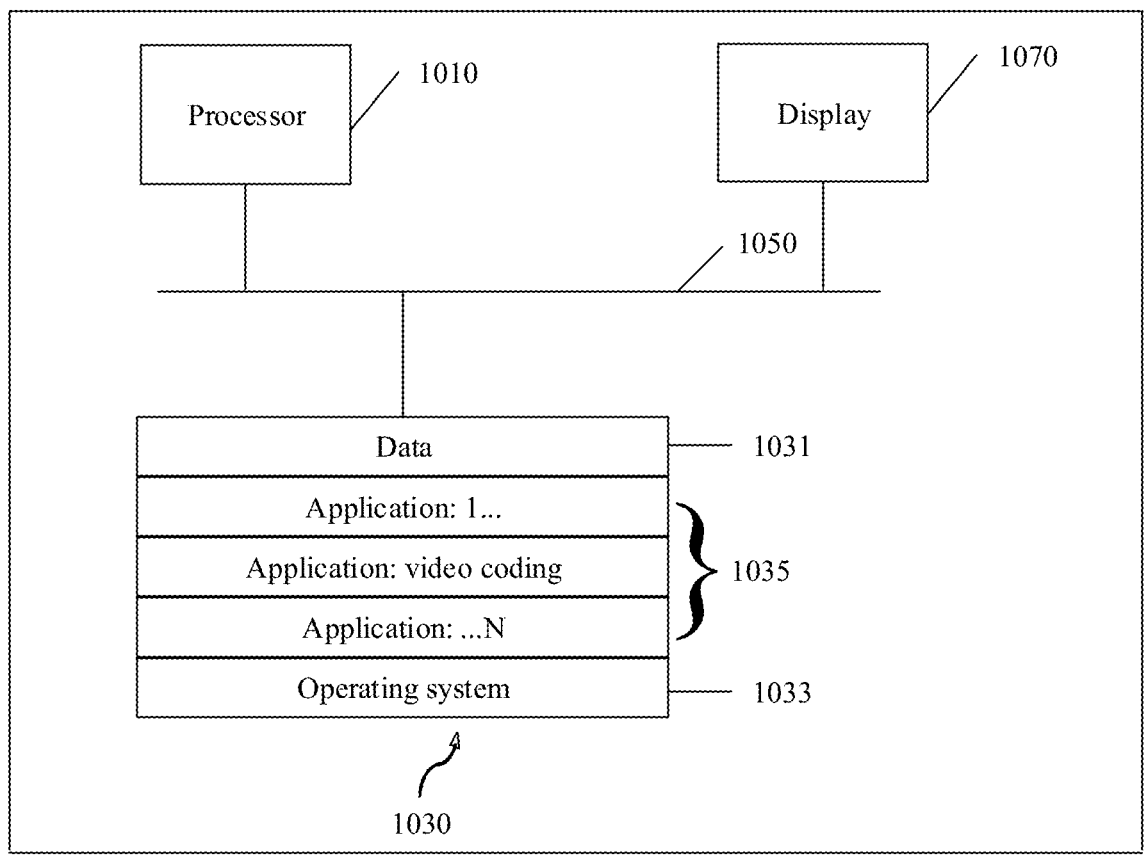
FIG. 10 is a schematic structural diagram of an encoding device or a decoding device according to an embodiment of this application.

FIG. 10 is a schematic block diagram of an implementation of an encoding device or a decoding device (briefly referred to as a coding device 1000) according to an embodiment of this application. The coding device 1000 may include a processor 1010, a memory 1030, and a bus system 1050. The processor and the memory are connected through the bus system. The memory is configured to store an instruction. The processor is configured to execute the instruction stored in the memory. The memory of the encoding device stores program code. The processor may invoke the program code stored in the memory, to perform the video coding or decoding methods described in this application, and in particular, video coding or decoding methods in various new inter prediction modes and motion information prediction methods in various new inter prediction modes. To avoid repetition, details are not described herein again.

In this embodiment of this application, the processor 1010 may be a central processing unit (Central Processing Unit, "CPU" for short), or the processor 1010 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

The memory 1030 may include a read-only memory (ROM) device or a random access memory (RAM) device. Any other storage device of an appropriate type may also be used as the memory 1030. The memory 1030 may include code and data 1031 accessed by the processor 1010 through the bus 1050. The memory 1030 may further include an operating system 1033 and an application program 1035. The application program 1035 includes at least one program that allows the processor 1010 to perform the video coding or decoding method described in this application (particularly the inter prediction method or the motion information prediction method described in this application). For example, the application program 1035 may include applications 1 to N, and further include a video coding or decoding application (briefly referred to as a video coding application) for performing the video coding or decoding method described in this application.

The bus system 1050 may further include a power bus, a control bus, a status signal bus, and the like, in addition to a data bus. However, for clear description, various types of buses in the figure are all marked as the bus system 1050.

Optionally, the coding device 1000 may further include one or more output devices, for example, a display 1070. In an example, the display 1070 may be a touch display that integrates a display with a touch unit that can operationally sense a touch input. The display 1070 may be connected to the processor 1010 through the bus 1050.

Figure 11:
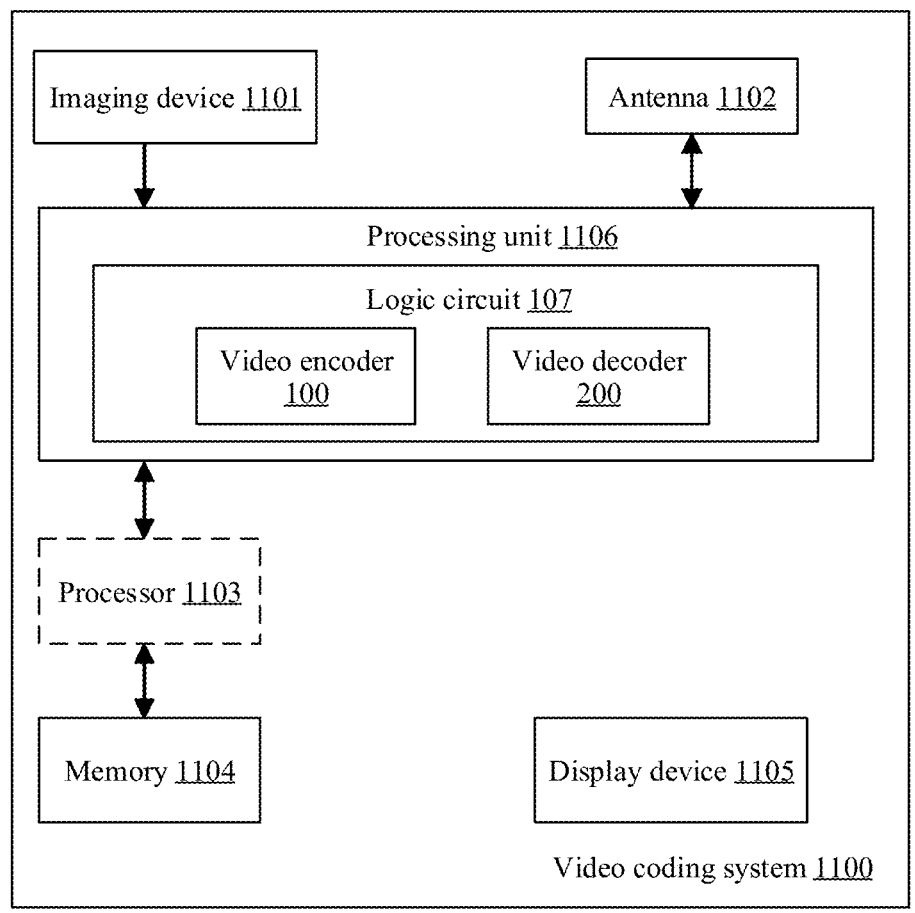
FIG. 11 is a video coding system 1100 including the encoder 100 in FIG. 2A and/or the decoder 200 in FIG. 2B according to an example embodiment.

FIG. 11 is an illustration diagram of an example of a video coding system 1100 including the encoder 100 in FIG. 2A and/or the decoder 200 in FIG. 2B according to an example embodiment. The system 1100 may implement a combination of various technologies of this application. In a described implementation, the video coding system 1100 may include an imaging device 1101, a video encoder 100, a video decoder 200 (and/or a video encoder implemented by using a logic circuit 1107 of a processing unit 1106), an antenna 1102, one or more processors 1103, one or more memories 1104, and/or a display device 1105.

As shown in the figure, the imaging device 1101, the antenna 1102, the processing unit 1106, the logic circuit 1107, the video encoder 100, the video decoder 200, the processor 1103, the memory 1104, and/or the display device 1105 can communicate with each other. As described, although the video coding system 1100 is illustrated by using the video encoder 100 and the video decoder 200, in different examples, the video coding system 1100 may include only the video encoder 100 or only the video decoder 200.

In some examples, as shown in the figure, the video coding system 1100 may include the antenna 1102. For example, the antenna 1102 may be configured to transmit or receive an encoded bitstream of video data. In addition, in some examples, the video coding system 1100 may include the display device 1105. The display device 1105 may be configured to present video data. In some examples, as shown in the figure, the logic circuit 1107 may be implemented by the processing unit 1106. The processing unit 1106 may include application-specific integrated circuit (application-specific integrated circuit, ASIC) logic, a graphics processor, a general-purpose processor, or the like. The video coding system 1100 may further include an optional processor 1103. The optional processor 1103 may similarly include application-specific integrated circuit (application-specific integrated circuit, ASIC) logic, a graphics processor, a general-purpose processor, or the like. In some examples, the logic circuit 1107 may be implemented by using hardware, for example, dedicated hardware for video coding. The processor 1103 may be implemented by using general-purpose software, an operating system, or the like. In addition, the memory 1104 may be a memory of any type, for example, a volatile memory (for example, a static random access memory (Static Random Access Memory, SRAM) or a dynamic random access memory (Dynamic Random Access Memory, DRAM)) or a nonvolatile memory (for example, a flash memory). In a non-restrictive example, the memory 1104 may be implemented by cache memory. In some examples, the logic circuit 1107 may access the memory 1104 (for example, for implementing a picture buffer). In other examples, the logic circuit 1107 and/or the processing unit 1106 may include a memory (for example, a cache) for implementing a picture buffer.

In some examples, the video encoder 100 implemented by using the logic circuit may include a picture buffer (which is implemented by, for example, the processing unit 1106 or the memory 1104) and a graphics processing unit (which is implemented by, for example, the processing unit 1106). The graphics processing unit may be communicatively coupled to the picture buffer. The graphics processing unit may include the video encoder 100 implemented by using the logic circuit 1107, to implement various modules described with reference to FIG. 1A and/or any other encoder system or subsystem described in this specification. The logic circuit may be configured to perform various operations described in this specification.

Figure 1B:
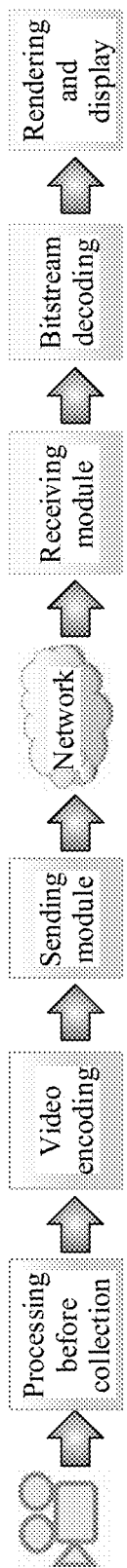
FIG. 1B is a schematic flowchart of video data processing according to an embodiment of this application.

The video decoder 200 may be implemented by the logic circuit 1107 in a similar manner, to implement various modules described with reference to the decoder 200 in FIG. 1B and/or any other decoder system or subsystem described in this specification. In some examples, the video decoder 200 implemented by using the logic circuit may include a picture buffer (which is implemented by the processing unit 1106 or the memory 1104) and a graphics processing unit (which is implemented by, for example, the processing unit 1106). The graphics processing unit may be communicatively coupled to the picture buffer. The graphics processing unit may include the video decoder 200 implemented by using the logic circuit 1107, to implement various modules described with reference to FIG. 1B and/or any other decoder system or subsystem described in this specification.

In some examples, the antenna 1102 of the video coding system 1100 may be configured to receive an encoded bitstream of video data. As described, the encoded bitstream may include data, an indicator, an index value, mode selection data, or the like that is related to video frame encoding and that is described in this specification, for example, data related to partitioning for coding (for example, a transform coefficient or a quantized transform coefficient, an optional indicator (as described), and/or data defining the partitioning for coding). The video coding system 1100 may further include the video decoder 200 that is coupled to the antenna 1102 and that is configured to decode the encoded bitstream. The display device 1105 is configured to present a video frame.

In steps of the foregoing method procedure, a description order of the steps does not represent an execution order of the steps. The steps may be or may not be performed according to the foregoing description order. For example, step S1211 may be performed after step S1212, or may be performed before step S1212, and step S1221 may be performed after step S1222, or may be performed before step S1222. Other steps are not enumerated one by one herein.

A person skilled in the art can understand that, the functions described with reference to various illustrative logical blocks, modules, and algorithm steps disclosed and described in this specification can be implemented by hardware, software, firmware, or any combination thereof. If implemented by software, the functions described with reference to the illustrative logical blocks, modules, and steps may be stored in or transmitted over a computer-readable medium as one or more instructions or code and executed by a hardware-based processing unit. The computer-readable medium may include a computer-readable storage medium, which corresponds to a tangible medium such as a data storage medium, or may include any communications medium that facilitates transmission of a computer program from one place to another (for example, according to a communications protocol). In this manner, the computer-readable medium may generally correspond to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example but not limitation, such computer-readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of an instruction or a data structure and that can be accessed by a computer. In addition, any connection is properly referred to as a computer-readable medium. For example, if an instruction is transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically with lasers. Combinations of the foregoing items should also be included in the scope of the computer-readable media.

An instruction may be executed by one or more processors such as one or more digital signal processors (DSP), general-purpose microprocessors, application-specific integrated circuits (ASIC), field programmable gate arrays (FPGA), or other equivalent integrated or discrete logic circuits. Therefore, the term "processor" used in this specification may be any of the foregoing structures or any other structure suitable for implementing the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be completely implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of the apparatuses configured to perform the disclosed technologies, but are not necessarily implemented by different hardware units. Actually, as described above, various units may be combined into a codec hardware unit in combination with appropriate software and/or firmware, or may be provided by interoperable hardware units (including one or more processors described above).

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. An encoding method, comprising:
in response to an affine inter mode for a current coding block,
determining, a target candidate motion vector group in an affine candidate motion vector list according to a rate-distortion cost criterion, wherein the target candidate motion vector group represents motion vector predictors of a group of control points of the current coding block, the affine candidate motion vector list comprises at least a first candidate motion vector group, the first candidate motion vector group is obtained based on a first group of control points of a first neighboring affine coding block of the current coding block, and the first group of control points of the first neighboring affine coding block are control points determined based on a relative location of a coding tree unit (CTU) with respect to the current coding block, wherein the first neighboring affine coding block is located in the CTU;
determining motion vector differences (MVDs) of the group of control points between the target candidate motion vector group and motion vectors of the group of control points; and
encoding the MVDs of the group of control points and an index corresponding to the target candidate motion vector group into a to-be-transmitted bitstream.

2. The method according to claim 1, wherein there is a CTU boundary between a CTU where the current coding block is located, and the CTU where the first neighboring affine coding block is located.

3. The method according to claim 1, wherein:
the first candidate motion vector group is obtained based on a first affine model, and the first affine model is determined based on motion vectors and location coordinates of the first group of control points of the first neighboring affine coding block.

4. The method according to claim 1, wherein the affine candidate motion vector list further comprises a second candidate motion vector group, and the second candidate motion vector group is obtained based on a second group of control points of a second neighboring affine coding block; wherein locations of one or more control points in the second group of control points of the second neighboring affine coding block relative to the second neighboring affine coding block are different from locations of one or more control points in the first group of control points of the first neighboring affine coding block relative to the first neighboring affine coding block, or the second group of control points of the second neighboring affine coding block comprises a bottom-left control point and a bottom-right control point of the second neighboring affine coding block.

5. The method according to claim 1, wherein that the first group of control points of the first neighboring affine coding block are control points determined based on a relative location of a CTU with respect to the current coding block, wherein the first neighboring affine coding block is located in the CTU comprises:
if the first neighboring affine coding block is located in a CTU above the current coding block, the first group of control points of the first neighboring affine coding block comprises a bottom-left control point and a bottom-right control point of the first neighboring affine coding block.

6. The method according to claim 5, wherein if the first neighboring affine coding block is located in the CTU above the current coding block, the first group of control points of the first neighboring affine coding block further comprises a top-left control point or a top-right control point of the first neighboring affine coding block.

7. The method according to claim 1, wherein that the first group of control points of the first neighboring affine coding block are control points determined based on a relative location of a CTU with respect to the current coding block, wherein the first neighboring affine coding block is located in the CTU comprises:
if the first neighboring affine coding block is located in a CTU on the left of the current coding block, the first group of control points of the first neighboring affine coding block comprises a top-right control point and a bottom-right control point of the first neighboring affine coding block.

8. The method according to claim 7, wherein if the first neighboring affine coding block is located in the CTU on the left of the current coding block, the first group of control points of the first neighboring affine coding block further comprises a top-left control point or a bottom-left control point of the first neighboring affine coding block.

9. The method according to claim 1, wherein when the first group of control points of the first neighboring affine coding block comprises a bottom-left control point and a bottom-right control point of the first neighboring affine coding block, the first group of control points of the first neighboring affine coding block further comprises a top-left control point of the first neighboring affine coding block.

10. The method according to claim 1, wherein both location coordinates $(x_6, y_6)$ of a bottom-left control point of the first neighboring affine coding block and location coordinates $(x_7, y_7)$ of a bottom-right control point of the first neighboring affine coding block are derived based on location coordinates $(x_4, y_4)$ of a top-left control point of the first neighboring affine coding block, the location coordinates $(x_6, y_6)$ of the bottom-left control point of the first neighboring affine coding block are represented by $(x_4, y_4+cuH)$, and the location coordinates $(x_7, y_7)$ of the bottom-right control point of the first neighboring affine coding block are represented by $(x_4+cuW, y_4+cuH)$, wherein cuW is a width of the first neighboring affine coding block, and cuH is a height of the first neighboring affine coding block.

11. The method according to claim 10, wherein a motion vector of the bottom-left control point of the first neighboring affine coding block is a motion vector of a bottom-left sub-block of the first neighboring affine coding block, and a motion vector of the bottom-right control point of the first neighboring affine coding block is a motion vector of a bottom-right sub-block of the first neighboring affine coding block.

12. A video data encoding device, comprising:
a memory, configured to store video data in a form of a bitstream; and
a video encoder, configured to:
in response to an affine inter mode for a current coding block,
determine a target candidate motion vector group in an affine candidate motion vector list according to a rate-distortion cost criterion, wherein the target candidate motion vector group represents motion vector predictors of a group of control points of the current coding block, the affine candidate motion vector list comprises at least a first candidate motion vector group, the first candidate motion vector group is obtained based on a first group of control points of a first neighboring affine coding block of the current coding block, and the first group of control points of the first neighboring affine coding block are control points determined based on a relative location of a coding tree unit (CTU) with respect to the current coding block, wherein the first neighboring affine coding block is located in the CTU;
determine motion vector differences (MVDs) of the group of control points between the target candidate motion vector group and motion vectors of the group of control points; and
encode the MVDs of the group of control points and an index corresponding to the target candidate motion vector group into a to-be-transmitted bitstream.

13. The video data encoding device according to claim 12, wherein there is a CTU boundary between a CTU where the current coding block is located, and the CTU where the first neighboring affine coding block is located.

14. The video data encoding device according to claim 12, wherein:
the first candidate motion vector group is obtained based on a first affine model, and the first affine model is determined based on motion vectors and location coordinates of the first group of control points of the first neighboring affine coding block.

15. The video data encoding device according to claim 12, wherein the affine candidate motion vector list further comprises a second candidate motion vector group, and the second candidate motion vector group is obtained based on a second group of control points of a second neighboring affine coding block; wherein locations of one or more control points in the second group of control points of the second neighboring affine coding block relative to the second neighboring affine coding block are different from locations of one or more control points in the first group of control points of the first neighboring affine coding block relative to the first neighboring affine coding block, or the second group of control points of the second neighboring affine coding block comprises a bottom-left control point and a bottom-right control point of the second neighboring affine coding block.

16. The method according to claim 12, wherein that the first group of control points of the first neighboring affine coding block are control points determined based on a relative location of a CTU with respect to the current coding block, wherein the first neighboring affine coding block is located in the CTU comprises:
if the first neighboring affine coding block is located in a CTU above the current coding block, the first group of control points of the first neighboring affine coding block comprises a bottom-left control point and a bottom-right control point of the first neighboring affine coding block.

17. The method according to claim 16, wherein if the first neighboring affine coding block is located in the CTU above the current coding block, the first group of control points of the first neighboring affine coding block further comprises a top-left control point or a top-right control point of the first neighboring affine coding block.

18. The method according to claim 12, wherein when the first group of control points of the first neighboring affine coding block comprises a bottom-left control point and a bottom-right control point of the first neighboring affine coding block, the first group of control points of the first neighboring affine coding block further comprises a top-left control point of the first neighboring affine coding block.

19. The method according to claim 12, wherein both location coordinates $(x_6, y_6)$ of a bottom-left control point of the first neighboring affine coding block and location coordinates $(x_7, y_7)$ of a bottom-right control point of the first neighboring affine coding block are derived based on location coordinates $(x_4, y_4)$ of a top-left control point of the first neighboring affine coding block, the location coordinates $(x_6, y_6)$ of the bottom-left control point of the first neighboring affine coding block are represented by $(x_4, y_4+cuH)$, and the location coordinates $(x_7, y_7)$ of the bottom-right control point of the first neighboring affine coding block are represented by $(x_4+cuW, y_4+cuH)$, wherein cuW is a width of the first neighboring affine coding block, and cuH is a height of the first neighboring affine coding block.

20. The video data encoding device according to claim 19, wherein a motion vector of the bottom-left control point of the first neighboring affine coding block is a motion vector of a bottom-left sub-block of the first neighboring affine coding block, and a motion vector of the bottom-right control point of the first neighboring affine coding block is a motion vector of a bottom-right sub-block of the first neighboring affine coding block.

21. A non-transitory computer-readable media storing computer instructions, that when executed by one or more processors, cause the one or more processors to perform operations, the operations comprising:
in response to an affine inter mode for a current coding block,
determining a target candidate motion vector group in an affine candidate motion vector list according to a rate-distortion cost criterion, wherein the target candidate motion vector group represents motion vector predictors of a group of control points of the current coding block, the affine candidate motion vector list comprises at least a first candidate motion vector group, the first candidate motion vector group is obtained based on a first group of control points of a first neighboring affine coding block of the current coding block, and the first group of control points of the first neighboring affine coding block are control points determined based on a relative location of a coding tree unit (CTU) with respect to the current coding block, wherein the first neighboring affine coding block is located in the CTU;

determining motion vector differences (MVDs) of the group of control points between the target candidate motion vector group and motion vectors of the group of control points; and encoding the MVDs of the group of control points and an index corresponding to the target candidate motion vector group into a to-be-transmitted bitstream.

22. A non-transitory storage medium having an encoded bitstream for a video signal stored therein, the encoded bitstream including motion vector differences (MVDs) of a group of control points between a target candidate motion vector group and motion vectors of the group of control points and an index indicating the target candidate motion vector group, wherein the index and the MVDs enables a computer to determine motion vectors of the group of control points of a current coding block.

* * * * *